Jan. 12, 1937     B. L. GREEN     2,067,182
MEANS FOR AUTOMATICALLY SETTING TYPE IN TYPESETTING MACHINES
Original Filed Nov. 2, 1929    19 Sheets-Sheet 1

INVENTOR:
BUFORD L. GREEN
BY Paul Eaton
ATTORNEY

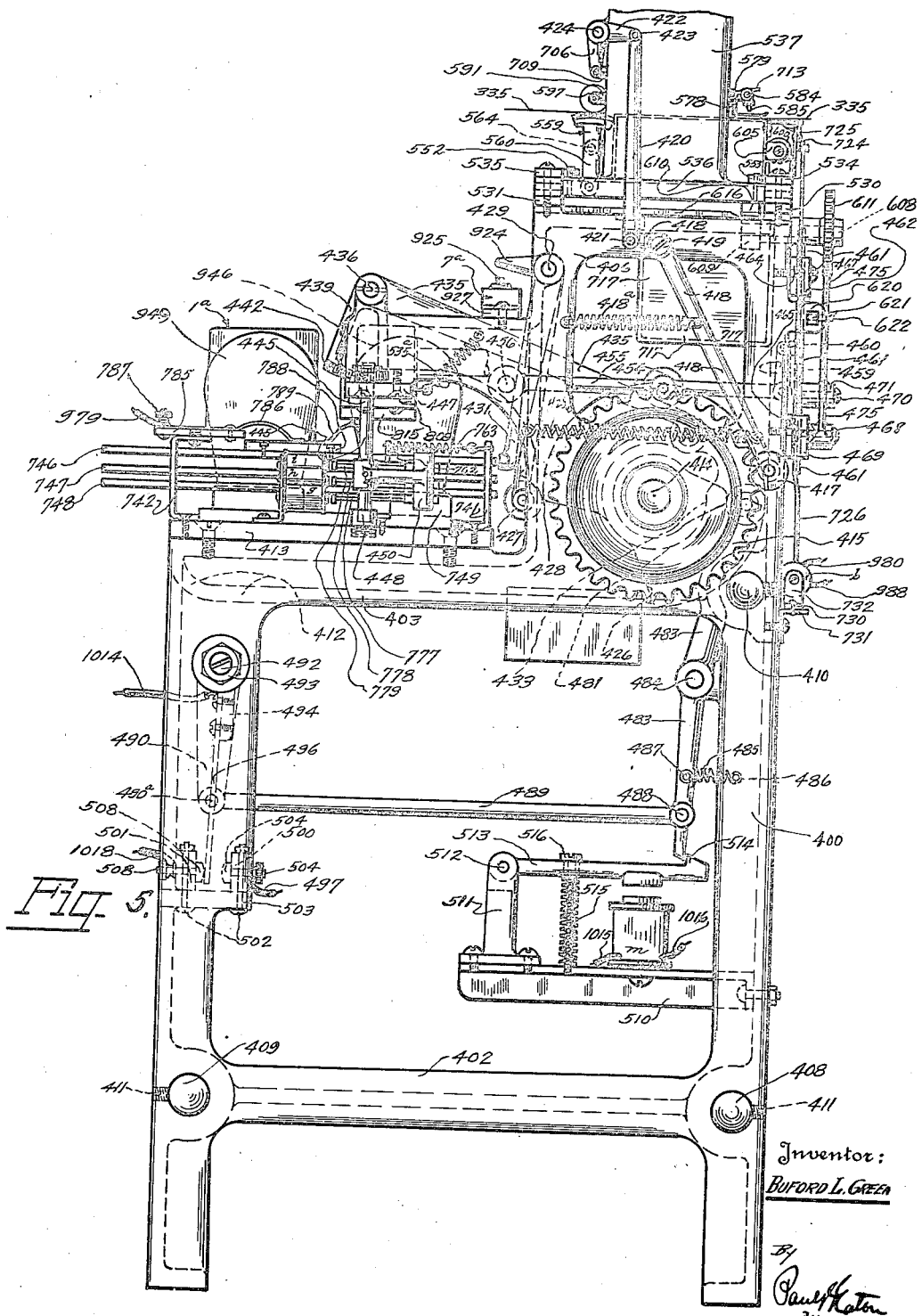

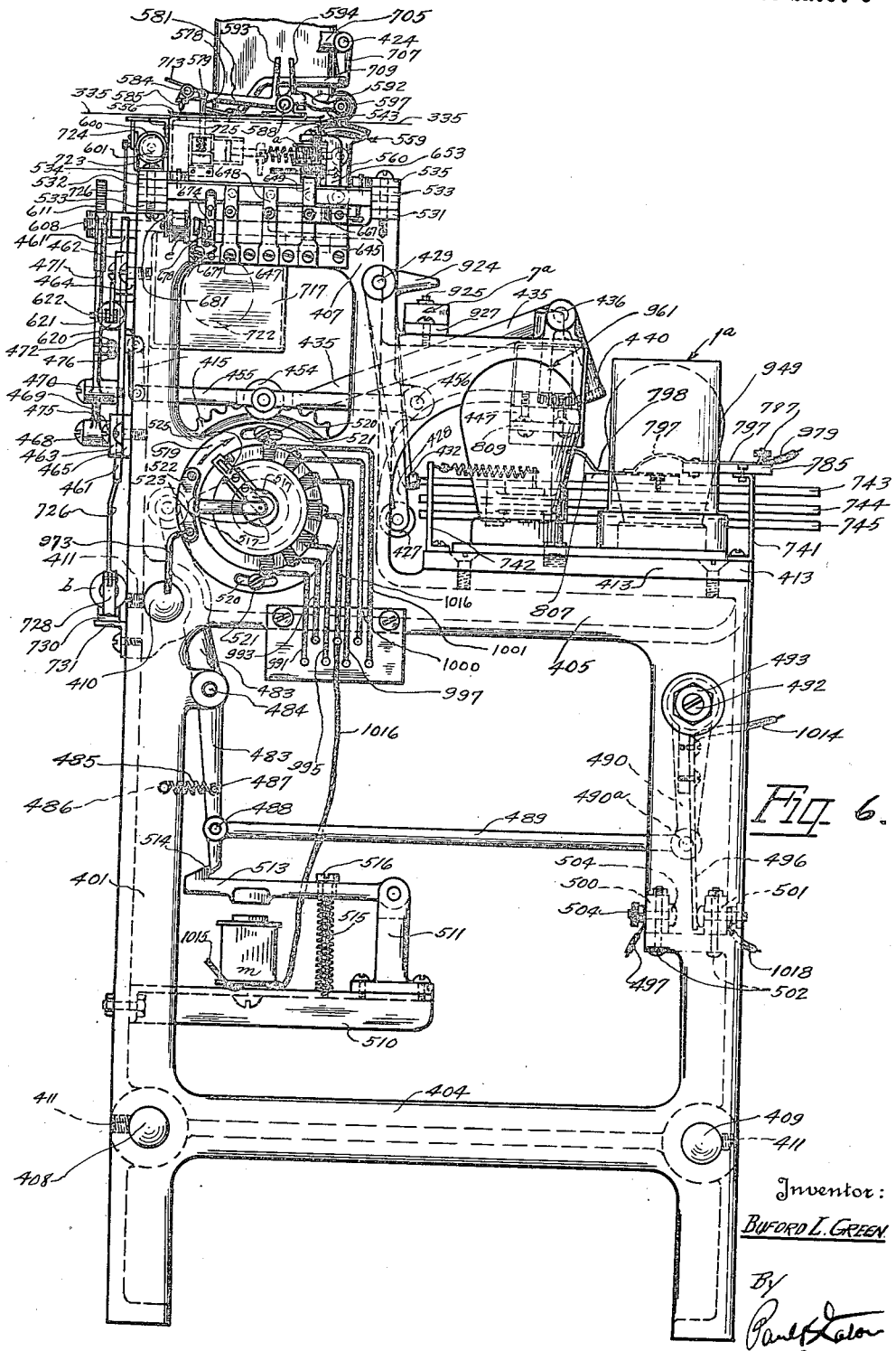

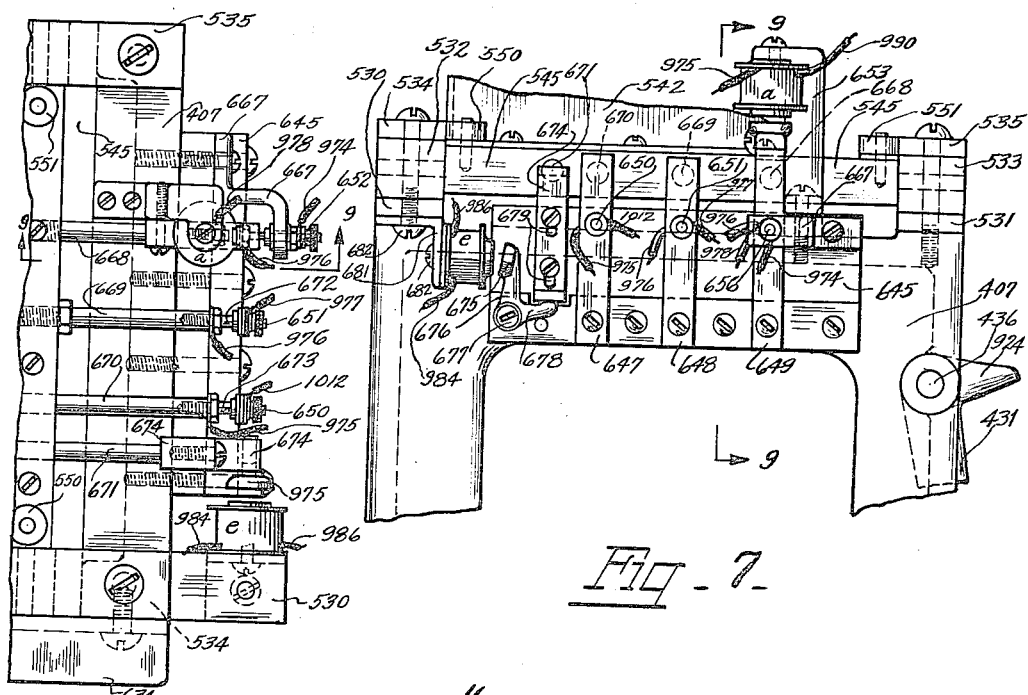
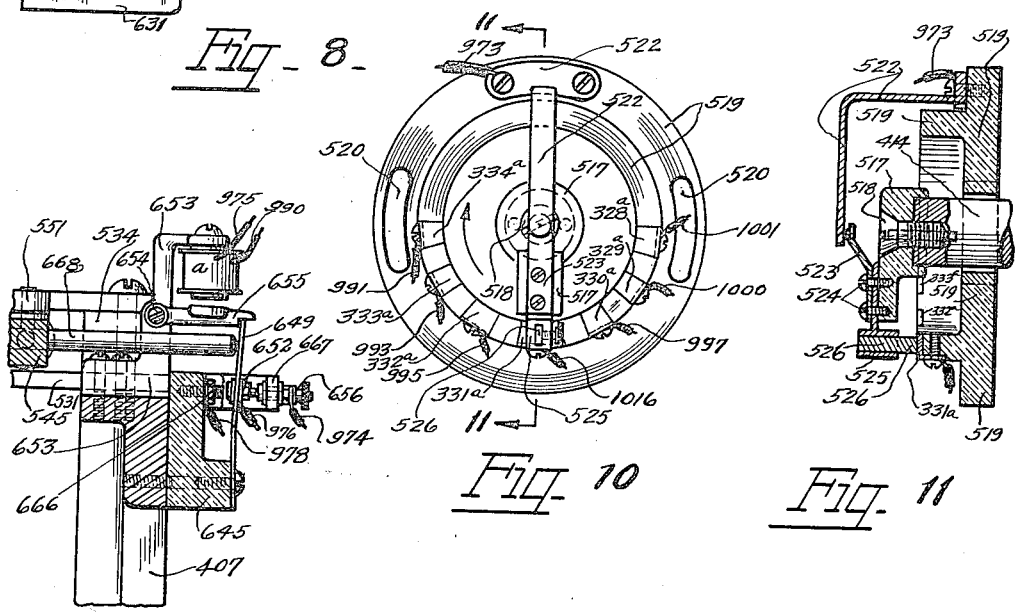

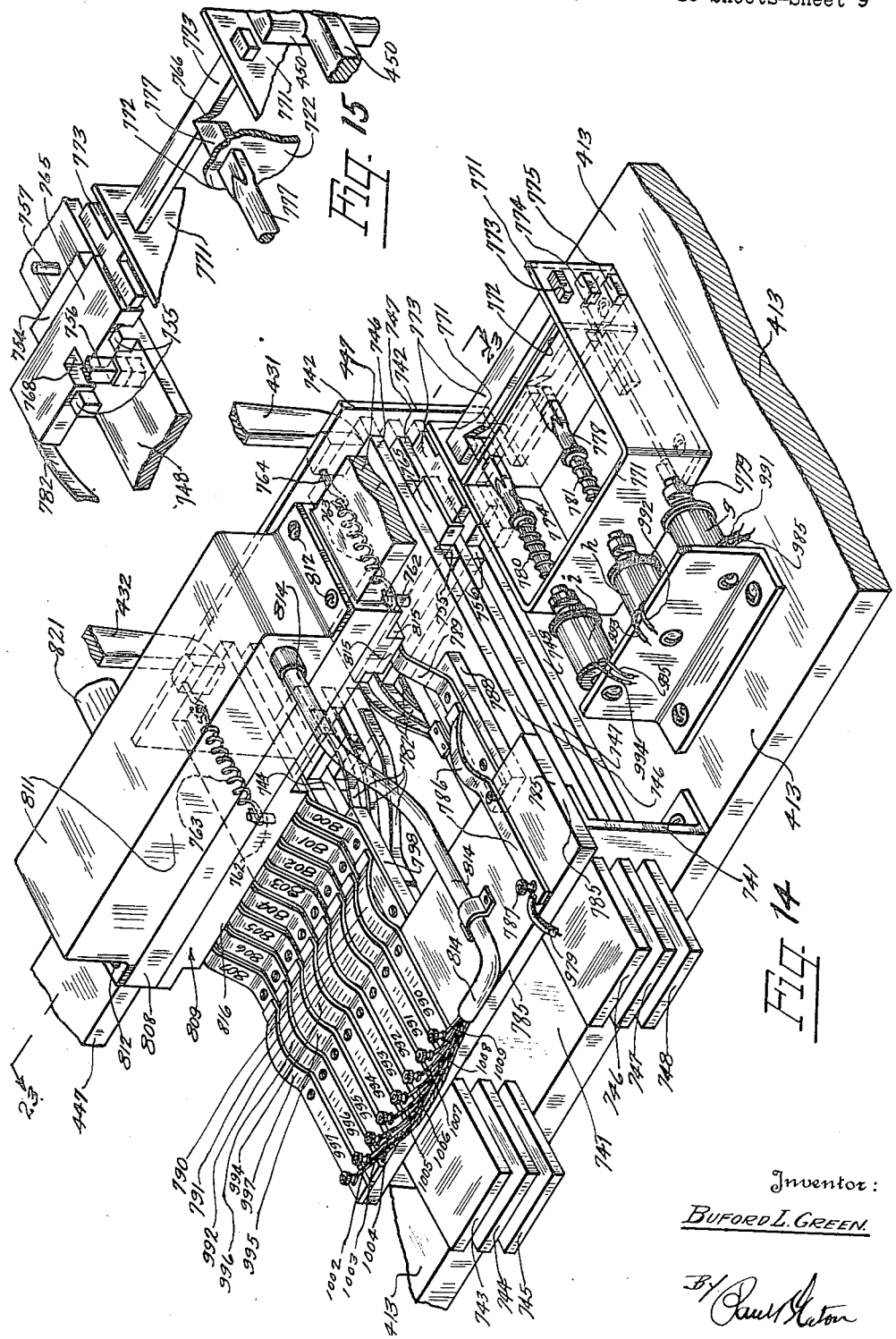

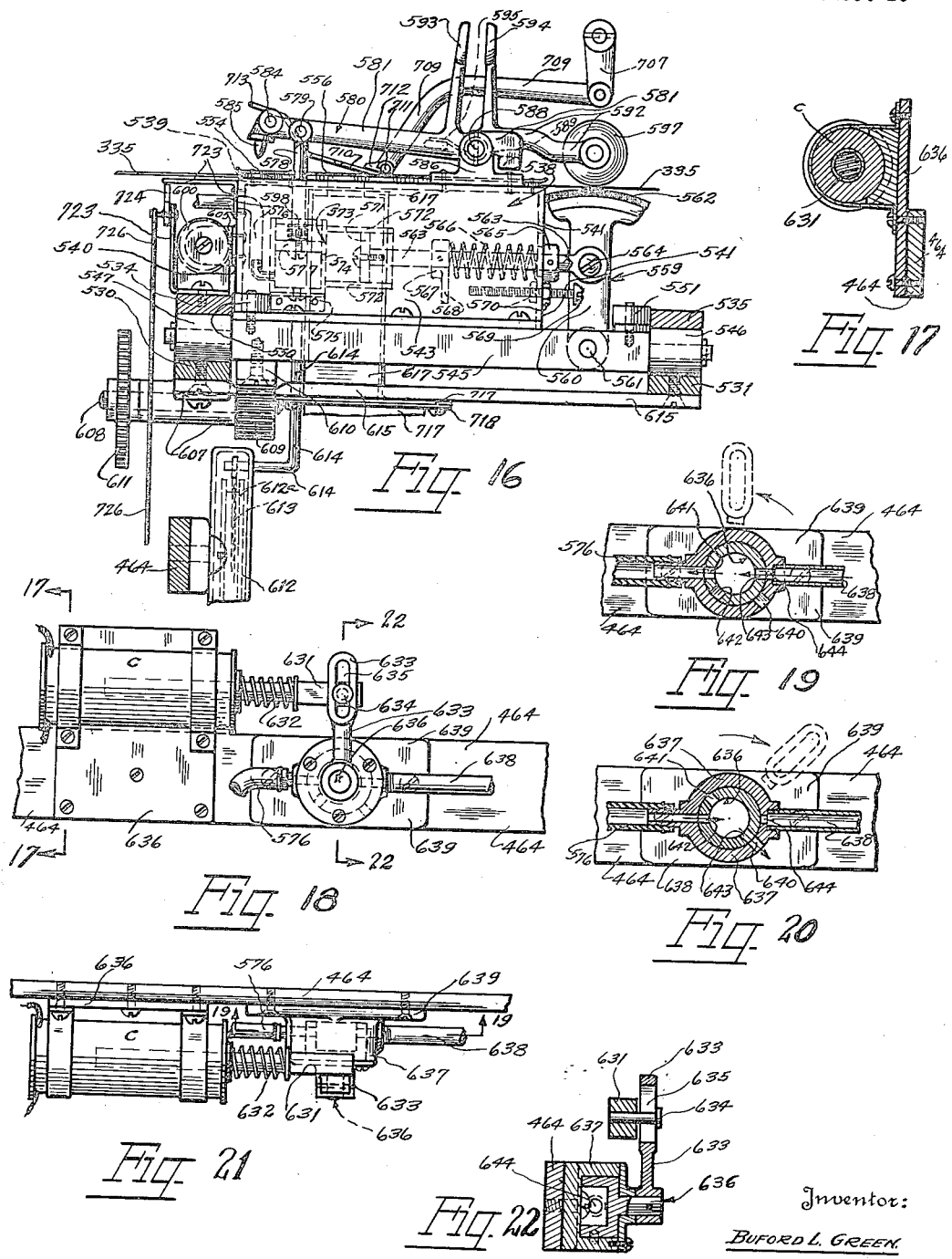

Jan. 12, 1937.　　　　　B. L. GREEN　　　　　2,067,182
MEANS FOR AUTOMATICALLY SETTING TYPE IN TYPESETTING MACHINES
Original Filed Nov. 2, 1929　　19 Sheets-Sheet 11
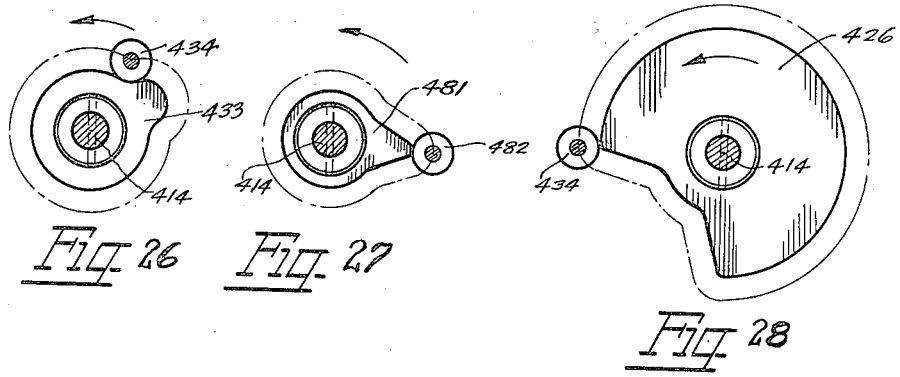
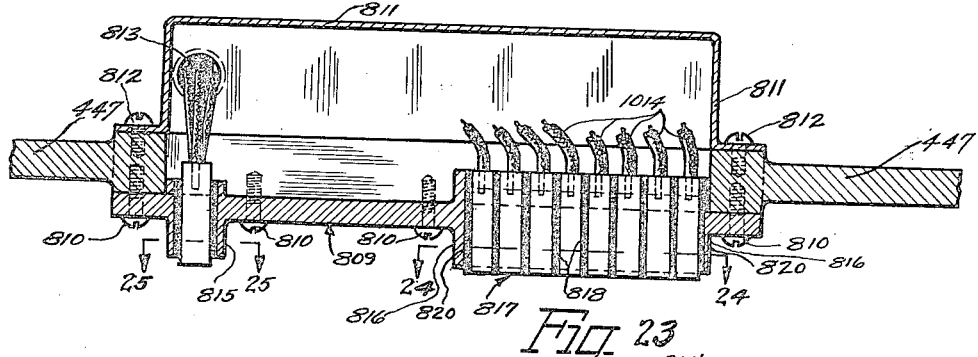
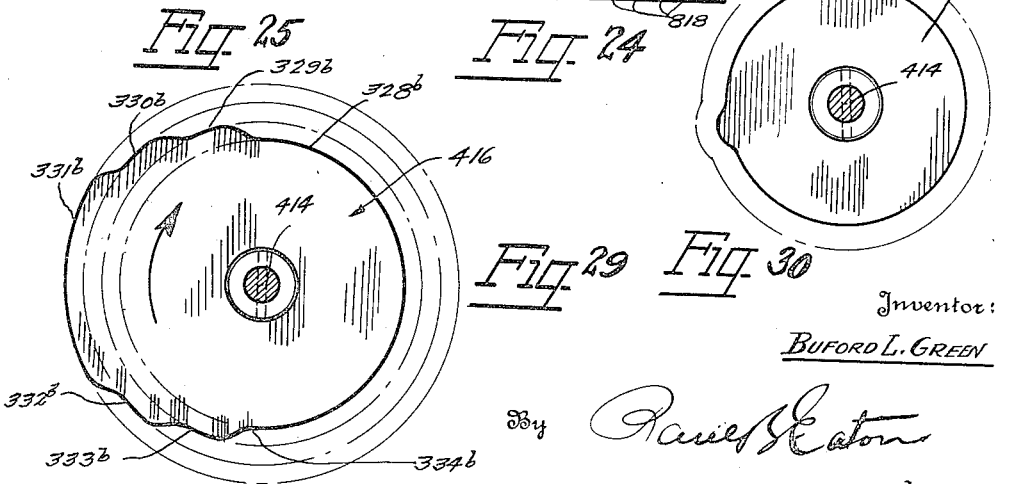
Inventor:
BUFORD L. GREEN
By _Paul S. Eaton_
Attorney

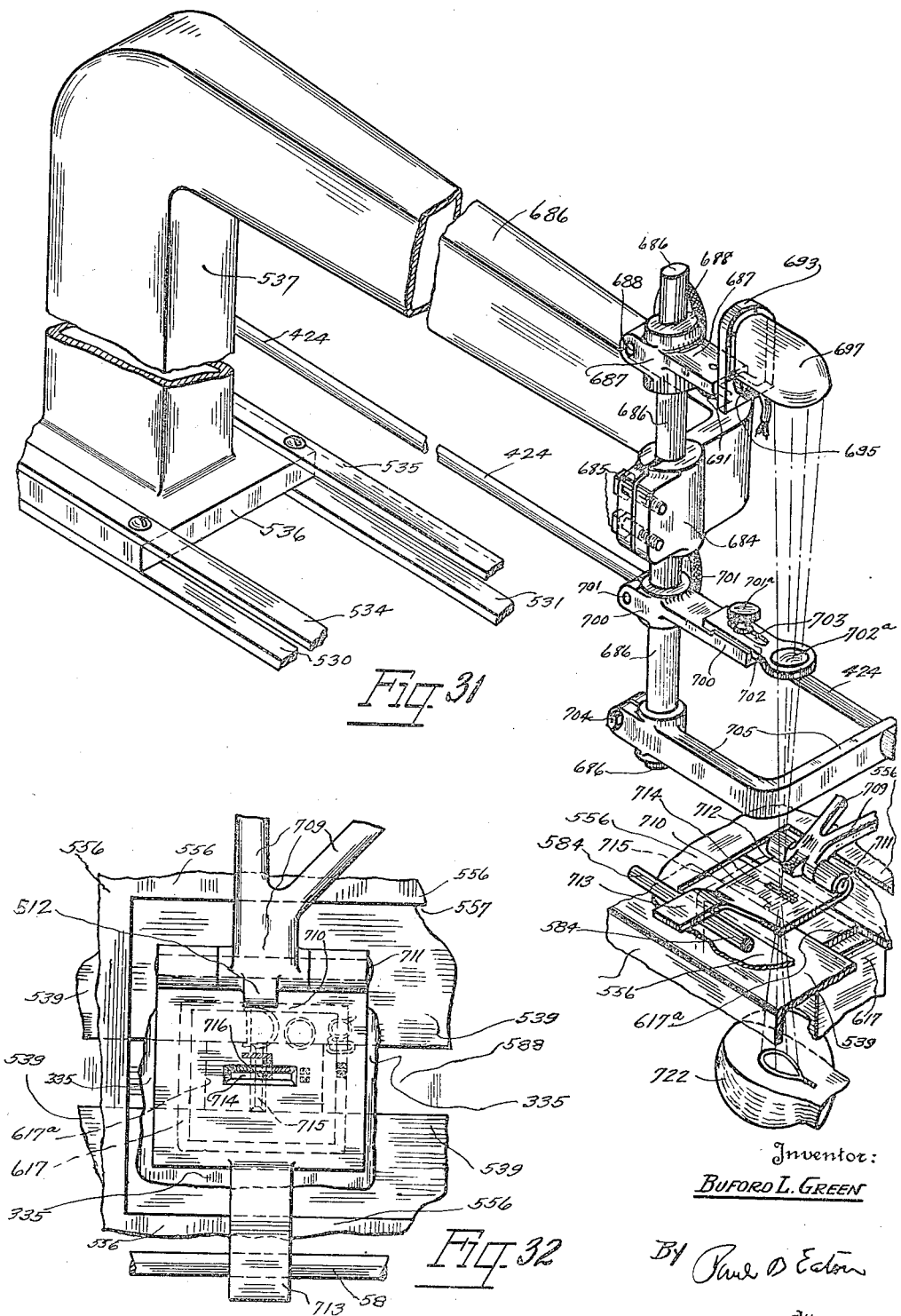

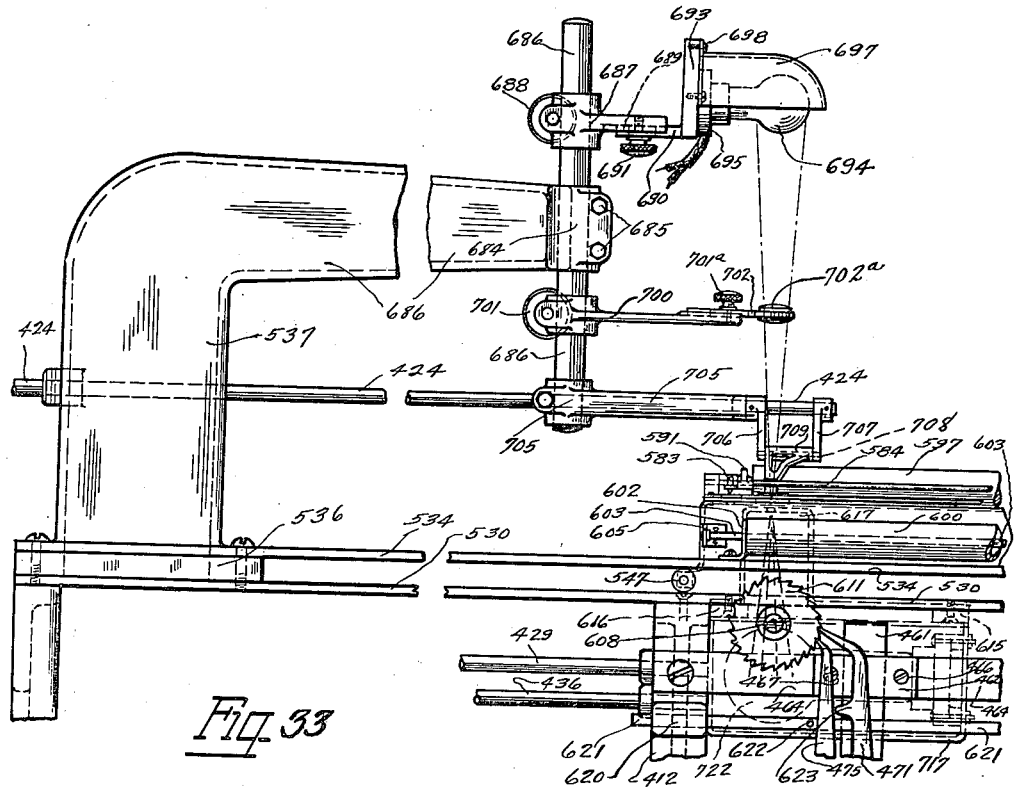

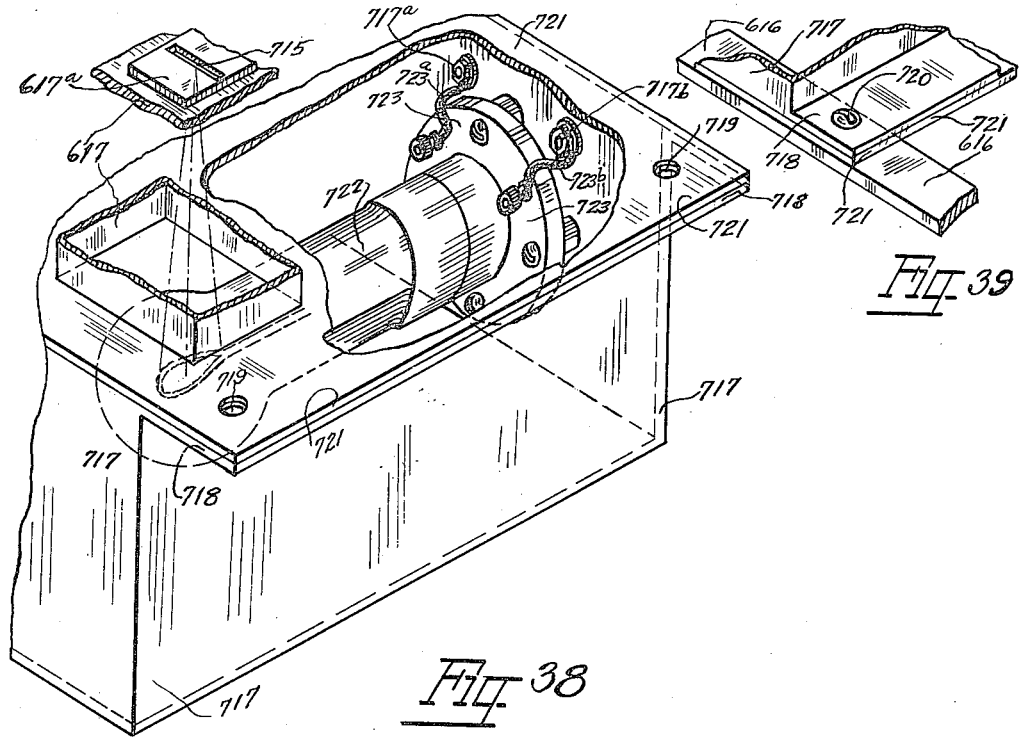

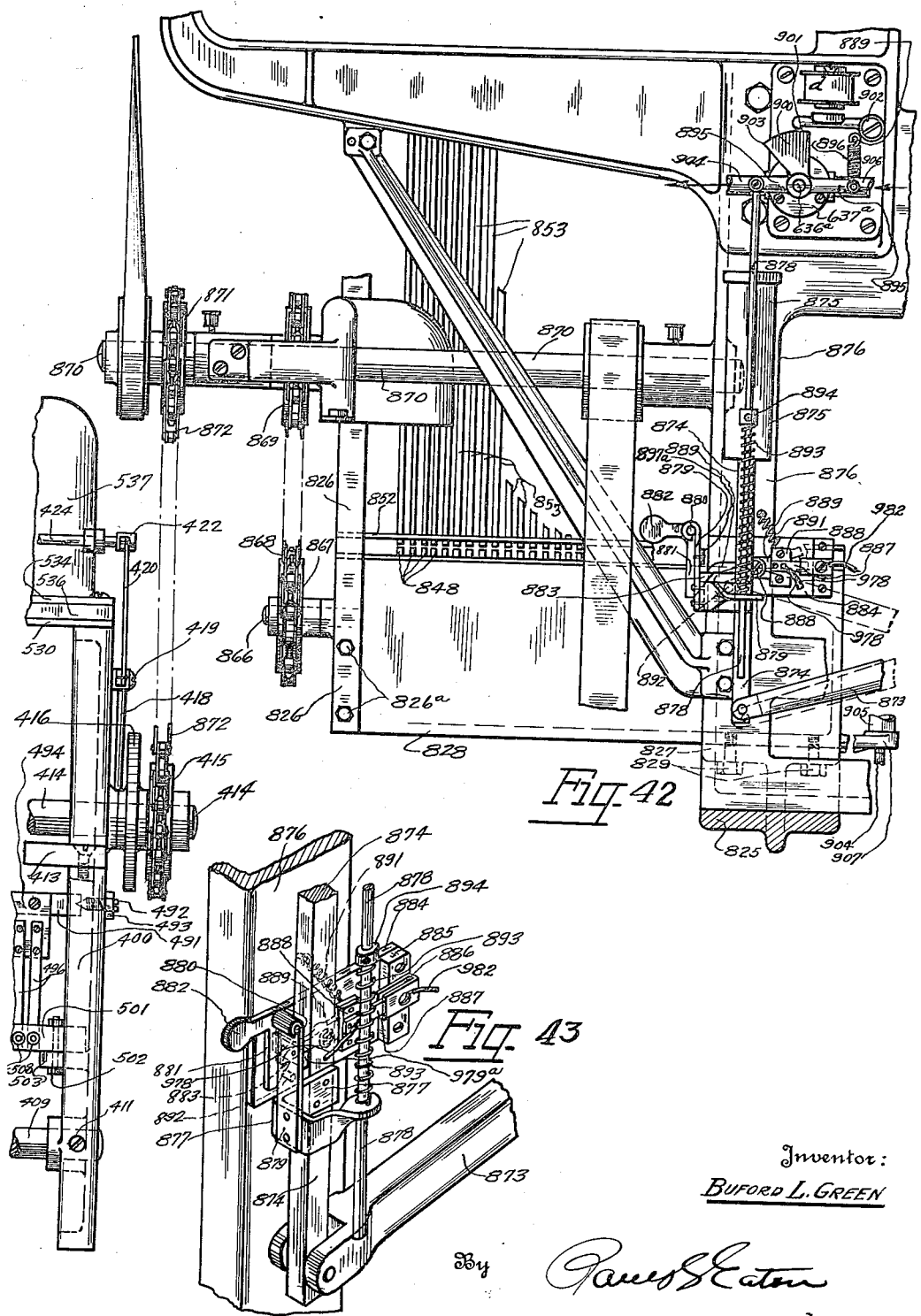

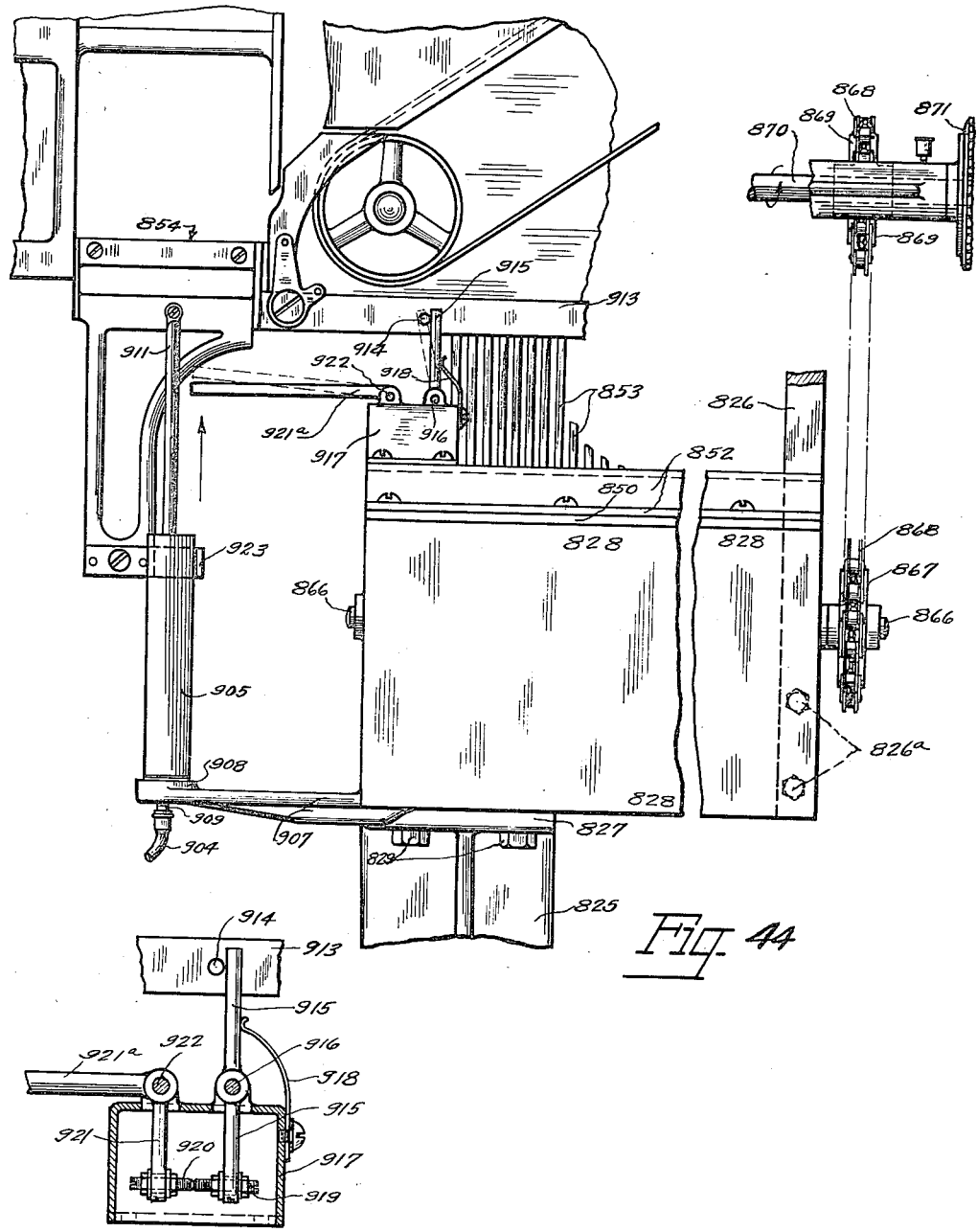

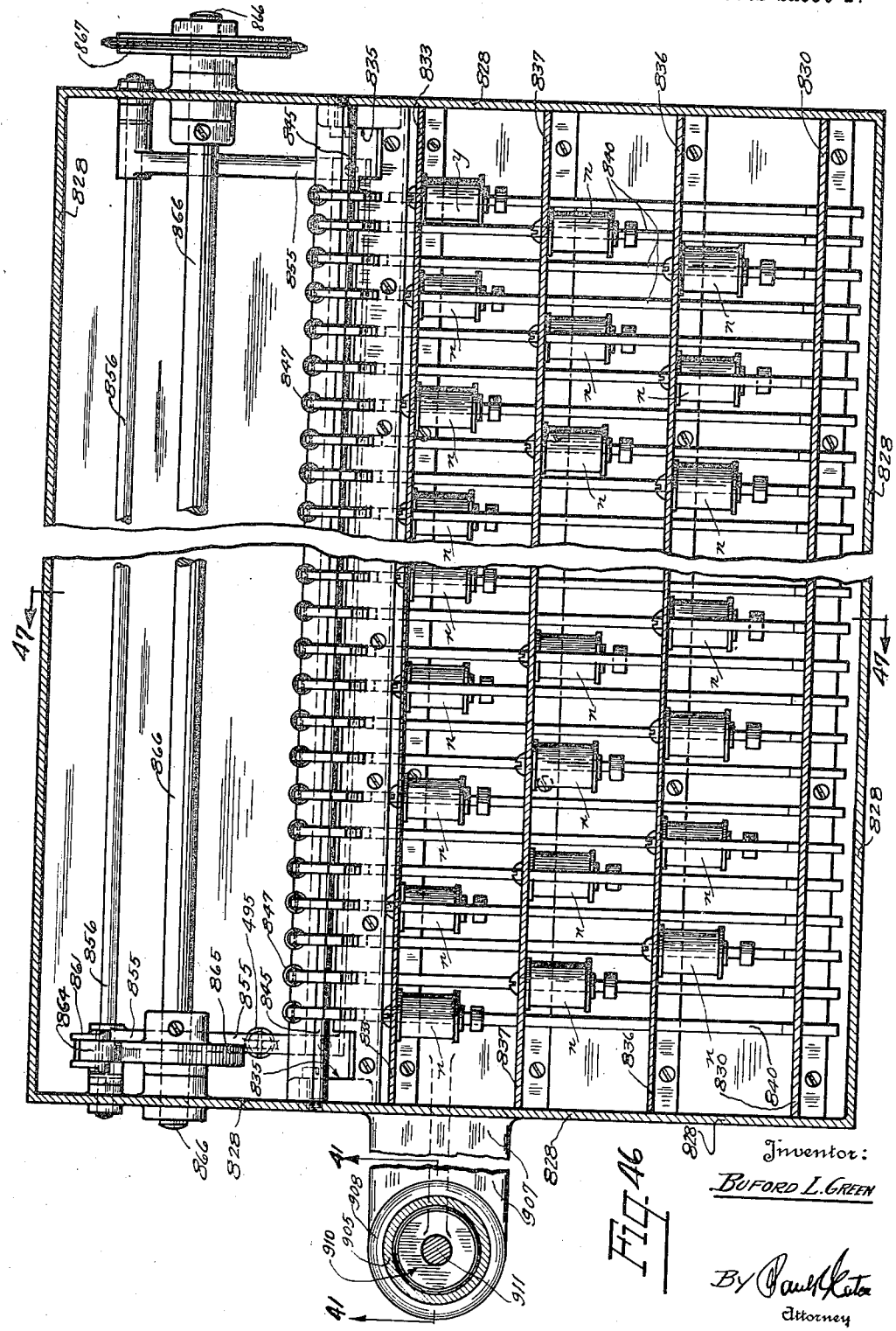

Inventor:
BUFORD L. GREEN

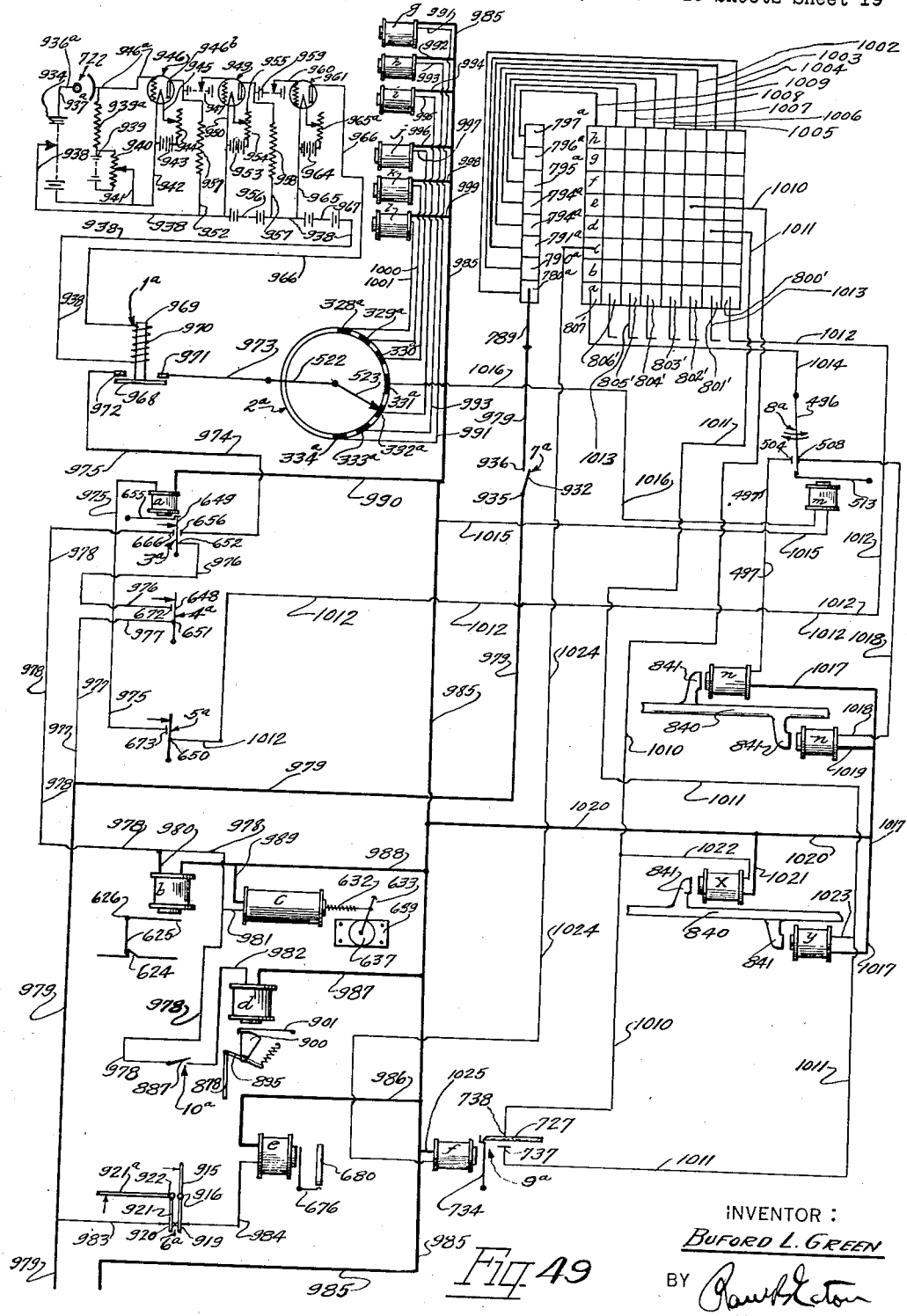

Patented Jan. 12, 1937

2,067,182

UNITED STATES PATENT OFFICE 2,067,182

MEANS FOR AUTOMATICALLY SETTING TYPE IN TYPESETTING MACHINES

Buford L. Green, Charlotte, N. C., assignor to Semagraph Company, Dover, Del., a corporation of Delaware Application November 2, 1929, Serial No. 404,331
Renewed July 20, 1933

285 Claims. (Cl. 199—18)

This invention relates to means for automatically setting the type in type-setting machines, and more especially to the use of a control sheet which may be prepared by a reporter in a special typewriter, such as is disclosed in my co-pending patent application, Serial Number 426,854, having letters and code, which sheet is adapted to be later transferred to mechanism adapted to co-operate with the type-setting machine whereby the type-setting operation will be automatically performed without the necessity of the operation of the key board on the type-setting machine, by an operator.

An object of my invention is to provide means for setting type direct from a type written page without the necessity of a type-setting operator.

Another object of my invention is to allow a reporter or typist to write out a report and have a visible copy of the report as the same is made, and at the same time the report is written out there will be printed in combination with the visible copy certain code indicia so that when the written copy is transferred to a special apparatus adapted to cooperate with a type-setting machine, that the type-setting machine which is equipped with my mechanism will automatically set the type from the report written out by the reporter or typist.

Another object of my invention is to provide a special apparatus associated with a line-casting machine to operate from a control sheet having imperforate code matter thereon, so that said sheet can be transferred to the newspaper office and immediately placed in the special apparatus adapted to cooperate with the type-setting machine to automatically set the type without the necessity of a type setting operator.

It is also evident that an electric typewriter can be provided with type bars thereon to print the control sheet, or it can be printed, engraved or otherwise produced and forwarded to distant points, in the same manner as mats and electrotypes are forwarded for publication.

Another object of my invention is to provide a typewritten report having in connection with each letter a certain code which is adapted to be read by a special apparatus associated with the type-setting machine, so as to automatically set the type by the type-setting machine in using my specially prepared report, which comes from the typewriter, and said typewriter is adapted to be operated by any ordinary typist, and does not require the skill of a type-setting operator, it being evident that mistakes will be entirely eliminated because if a typewritten copy is written out and properly proof read, and rendered perfect before being transferred to the type-setting machine, that the type-setting machine will reproduce a perfect copy which will not require the necessity of a proof reader to go over the proofs as in the case where the personal equation of a type-setting operator enters into the operation of the type-setting machine.

Some of the objects of my invention having been stated other objects will appear as the description proceeds when taken in connection with the accompanying drawings, in which—

Figure 5 shows an end view of Figure 3 looking from the left-hand side of said figure;

Figure 6 is an end view looking from the right-hand side of Figure 4;

Figure 7 is an enlarged view of the upper portion of Figure 6;

Figure 8 is a view looking down on top of Figure 7;

Figure 9 is a cross sectional view taken along the line 9—9 in Figure 8;

Figure 10 is an enlarged detail view of the timer mechanism turned ninety degrees from the position shown in Figure 6;

Figure 11 is a cross sectional view taken along the line 11—11 in Figure 10;

Figure 14 is an isometric view showing a portion of the distributor mechanism which appears in the upper center of Figure 12;

Figure 15 is a perspective view of a portion of the right hand end of Figure 14;

Figure 16 is a cross sectional view taken along the line 16 in Figure 4;

Figure 17 is a cross sectional view taken along the line 17—17 in Figure 18;

Figure 18 is an elevation of magnet c and associated parts;

Figure 19 is a cross sectional view taken along the line 19—19 in Figure 21;

Figure 20 is a view similar to Figure 19 but showing the parts in different positions;

Figure 21 is a plan view of Figure 18;

Figure 22 is a cross sectional view taken along the line 22—22 in Figure 18;

Figure 23 is a cross sectional view taken along the line 23—23 in Figure 14;

Figure 24 is a cross sectional view taken along the line 24—24 in Figure 23;

Figure 25 is a cross sectional view taken along the line 25—25 in Figure 23;

Figure 26 is a view of the distributor reset cam on the main drive shaft;

Figure 27 is a side view of a cam on the main drive shaft associated with the shift mechanism;

Figure 28 is a cam on the main drive shaft for resetting the slides in the distributor mechanism;

Figure 29 is a cam on the main drive shaft for operating the photo-electric cell window;

Figure 30 is a view of a cam on the main drive shaft for operating the ratchet on the carriage;

Figure 31 is a perspective view of the immediate parts associated with the photo-electric cell mechanism;

Figure 32 is an enlarged plan view of the lower right hand portion of Figure 31;

Figure 33 is a side elevation of Figure 31;

Figure 34 is a cross sectional view taken along the line 34—34 in Figure 36;

Figure 35 is a view taken along the same line as Figure 34 but showing the parts in a different position;

Figure 36 is a plan view of one portion of the slides in the lower portion of the structure shown in Figure 14;

Figure 37 is a perspective view of one of the longitudinally disposed sliding bars the mechanism shown in Figures 34 to 36 inclusive;

Figure 38 is a perspective view of the housing for the photo-electric cell and associated parts;

Figure 39 is an inverted view of a portion of the photo-electric cell housing and a support therefor;

Figure 40 is a cross sectional view taken along the line 40—40 in Figure 12;

Figure 41 is a cross sectional view taken along the line 41—41 in Figure 46;

Figure 42 is a view of the rear portion of one end of a line casting machine showing a part of my invention attached thereto and showing the connection to the other portion of my invention which is associated with the line-casting machine;

Figure 43 is an isometric enlarged view showing a portion of the mechanism in the lower right-hand corner of Figure 42;

Figure 44 is a view looking from the other side of Figure 42;

Figure 45 is a cross sectional view thru the switch 6a in the central portion of Figure 44;

Figure 46 is a cross sectional view taken along the line 46—46 in Figure 47 with the central portion being omitted;

Figure 49 is a view of the electric wiring diagram associated with the portion of the invention which is adapted to cooperate with the line casting machine.

Figure 1:
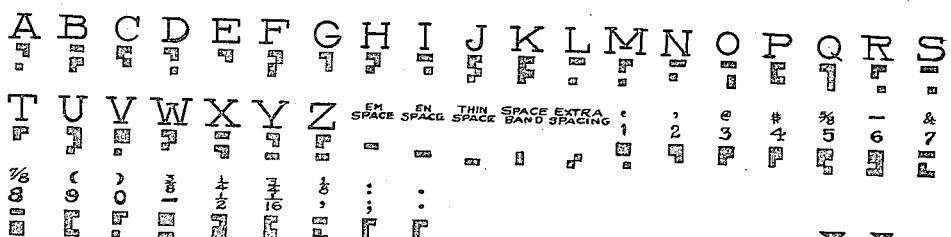
Figure 1 is a view of the alphabet showing the same in capital letters with my code associated therewith.

The special typewriter mechanism for producing a typewritten copy having code thereon, which is adapted to be used in a special apparatus adapted to operate in connection with a line-casting machine being fully set forth in my co-pending application, Serial Number 426,854, which is a divisional application of this application. I shall now endeavor to describe in detail this special apparatus which is to be associated with a line-casting machine.

The reference characters 400 and 401 indicate the end frame pieces of this machine, the member 400 having integral therewith cross pieces 402 and 403, and the member 401 having the cross-pieces 404 and 405 integral therewith.

Extending from the upper front portions of the members 400 and 401 are portions 406 and 407. These portions 406 and 407 are adapted to support among other things the carriage mechanism which will be later described. These end frame members 400 and 401 are secured to each other to form a framework by means of shafts 408, 409 and 410, said shafts being fixedly secured in the end portions 400 and 401 by any suitable means, such as screws 411. To the shaft 410 is secured a support 412 which is adapted to support the carriage mechanism and the central portion of the other mechanism extending across, and located in the central portion of my machine. Secured on the back top portions of frames 400 and 410 is a broad plate 413 which is adapted to support the distributor mechanism to be later described and the amplifier and the relay, all of which will be described in proper places.

Rotatably secured in the lower portion of the sections 406 and 407, which are at the top of the end frame members 400 and 401 is the main drive shaft 414. This drive shaft has on one end thereof a sprocket wheel 415 which is adapted to be driven by the intermediate drive shaft of the line casting machine by a sprocket chain 872. Fixedly secured adjacent the sprocket wheel 415 is a cam member 416 which is adapted to rotate at all times with the main drive shaft 414. This cam is adapted to operate the photo-electric cell window 710 by means of a roller 417 which is rotatably mounted on the lower end of a bell crank lever 418 which lever is pivotally mounted in the upper portion of the section 406 on the frame 400 by means of a screw 419. A tension spring 418a causes the roller 417 to follow cam 416. To the other end of this bell crank lever 418 is pivotally secured a link 420 as at 421, and the upper end of this link 420 is pivotally. secured to a lever 422 as at 423, which lever is fixedly secured on a shaft 424 which operates the movable window 710 which will be presently described.

Fixedly secured on the main drive shaft 414 and immediately on the other side of the framework 400 from the cam 416 is a cam 426 for operating the re-set mechanism of the selector and following this cam is a roller 427 which is rotatably mounted on the lower end of lever 428, fixedly secured on shaft 429. Shaft 429 is rotatably mounted at its ends in the portion 406 and by the support 412, the lever 428 serving as a collar at one end to prevent end-wise movement, and a collar 430 is secured at the other end to prevent end-wise movement also. The lever 428 is pulled against the cam 426 by a tension spring 428a which has one end secured to lever 428 and the other end thereof is secured to frame 406.

Fixedly secured intermediate the ends of shaft 429 are levers 431 and 432 which project downwardly and are adapted to operate the transverse slides which will be later described in connection with the description of the distributor mechanism.

Figure 3:
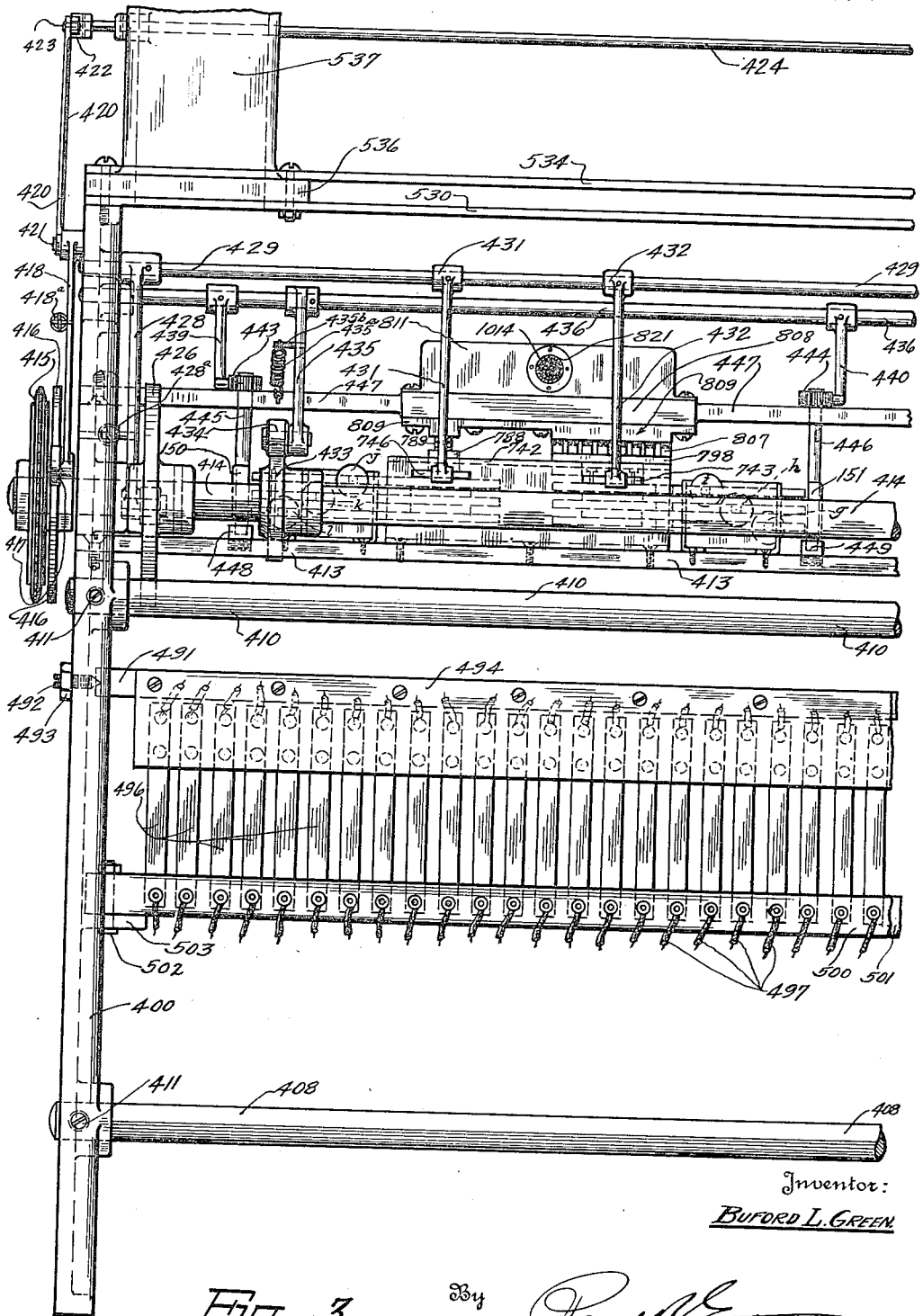
Figure 3 is a front elevation of the left-hand end of my mechanism which is adapted to be associated with the line-casting machine.

By referring to Figure 3 it is seen that slightly to the right of the cam 426 which has just been described, is another cam 433 for operating another portion of the re-set mechanism for the selector or distributor mechanism. Cam 433 is fixedly secured on the main drive shaft 414, and following this cam is a roller 434 which is rotatably mounted in the lower end of lever 435, fixedly secured at its upper end to a transversely disposed shaft 436. Shaft 436 is rotatably mounted at its ends in the portion 406 and the center support portion 412. Collars 437 and 438 are secured on the shaft to prevent endwise movement. Fixedly secured on shaft 436 are gear segments 439 and 440. These gear segments have teeth 441 and 442 thereon, which are adapted to engage pinions 443 and 444, fixedly secured on the upper ends of shafts 445 and 446, which shafts are rotatably supported by transverse support 447 and bearings 448 and 449, which are supported by the plate 413. Just above the bearings 448 and 449 there are fixedly secured to the shafts 445 and 446 fingers 450 and 451, which are adapted to be operated at times to reset the longitudinally disposed sliding bars 773, 774, 775, 773a, 774a and 775a of the selector mechanism, which will be later described.

The roller 434 is caused to follow cam 433 by spring 435a which is secured on pin 435b on lever 435 and has its other end secured to bar 447.

The means for operating the escapement mechanism of the carriage will now be described.

Figure 4:
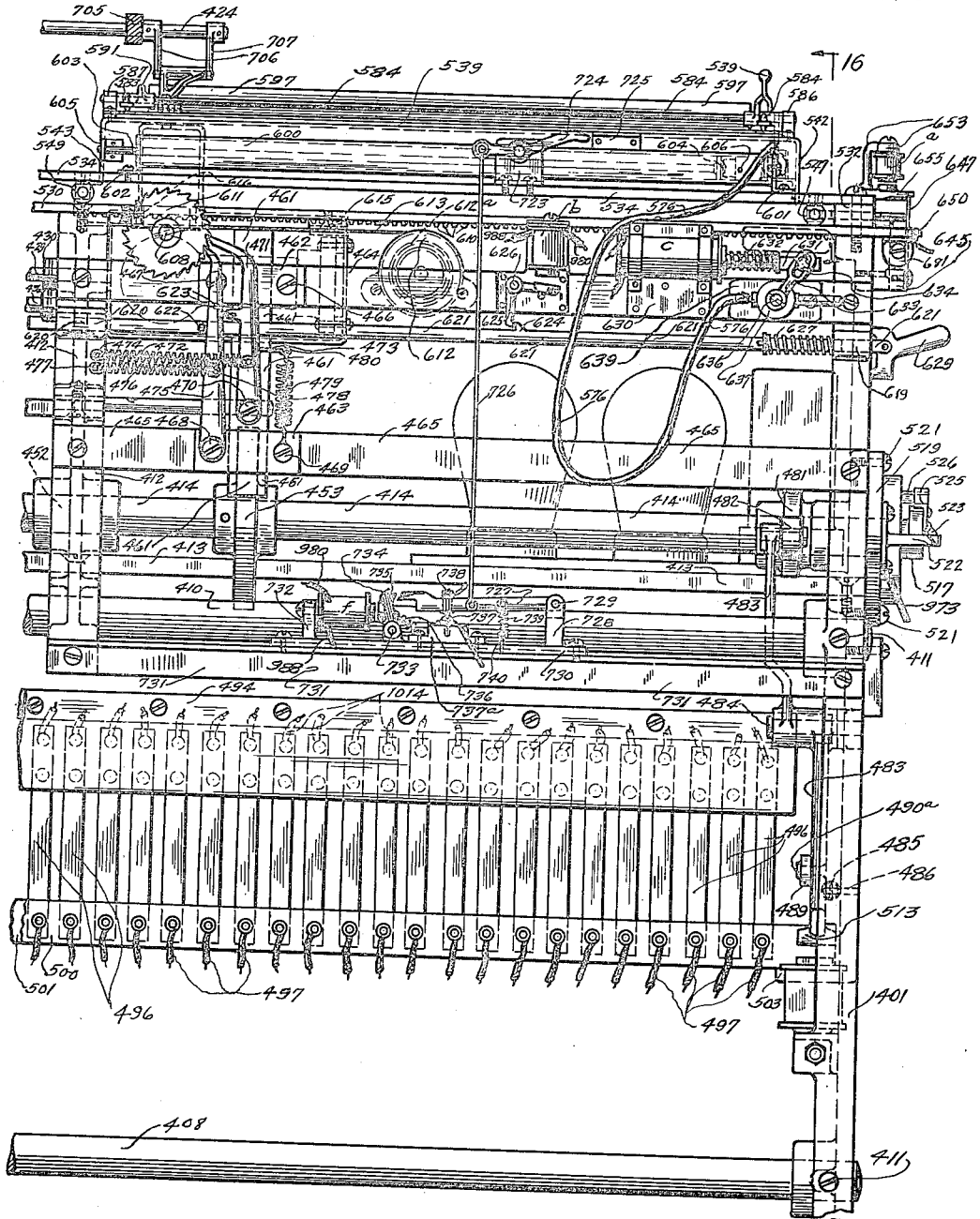
Figure 4 is a front elevation of the right-hand end of my mechanism which is adapted to be associated with a line casting machine.

The central portion of the drive shaft 414 is supported in the bearing portion 452 which is integral with the central support member 412, and to the right of member 412 in Figure 4 is a cam member 453 which is fixedly secured on the drive shaft 414. Adapted to follow the cam 453 is a roller 454 (Figure 6) which is rotatably mounted in a lever 455 intermediate its ends, and by referring to Figure 6 it will be seen that the right-hand end of this lever, or the back portion of the lever looking from the front of the mechanism is pivotally mounted on a pin 456. This pin 456 is secured in the central support member 412, and the lever 455 is loosely mounted thereon by means of collars 457 and 458. The other end of this lever 455 is pivotally connected to a link 459 and the other end of link 459 is pivotally connected to a projection 460 which is integral with a slide 461, which slide is supported for vertical sliding movement by blocks 462 and 463 secured on longitudinally disposed support members 464 and 465. Blocks 462 and 463 are secured to the supports 464 and 465 by means of screws 466, 467, 468 and 469. A screw 470 is secured in the vertically disposed bar 461 and is adapted to move the carriage mechanism which will be later described. This dog is adapted to be held in normal position by a spring 472, which is secured on a pin 473 on the dog, and the other end of this spring is held by a pin 474 which is mounted in the central support member 412. Another dog 475 is pivotally secured on the screw 468 which is mounted on the block 463, which is on the bar 465. This dog is adapted to press at all times against a ratchet wheel 611 of the carriage mechanism which will be later described, and this dog is held against the ratchet wheel by means of a spring 476 which is secured to a pin 477 in the central support 412, and the other end of this spring is secured to a pin 478 in the dog 475.

Secured to the screw 469 is a tension spring 479 which has its other end secured to a hook 480, which is secured in the vertically mounted sliding member 461. The purpose of this arrangement is to normally press the member 461 downwardly which causes the roller 454 to follow its cam on the main drive shaft at all times, to operate the dog 471.

Also mounted on the main drive shaft 414 in close proximity to the end frame member 401 is a cam 481 against which a roller 482, in the upper end of lever 483 is adapted to press. This operates the shift mechanism 489, 490 and associated parts, see Figure 6. Lever 483 is pivotally mounted on a pin 484 and near the lower end thereof is a tension spring 485 which has one end thereof connected to the framework as at 486, and the other end thereof connected to the lever as at 487, and immediately below this end 487 is a pin 488 to which is pivotally mounted a link 489. The other end of the link 489 is pivotally connected to the lower end of a lever 490 as at 490a which lever has the other end thereof fixedly secured to a bar 491, pivotally secured in the end frame members 400 and 401 by means of cone point screws 492 secured by nuts 493. Figure 3 shows one end of the mechanism, the other end of the mechanism in Figure 4 being the same, but not being shown on account of being obscured by other parts. Secured to this bar or plate 491 is an insulating plate 494 on which are fixedly secured metallic fingers 496, each one of these fingers 496 forming a part of a circuit, which is adapted to be operated by my mechanism to control the placing in the line of type certain characters by the line-casting machine, such as high case or low case characters.

Mounted in close proximity in the lower ends of the metallic fingers 496 are two longitudinally disposed members 500 and 501, said members 500 and 501 being made of any suitable insulating material, and being secured at their ends to the frame members 400 and 401, by means of screws 502 which are secured in projections 503 which are integral with the frame members 400 and 401. The bar 500 has therein a plurality of contact points which penetrate the bar 500, said contact points being designated by the reference character 504 there being a contact point for each metallic finger 496. On one side of these contact points 504 the metallic fingers 496 are adapted to press, and on the other side of the bar 500 the wires 497 are adapted to be connected, each of said wires to be lead to a magnet $n$ in Figure 47, which will be later described.

The bar 501 is identical to bar 500 and has the same number of contact points 508 thereon as are present on 501, and a wire 1018 leads from each of these contact points to a certain magnet $n$ in Figures 46 and 47, which will be later described. It might be here stated that the bar 501 has therein the contact points on which the metallic fingers 496 will rest when a capital letter is to be cast in the line by the line-casting machine, and the bar 500 will have the metallic fingers 496 resting against its contact point when letters of small case are being fed into the line by the line-casting machine.

Secured to the end frame member 400 is a support 510 which is adapted to support on one end thereof a bracket 511, and pivoted in the upper end of this bracket as at 512 is an armature 513 which has a projection 514 on its end, which is adapted to engage the lower end of the lever 483, when the cam 481 forces the lever to the position shown in Figure 5. When the lever is in the position shown in Figure 5 the projection 514 is adapted to engage the lower end of the same and to hold it in the position shown in Figure 5 due to the fact that the compression spring 515 forces the armature 513 upwardly, said compression spring being mounted around the screw 516. This screw is slidably mounted in the armature 513, and the lower end thereof is threadably mounted in the support 510, and the length of the screw is such as it allows the armature to travel to its uppermost position as shown in Figure 5, and then when the magnet m is energized which will be later described, this armature 513 is drawn downwardly releasing the lever 483 from the projection 514, which allows the fingers 496 to be pulled over against the contact points on the bar 500, by means of the pull of the spring 485, the operation of which will be set forth in the method of operation, but it might here be stated that when such operation does take place it causes the fingers 496 to press against the contact points 504 of the bar 500 to cause the lower case letters to be released by the type-setting machine.

Figure 12:
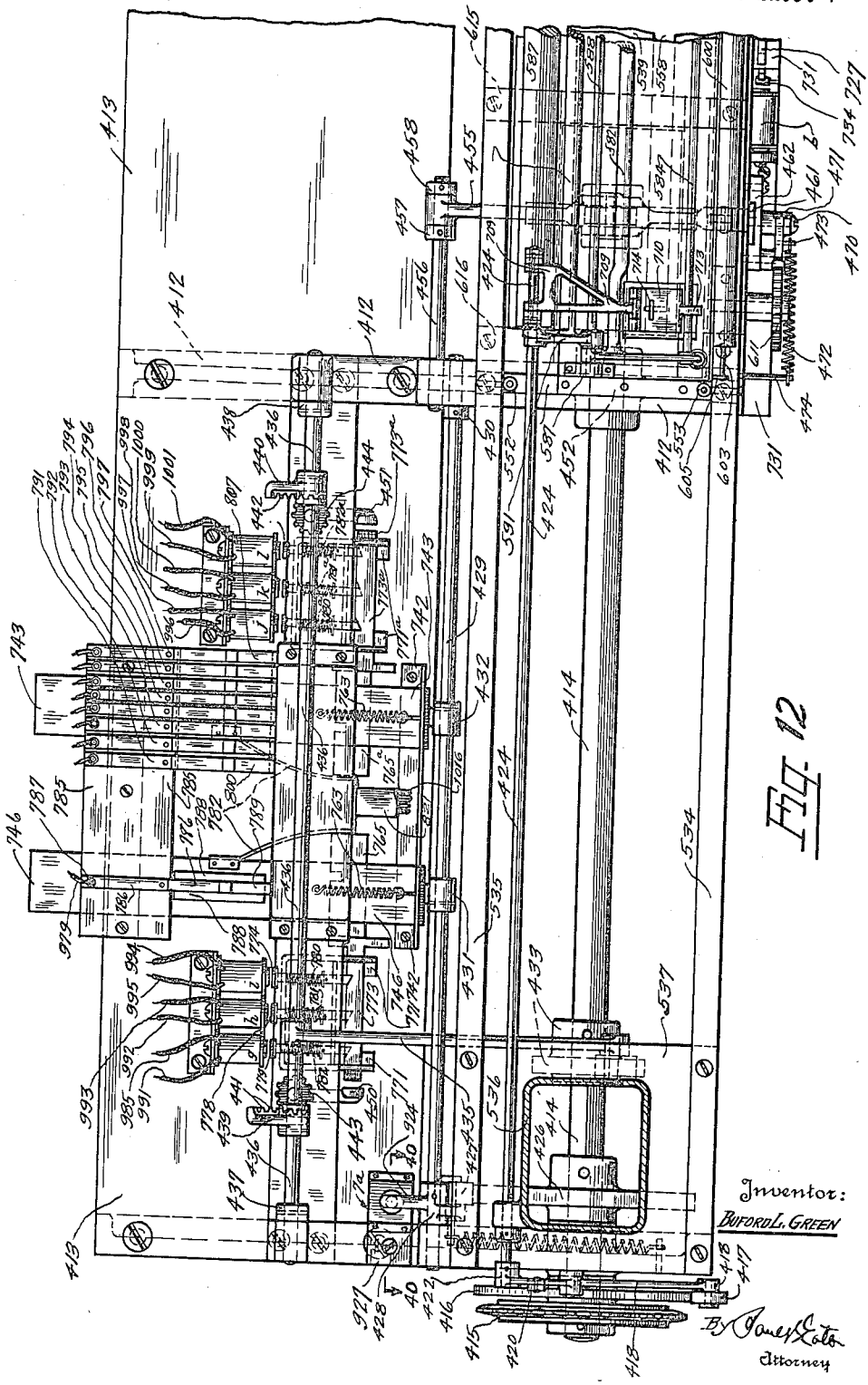
Figure 12 is a view looking down on the top of Figure 3 and a portion of the left-hand edge of Figure 4.

On the other end of the main drive shaft from that on which the sprocket wheel 415 is mounted I fixedly secure an insulated arm 517 by means of a screw 518 (see Figure 11), and loosely fitting around this drive shaft and secured to the framework of the machine is an insulating casing 519 which has slots 520 therein, through which screws 521 are adapted to pass to secure the same to the framework 401. Mounted around the periphery of this insulating member 519 are contact points 328a, 329a, 330a, 331a, 332a, 333a and 334a. These contact points represent the spaces beneath each letter bearing the same reference character with the suffix omitted, and the operation of which will be later explained. These contact points 328a to 334a are connected by suitable wires 1001, 1000, 997, 995, 993 and 991 which will be later described and explained in the wiring diagram to lead to the magnets g, h, i, j, k, and l in the distributing or selector mechanism which is shown in Figure 12 all except one, and the wire 1016 from contact point 331a goes to the magnet m in the lower portion of Figure 6, all of which will be later described. On the outer periphery of the insulating casing 519 is mounted a spring contact member 522, which projects over and rests at all times on a spring contact member 523 which is secured on the insulated arm 517 by means of screws 524, which screws also penetrate a brush holder 525, which has secured thereon metallic gauze brush 526 which is adapted to consecutively form contact with the contact points 328a to 334a inclusive as the drive shaft rotates. (See Figures 10 and 11).

*Carriage supporting means*

Mounted at the top of the portions 406 and 407 are longitudinally disposed supporting bars 530 and 531, and where these supporting bars join to the end 407 are spacing blocks 532 and 533, and on top of these spacing blocks are secured other longitudinally disposed bars 534 and 535 which are similar to the bars 530 and 531. At the other end of these supporting bars there is mounted between them the base 536 of the supporting arm 537 for the mechanism for holding the light and lens and associated parts which are adapted to cooperate with the photo-electric cell and window mechanism, which will be presently described.

The bars just described are adapted to support the carriage mechanism of my device, which carriage mechanism comprises the casing 538, which has a top portion 539, and side wall portions 540 and 541 and end portions 542 and 543, with the bottom thereof being open. These end portions at their lower edges are turned outwardly, and are secured to transversely disposed bars 544 and 545, which project outwardly between the supporting bars 530 and 534 on one end of the machine and between bars 531 and 535 on the other end, and have rollers 546 and 547, 548 and 549 secured thereon, which press against the innermost surfaces of the supporting bars. Suitable rollers 550, 551, 552 and 553 are secured on the members 544 and 545, and are adapted to press against the inner edges of the members 534 and 535, so that it is seen that the arrangement of rollers insures a perfect alinement of the carriage mechanism and causes it to move evenly between the supporting bars.

Secured at each end of the top portion 539 are strips 554 and 555, on which plate 556 is secured which forms a passageway immediately below the plate 556 for the control sheet 335 which is produced by the typewriter mechanism, described in said co-pending application. This plate member has a slot 557 extending therealong in which the window mechanism 710 is adapted to slide to press against the paper 335, and the top 539 has a narrower slot 558 which serves to allow a beam of light to pass to the photo-electric cell beneath the window mechanism, which will be later described.

Mounted between the bars 544 and 545 is a swinging member 559, (see Figure 16), said member having downwardly projecting lugs 560 at each end thereof, which are adapted to be pivotally secured on a rod 561 which has its ends secured in the supporting bars 544 and 545. The top portion of this portion 559 has the curved surface extending all the way across the carriage mechanism which is indicated by the reference character 562, which is adapted to advance a control sheet 335 through the carriage mechanism. The control sheet is fully described in said co-pending application and has a plurality of cell controls 328 to 334 for each character which are printed at the same time the character is printed or written. This member 559 is adapted to be swung on its pivot 561 by means of a rod 563 which is pivoted thereto as at 564, this rod 563 having a collar 565 thereon, which is adapted to press against the side wall 541 to limit its inward movement, and on the inside of the casing 538 there is secured around this rod 563 a compression spring 566. A collar 567 is secured to the other end of spring 566, said collar having a downwardly projecting portion 568, which is adapted to fit against the end of a screw 569, which is adjustably secured to the side wall 541, and locked into position by means of nuts 570. The other end of the rod 563 has a piston 571 secured thereto, which piston is adapted to work in cylinder 572 which is integral with another cylinder 573, there being a hole 574, which causes communication between the cylinders.

Figure 13:
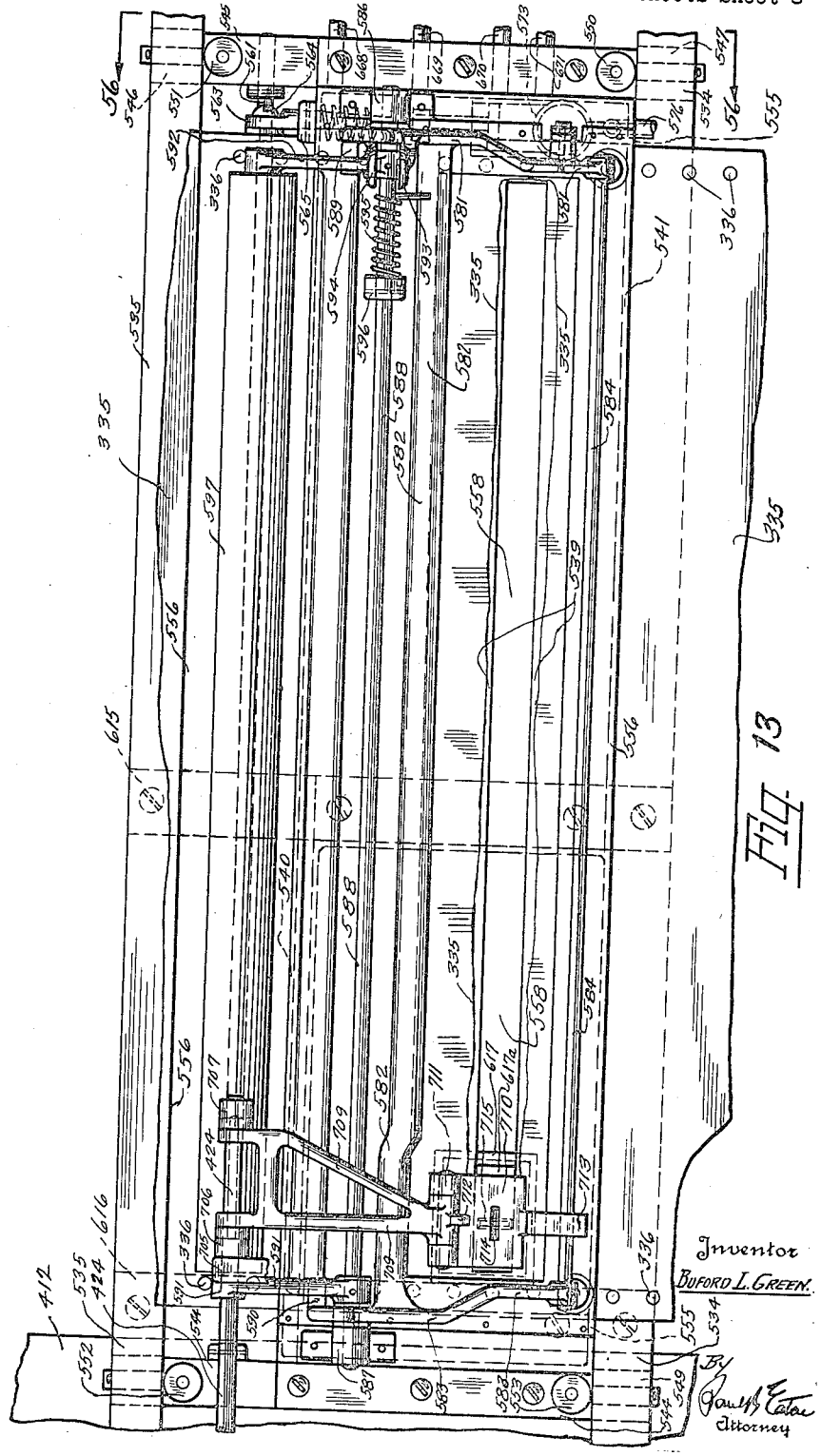
Figure 13 is a view looking down on Figure 4 and showing the top central portion thereof.

The cylinders 572 and 573 are supported by the end wall 542 by means of a bracket portion 575, and compressed air or any other compressible fluid is adapted to be fed to the lower end of cylinder 573 by means of a pipe or tubing 576. In the casing 573 a piston 577 is mounted on the lower end of which rod 578 projects upwardly through the upper portion of the carriage mechanism casing, and is pivotally connected as at 579 to the lever 580, which is composed of the parts 581, 582 (see Figure 13), 583 and 584. The ends of members 581 and 583 have downwardly projecting pins 585 which are adapted to fit into the holes 336 in the control sheet 335. Mounted on each end of the carriage mechanism casing 538 are brackets 586 and 587, and in these brackets is loosely mounted a shaft 588 which runs from one to the other. In close proximity to the brackets 586 and 587 are pivotally mounted the ends of members 581 and 583, these members having projections 589 and 590 which hook beneath levers 591 and 592 which are fixedly mounted on the shaft 588. The members 581 and 583 have an upwardly projecting arm 593 thereon. The arm 592 has an upwardly projecting portion 594 so that it is seen that when the levers 593 and 594 are pulled toward each other that it will raise the free end of levers 581 and 582 upwardly. A coiled torsion spring 595 is mounted around the rod 588, and is secured to a collar 596 fixedly secured on the shaft 588 at one end, and the other end rests on the portion 582 of the member 580, the purpose of this spring being to force the free end of arms 581 and 591 downward. In the free ends of arms 591 and 592 is rotatably mounted a roller 597 which is adapted to press on top of the control sheet 335 in order to enable the swinging quadrant 559 to pull the paper through the space below plate 556.

It is seen that this arrangement prevents the projections 585 from going into the holes 336 in the control sheet 335 completely while the roller 597 is resting on the paper as the projections 590 will engage the levers 591 and 592 and prevent this, but the compression spring 598 located in the air cylinder 573 will pull the projections 585 into the holes 336 raising roller 597 from off the control sheet, and thereby free the control sheet so as to cause the projections 585 to slip all the way into the holes 336 without tearing the holes and insuring that the control sheet is held in exactly the same position in which it was when the line of type was written or printed. Immediately outside of the front side wall of casing 540 is a cylinder 600, which is mounted on the bar 534 by means of brackets 601 and 602, and in this casing is mounted a piston rod 603 which has a piston 604 on the end thereof which projects into the casing, and the other end of the piston rod 604 is secured to a bracket 605 which is secured to the side wall portion 540 near one end thereof, and in the base of this cylinder is a leak hole 606, through which air escapes as the carriage is advanced to the right to begin at the first of a line on the paper. The purpose of this arrangement is to prevent the carriage from receiving a shock when it returns quickly to starting position.

Secured on the lower side of bar 530 is a housing 607 in which a shaft 608 is rotatably mounted, and on one end thereof a pinion 609 is fixedly mounted, which pinion meshes with a toothed rack 610 which is secured to the end members 544 and 545 of the carriage on which the supporting rollers such as 546 and 551 are mounted.

The other end of the shaft 608 has fixedly secured thereon a ratchet wheel 611 which is adapted to be operated by a dog 471 and held in position by a dog 475, as will be later described in the method of operation.

Secured on the inside face of bar 464 is a housing 612 in which a roller 612a is mounted which is the conventional mechanism as used in typewriters, and about this roller is wound a cord 613 which cord leads through a hole in the casing and to a pin 614 which is secured to the cross member 544. The purpose of this arrangement is to return the carriage to starting position.

Secured to the lower side of the members 530 and 531 are supporting members 615 and 616 and on these members is mounted the photo-electric cell housing 717 and a cover 617 which has holes 719 for securing the same to members 530 and 531, and the cover 617 has a slot 715 therein through which a ray of light can pass to a photo-electric cell 722 mounted therebelow.

Slidably mounted in bearing portions 619 and 620 is a rod 621, which rod has a pin 622 therein, which is adapted to press against the dog 475 to release it from the ratchet wheel 611, and this dog when released from the ratchet wheel is adapted to press against a projection 623 on the dog 471 to also release it from the ratchet wheel 611, which allows the carriage to return to its starting point, (see Figure 4). This rod 621 has a projection 624 thereon, which is adapted to engage a bell crank lever 625 which is pivotally mounted on a pin 626 which pin is secured to the bar 464, said bell crank lever being adapted to be operated by the magnet (b) to pull the rod 621 to the right in Figure 4 against a compression spring 627 to release the dogs as previously described. The rod 621 has pivotally secured in the end thereof a lever 629 which is placed thereon for the purpose of releasing the ratchet wheel by hand if desired.

To the right of the magnet (b) which has just been described in Figure 4, is mounted another solenoid (c) which is secured to a plate 630 which plate is secured on the bar 464. This solenoid has an extending rod 631 projecting therefrom with a compression spring 632 therearound. The normal tendency of spring 632 is to force the rod 631 to the position shown in Figure 4. On the free end of rod 631 a lever 633 is slidably mounted by means of a pin 634 being mounted in the end of rod 631 and being adapted to slide in slot 635 in the lever 633. This lever projects downwardly and is fixedly secured to a valve member 636 which is rotatably mounted in a valve housing 637, which valve housing is mounted on a bracket 639, which is secured to the bar 464. On one end of this valve housing 637 a feed pipe 638 is secured which is the air supply pipe that goes to any desirable source of compressed air or other compressed fluid. From the other side of the valve housing the tube 576 is led which tubing member is led from hence to the air cylinder 573.

The valve housing 637 has a port hole 640 therein, and the valve proper which is designated by the reference character 636 has holes 641, 642 and 643 therein, and by reference to Figure 19 it will be seen that with the parts in the position shown that the port hole 641 will be registering with the passageway leading to pipe 576, and the port hole 643 will register with the air supply pipe 638, and cause the air or other compressed fluid to pass through the pipe 576 to the valve housing 573, which will force the piston 577 upwardly until it passes the hole 574 when the air will escape into the valve housing 572 to force the piston 571 to cause the member 559 to swing to the right as seen in Figure 16. This advances the control sheet 335 through the carriage mechanism after having raised the projections 585 out of the perforations 336. The position as shown in Figure 19 is the position the parts will occupy when the solenoid (c) is energized, and when the solenoid is deenergized the valve mechanism will assume the position shown in Figure 20 on account of the compression spring 632, and this will allow the air to escape from the valve housings 572 and 573 through the tube 576 and through the port holes 642 and 643 out through the port hole 640 in the valve casing.

Secured to the portion 407 is an insulating block 645 with a projection 646 extending from the lower edge thereof, and on this projection 646 I mount three spring contact members 647, 648 and 649, and secured to these metallic contact members 647, 648 and 649 are the contact points 650, 651 and 652. Secured on the framework 407 is a bracket 653 which has mounted in the upper end thereof magnet (a). Pivotally secured as at 654 is a dog 655 which is adapted to hold the spring contact member 649 away from the contact point 666 which is mounted on the block 645 over against contact point 656. Secured to the block 645 is a bracket 667 which projects outside of the spring contact member 649, and has a contact point 656 secured therein.

Secured in the member 545 is a rod 668 which is adapted to project out against the spring contact member 649 and place the parts in the position shown in Figure 9 when the carriage is returned to the starting point. When the parts are in the position shown in Figure 9 the circuit between points 652 and 656 is closed. Mounted also in the member 545 are the rods 669, 670 and 671, the rod 669 projecting out against the spring contact member 648, and breaks the contact between the contact point 651 and the contact point 672, and prevents relay 1a from being energized until the window mechanism is over proper code beneath a letter on control sheet 335. The rod 670 projects outwardly when the carriage is in starting position and breaks contact between the contact point 650 and the contact point 673 to break circuit to magnet (a) which allows carriage mechanism to ride over a blank space at the beginning of a line on control sheet 335, and scan all blank portions without automatically returning the carriage to starting position as it would do at any other point on the control sheet.

The rod 671 is adapted to project against the upper end of member 674 when the carriage is returned after setting a line. This rod 671 projects against the portion 674 and prevents the rods 668, 669 and 670 from breaking the contact points as above described unless the magnet (e) energizes the projection 675 on the bell crank lever 676 which is pivoted as at 677 to cause the other end 678 of the bell crank lever to force the member 674 upwardly by means of the member 674 having slots 679 therein which are adapted to slide on the screws 680. This magnet is mounted on a bracket 681 which is secured by means of screw 682 to the bar 530 and associated parts.

The support 537 (see Figure 31) which has previously been described has a longitudinally projecting portion 683, and on the end thereof the same is curved to provide a clamping portion 684 which has the screws 685 therein by means of which a vertically adjustable shaft 686 is adapted to be held in position. Immediately above this portion 684 and on the shaft 686 is secured a clamping portion 687, which is adapted to be adjusted vertically on the shaft 686 by means of the screw 688. This portion 687 has a slide 689 on the lower side thereof, in which a member 690 is adapted to slide, said member 690 having a slot therein, which is not shown but which is similar to slot 703 through which a pin 691 is adapted to project, and which pin is threadedly secured in a hole 692 in the member 687, by means of which the portion 690 may be adjusted with relation to the portion 687. This portion 690 has an upwardly projecting portion 693 to which is secured a standard electric light socket 695 into which an electric light 694 is adapted to be placed. This socket is adapted to be connected to a source of electric current for illuminating the same. A shade member 697 is secured over the electric light and to the portion 693, by means of screws 698.

Below the clamping portion 684 and on the shaft 686 is adjustably secured a clamp member 700 by means of a screw 701, so that this member 700 may be adjusted vertically and laterally on the shaft 686, which lateral adjustment also is capable of being imparted to the member 687. A screw 701a is threadedly secured in the portion 700 and a lens holder 702 is adjustably secured to the portion 700 by means of the screws 701a penetrating a slot 703 in the lens holder and in this lens holder is mounted a lens 702a which is adapted to bring the light to a focus point on the code spaces 328 to 334 inclusive.

Secured in an adjustable manner on the lower end of shaft 686 by means of a screw 704, is an L-shaped member 705. This member 705 is given a right-angle turn and in the free end thereof it has rotatably mounted the rod 424, which is partially rotated by the cam 416, which moves intermittently the slot 714 over the spaces 329, 330 and 331 where it rests while the carriage is advanced a half-space and then moves over code spaces 332, 333 and 334, and which has been previously described. Secured adjacent to the portion 705 to the rod 424 the levers 706 and 707, and pivotally connected to the free ends of these levers as at 708 is a member 709, which has at the other end thereof a window plate 710 which is pivotally secured on a pin 711 which is secured in the end of the member 709, and the member 709 has a lug 712 which projects out over the window plate 710, and limits the upward motion of plate 710 with relation to the member 709. This window plate member has an upwardly and outwardly projecting portion 713 which projects over the rod 584, the purpose of this being that when the rod 584 is raised by the hand lever 593 or the piston 577 will cause the window plate to be raised upwardly by the upward movement of rod 584. When the lug 713 is raised upwardly it causes the window plate 710 to project against 712 which raises the part 709 upwardly and allows the window plate 710 to raise above the line travelled by the control sheet 335 when the same is inserted in the carriage mechanism.

The window plate 710 has a longitudinally disposed slot 714 which coincides with the transversely disposed slot 715 which is in the cover for housing member 717 for the photo-electric cell 722. It is thus seen at the point where these two slots 714 and 715 cross each other it leaves a small square opening 716 which is of a size sufficient to confine the ray of light from light 694 within one of the code spaces 328, 329, 330, 331, 332, 333 or 334 which are printed by the typewriter as code indicia on the control sheet 335.

The photo-electric cell mechanism is housed in a box 717 which is light-proof. The top of this box has on each side thereof the flanges 718 with holes 719 therein through which are adapted to be secured screws 720 to secure the box and cover to the cross-bars 615 and 616, and the top portion 721 being adapted to fit thereover which has an upwardly projecting portion 617. The photo-electric cell is designated by the reference character 722 which is mounted in a suitable socket 723, said socket being secured to one end of the housing 717 for the photo-electric cell. It is thus seen that the housing 717 and the top portion forms a light-proof casing with only the slot 715 admitting the light thereto. Binding posts 717a and 717b are secured in the side wall of housing 717 and wires 723a and 723b lead from the socket 723 to these binding posts.

Secured on the bar 534 is a bracket 723 (see Figure 4) on which is pivotally secured a dog 724, and secured to the side wall of the carriage is the L-shaped bracket 725 which is adapted to ride over the top of dog 724 as the carriage moves to the right in Figure 4, which causes the dog to raise upwardly a rod 726 which is connected at its lower end to a dog 727 which dog is pivoted at one end in a bracket 728 as at 729, which bracket is integral with base portion 730 which is secured to a bar 731. At the other end of this bracket 730 is a projection 732 which has secured thereto the magnet (f), and in front of this magnet is pivotally secured as at 733 a dog 734 which has a projection 735 thereon, which is adapted to rest under the free end of the dog 727 when the same is raised upwardly by the rod 726. This dog has connected thereto a tension spring 736 which is adapted to pull the projection 735 beneath the free end of dog 727 when the same is raised upwardly by the rod 726. A contact point 737 is mounted intermediate the ends of the bracket 730, being insulated therefrom by means of block 737a and a contact point 738 is mounted on said dog 727 and being insulated therefrom. The lower end of contact point 738 is adapted to engage the contact point 737 when the dog 727 is in lowered position. The dog 727 is adapted to be pulled to lowered position by means of a tension spring 739, which has its lower end fastened to the bracket 730 by means of a hook 740.

Secured on the plate 413 are brackets 741 and 742, which brackets project upwardly and have slidably mounted therein transverse slides of the distributors designated by the reference characters 743, 744 and 745 on one side and 746, 747 and 748 on the other side portion of the distributor or selector mechanism. Secured to the plate 413 beneath the slide 748 is a support member 749 which has projecting upwardly therefrom a lug 750 which acts as a stop for a pin 751 projecting downwardly from the bar 748, and this portion 749 together with the lug 750 and the lug 752 serve as a support and guide for one of the lower longitudinally disposed sliding bars 773, 774 and 775 of my mechanism, which will be presently described. The member 747 likewise has a downwardly projecting pin 752 which is adapted to fit against a projection 754 on the bar 748 when the bars 746, 747 and 748 are pushed to reset position. On the opposite side of these longitudinally disposed bars and on each side thereof are the lugs 755 between which the downwardly projecting pin 756 is adapted to project. The member 748 also has the pin 757 projecting downwardly therefrom. The bar 747 has the projection 758 projecting upwardly therefrom, which is adapted to press against the top longitudinally disposed bar as will be hereinafter described, and this bar 747 has lugs on each side thereof designated by the reference characters 759 which are similar to the lugs on the lower members. The bar 746 has a downwardly projecting pin 760 secured therein, which is adapted to abut against the projection 758 to return the middle bar 747 to the position shown in Figure 35. The top member 746 also has the square pin 761 which projects downwardly between the lugs 759. The bars 743, 744 and 745 and the bars running at right angles thereto have the same construction as that just described for bars 746, 747 and 748 and the bars 765, 766 and 767 associated therewith.

To each of the upper bars 746 and 743 there is secured a pin 762 to which a tension spring 763 is secured at one end thereof, the other end of this tension spring being secured to a hook 764 which is secured in the bracket 742. The purpose of this spring is to pull the bars against the levers 431 and 432, and cause the bars to follow said levers. Slidably mounted between the bars 746, 747 and 748 are the longitudinally disposed bars 765, 766 and 767, these bars having in one side thereof notches 768, 769 and 770, into which the pins 761, 756 and 757 are adapted to slide when they coincide with the notches 768, 769 and 770. Mounted on the plate 413 is a U-shaped housing 771 which has a vertically disposed partition member 772 therein, and the sliding bars 773, 774 and 775 are slidably mounted in the side wall portion of this U-shaped member 771, and the ends of these rods project against the levers 450 and 451. Each of these bars 773, 774 and 775 have notches 776 therein, into which rods 777, 778 and 779 are adapted to normally press by means of compression springs 780, 781 and 782. These bars 773, 774 and 775 are adapted to have one end thereof abut against the sliding bars 765, 766 and 767. Longitudinal sliding movement of these bars 765, 766 and 767 may be permitted, when the magnets g, h, i, j, k and l are energized to pull back the rods 777, 778, 779, 777a, 778a or 779a as the case may be to release these rods from the notches 776, which causes the rods 773, 774 and 775 to be pressed outwardly against the lever 450, or 451 as the case may be, and these bars are followed by the bars 765, 766 and 767 on account of the fact that the springs 782 press against the other end of these bars.

Each of the springs 782 are secured at one end to the bars 743 to 748 inclusive. In the description thus far I have described the bars shown on the right-hand end of Figure 14, but the magnets and bars cooperating with the U-shaped members 771 are identical on the other end thereof, as shown in Figures 12 and 3 and the same reference characters will apply to both parts with the suffix "a" added. By still referring to Figure 14 it is seen that an insulating plate 785 is secured on top of the bracket 741 which extends all the way across above the bars 746 to 748 and also bars 743 to 745. Immediately over the bar 746 there is secured a spring contact member 786 and at one end of this spring contact point member 786 is a contact point 787 to which the wire 979 is secured. Mounted on the bar 746 is an insulating block 788 on which is secured a spring contact member 789 and its free end projects upwardly and is adapted to engage certain contact points which will be presently explained. On the other end of the insulating block 785 and immediately above the bar 743 there are secured spring contact members 790, 791, 792, 793, 794, 795, 796 and 797, and mounted on the bar 743 is an extending insulated block 798, and on this block 798 there is fixedly secured a plurality of upwardly projecting contact members similar to 789, which spring contact members are represented by the reference characters 800, 801, 802, 803, 804, 805, 806 and 807.

The bar 447 has the enlarged portion 808 and to the lower side of this enlarged portion is secured a contact plate holder 809 by means of screws 810, and on top of this enlarged portion 808 is secured the casing 811 by means of the screws 812. This casing has a hole 813 in the side thereof into which the conduit 814 is secured, and through this conduit are led the wires 1002 to 1009 inclusive, from the contact points on the spring contact members 790 to 797 inclusive. The plate member 809 has an enlarged portion 815 into which the contact points 790a, 791a, 792a, 793a, 794a, 795a, 796a and 797a inclusive are mounted, the wires from the contact member 790 to 797 inclusive leading to these contact points 790a to 797a inclusive.

The member 809 has an enlarged portion 816 which is cut out to receive a contact block member 817, and the member 477 is hollowed out to accommodate the upper portion of this contact block member 817. In this contact block member 817 there is mounted a plurality of contact points insulated from each other by means of the insulating sections 818 and 819 with a section of insulation 820 extending all the way around this block member to shield the same from the portion 816. The rows of contact members collectively are designated by the reference characters 800', 801', 802', 803', 804', 805', 806' and 807'. Each of the contact members in sections, designated by the reference characters 800' to 807' inclusive are designated by the reference characters a, b, c, d, e, f, g, and h so that hereafter when we refer to contact point 802'f for example it will mean the contact point "f" in the row 802' as shown in Figure 24. From each of the sixty-four contact points shown in Figure 24, a wire 1014 is adapted to be led to each of the swinging members 496 as shown in Figures 3 and 4. The sixty-four wires leading from the sixty-four contact points are led out through the back of casing 811 in Figure 14 or from the front as seen in Figure 3 through a tube 821. It might here be stated that all of these sixty-four contact points do not have a wire leading therefrom as all of the points are not needed in the present type of line-casting machine, but I have devised this layout because some of the rows of contact points will have all of the contact points thereon in use and the wire leading therefrom, while others of the rows may not require a wire connected to each contact point, as the spring contact members 800 to 801 may not traverse all the way along the line of contact points in a line with which it is adapted to move.

A portion of the frame of a line-casting machine is shown in Figure 44 and is designated by the reference character 825. This together with the support 826 is adapted normally to support the standard key board of a line-casting machine. In using my complete invention, I remove this standard key board and insert in lieu thereof my electrically operated key board to be used in connection with the other features of my invention heretofore explained. I secure to the projection 827 the casing 828 of my special key operating mechanism, said casing 828 being secured to the portion 825 and support 826 by means of suitable screws 829, and 826a. By referring to Figure 47 it is seen that in this casing I mount a plurality of partitions and supporting members 830, 831, 832 and 833. On the upper edges of the members 830 and 833 I mount the plate 834 which is also secured to the casing 828 at one end, and at its other end to the cross-bar 835 which is secured to the side walls of the casing 828. To the members 831, 832, 833, 836 and 837 I secure suitable magnets (n) which are adapted to be energized by electric current from wires 497 or 1018 leading from the contact points on the bars 500 and 501, (see Figure 5). Slidably mounted in the portions 830 and 833 are a plurality of rods 840, there being one rod for each magnet, and the number of magnets is determined by the number of characters in the type-setting machine which are adapted to be placed into the line of type by the operation of these magnets. These rods 840 each have an arm 841 thereon, and an abutment 842 limiting the movement of any rod 840 away from its associated magnet by striking against the member 830.

Figure 47:
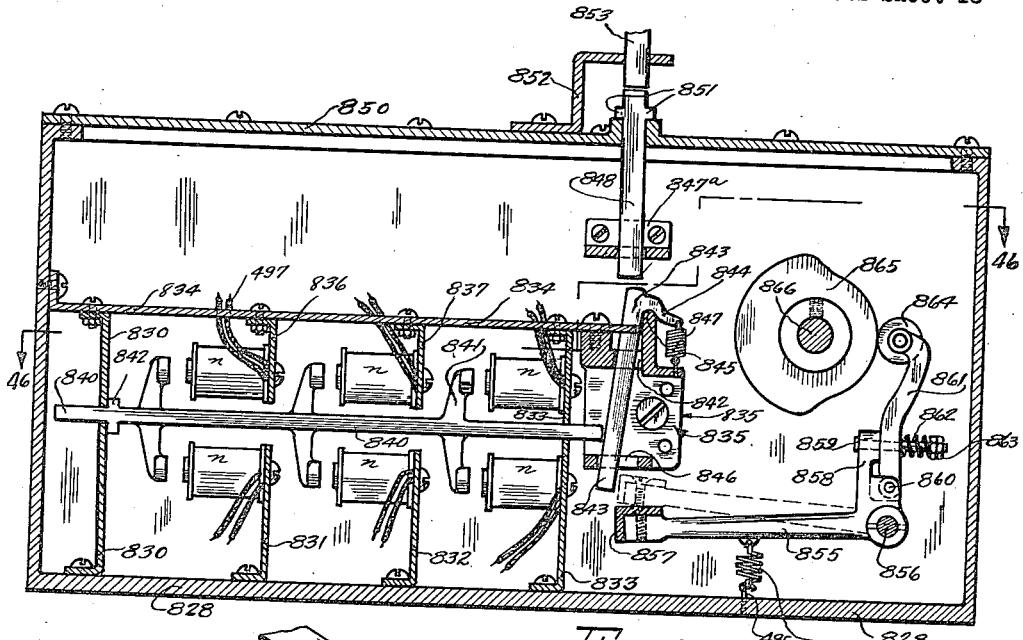
Figure 47 is a cross sectional view taken along the line 47—47 in Figure 46.
Figure 48:
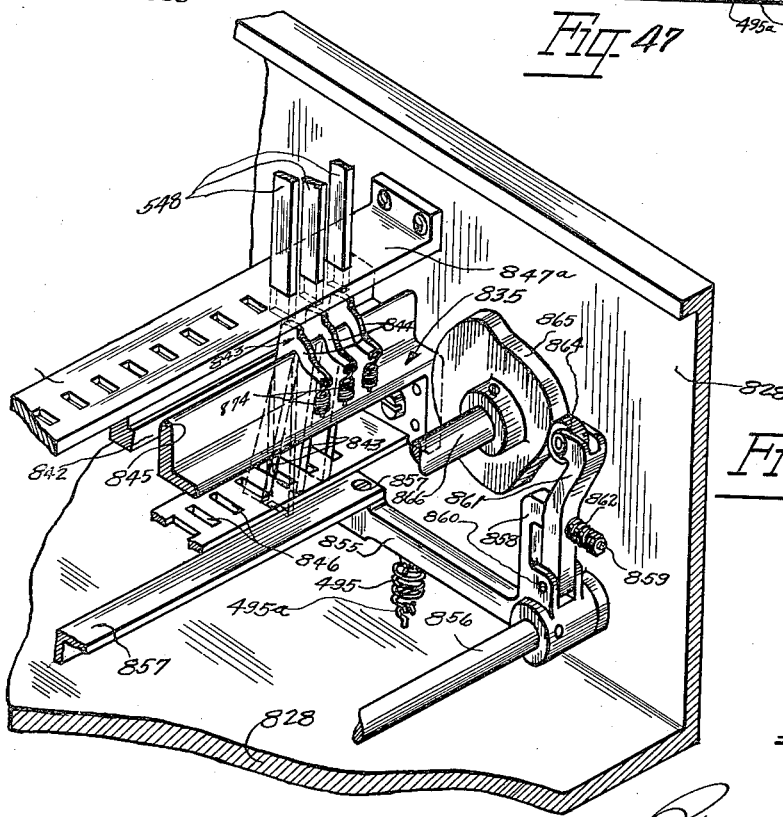
Figure 48 is an isometric enlarged view showing some of the parts disclosed in Figures 46 and 47.

The member 835 (see Figures 47 and 48) has a slot 842 therein, in which a plurality of bell crank levers 843 are adapted to be loosely mounted, each of said levers having the hooked over portion 844 which is adapted to rest on the portion 845 on the member 835 and the lower end of the bell crank lever 843 is adapted to penetrate slots 846 in the lower portion of member 835 and to the portion 844 of each of the bell crank levers 843 is secured a tension spring 847, which has its other end secured to the member 835, which tends to normally force each bell crank lever 843 to the position shown in Figure 47. Slidably mounted in a transversely disposed bar 847a which spans the case 828 is a plurality of vertically disposed members 848, there being one for each one of the magnets, magnet rods, bell crank levers which are associated with each of the magnets. These members 848 project upwardly through the top 850 of the casing, and have projections 851 thereon to limit their downward movement. Secured on the top surface of cover 850 is the transversely disposed elongated bracket 852, in which a plurality of key rods 853 are adapted to slide. These key rods are conventional equipment in a line-casting machine, and each key rod is adapted to control an escapement verge to allow a particular matrix to drop into the assembling mechanism 854, which is the conventional assembling mechanism on a line casting machine.

These vertically disposed rods 853 are adapted to be pressed upwardly by the mechanism in the casing 828 just described in combination with the bell crank levers 855 which are pivotally mounted on a rod 856, said levers 855 having secured on their free ends the transversely disposed bar 857 which is adapted to press against the lower ends of the bell crank levers 843, when they have been pushed into its path by the energization of the magnet associated with each of the rods 840. This bell crank lever 855 has an upwardly projecting portion 858 to which is secured a pin 859 and below the point of securing of pin 859 a lever 861 is pivotally secured as at 860 which is penetrated by the pin 859 and has a compression spring 862 therearound, held in place by nuts 863, and in the upper end of this lever 861 is a roller 864 which is adapted to follow at all times the cam 865 which is fixedly secured on the shaft 866. The roller 864 is made to follow its cam by the action of the tension spring 495 secured to the bell crank levers 855, and to the hook 495a in the base of the casing 828.

On the outer end of the shaft 866 is a sprocket 867, which is connected by means of a suitable sprocket chain 868 to sprocket 869, fixedly secured on the intermediate drive shaft 870 of a line-casting machine.

It is seen that when one of the magnets in the casing 828 is energized it will pull the arm 842 to cause the rod 840 to press against the lower end of a bell crank lever 843, and cause it to move within the line of movement of the bar or striking bail 857, so that when this bar moves upwardly it will push the bell crank lever 843 upwardly against the bar 848 which in turn will push the key bar 853 associated with the particular magnet upwardly to release a particular matrix from the magazine. It might be stated that the purpose of the compression spring 862 and associated parts is to allow the wheel 864 to follow the cam without exerting undue pressure upwardly on the key rods after they have reached the end of their upward stroke.

Near the end of shaft 870 there is secured a sprocket wheel 871 which is adapted to receive a sprocket chain 872, this sprocket chain being also mounted on the sprocket wheel 415 on my invention, adapted to cooperate with the line-casting machine so that it is seen that with one revolution of the shaft 870, I also impart one revolution to the main drive shaft 414 of my mechanism associated with the line-casting machine, and also one revolution to shaft 866 of the key board mechanism. The sprocket wheels 414, 871, 869 and 867 may be all the same size or of such sizes as to cause the same number of revolutions per minute in shafts 866 and 414.

The conventional cam lever 873 has secured to the free end thereof, the conventional delivery air cushion piston link 874 which projects upwardly and works in the conventional dash pot 875 which is mounted on the conventional framework 876 of the line-casting machine. Secured to this piston link 874 is a U-shaped bracket 877 (see Figures 42 and 43) which has in the end thereof slidably mounted a rod 878, and to the bracket 877 is mounted an upstanding member 879, and in the end thereof a pin 880 is secured, on which a bell crank lever 881 is pivoted, which lever has a counter-weight portion 882 on one end thereof, the other end having a projection 883 thereon. Secured to member 879 is a member 879a which limits the inward movement of the lower end of lever 881. On the member 878 is secured a plate 884 to which is secured an insulating block 885 and on this insulating block is secured a socket 886 which is adapted to receive a knife switch 887. This socket 886 has a wire 982 leading therefrom which goes to the magnet (d) located above the mechanism thus described. Pivotally mounted on a pin 888 which is secured in the block 884 is a lever 889, one end of which lever is adapted to be engaged by the projection 883 on the bell crank lever 881, as the piston rod 874 is raised upwardly. On the other end of this lever 889 an insulating block 890 is secured and on this block 890 the bracket 877 is secured, which has a wire 978 leading therefrom, which is led to magnets b, c and d.

The lever 889 is normally pulled upward at the end on which the knife 887 is mounted by means of the tension spring 891, which is secured to the member 876 at its other end. This tends to hold the knife 887 out of engagement with the socket 886 at all times except when the projection 883 engages the end of the lever 889 when the piston rod 874 moves upwardly as the delivery slide is latched up ready to deliver a line of type to the casting mechanism of the line-casting machine. When the end of lever 889 is released by the projection 883, the pin 892 limits its downward movement and prevents the spring 891 from pulling it too far upwardly to hold the ends of the lever at such a point where it can be engaged by the projection 883 on its upward travel. Secured around the rod 887 is a compression spring 983, the lower end of which rests against the bracket 879, and the upper end of which rests against the collar 894 fixedly secured on the rod 878. The purpose of this spring is to allow the rod 878 to operate the air valve means associated with magnet (d), and then to allow the lever 873 to have its full swing to check the line delivery slide. The upper end of rod 878 is pivotally connected to one end of lever 895, the other end of this lever has secured thereto a tension spring 896 which is secured to pin 897 on the plate 899 which is secured to the framework of the line-casting machine. The intermediate portion of this lever 895 is fixedly secured to the valve stem 636a which is mounted in the valve casing 637a which is identical in all respects on the interior thereof to the valve mechanism shown in Figures 18, 19, 20 and 22, and hence detailed drawings of the same are not considered necessary.

Integral with lever 895 is a segment 900 against the face of which is adapted to rest by gravity a dog 901 which is pivoted as at 902. The free end of this dog is adapted to engage a point 903 on segment 900 when the rod 878 is moved upwardly, which holds the valve in closed position. In this position it is also in exhaust position and allows the air coming through tube 904 from casing 905 in Figure 44 to exhaust through the casing 637a, as shown in Figure 20. The other side of this valve casing 637a has secured thereto a tube 906 which is connected to a conventional source of air supply for my entire mechanism. This valve mechanism just described is adapted to be opened by the magnet (d) when the same is energized at the same time as magnets (b and c), to pull the dog 901 from engagement with the point 903, and the spring 896 will cause it to assume an open position as shown in Figure 42. The circuit for this magnet which operates dog 901 is led through the circuit breaking mechanism 10a and socket in Figure 43, which has just been described.

Projecting outward from the member 825 is a bracket 907 on which is cast a threaded socket member 908 into which the lower end of casing 905 is adapted to be threadably secured, and this portion 908 has a hole in the lower central portion thereof, into which a nipple 909 is threadably secured and to this nipple a tube 904 leads from valve mechanism associated with the casing 637a as shown in Figure 46. This casing 905 has therein a piston 910 to which is secured a piston rod 911 whose upper end is connected to the assembling mechanism 854 as appears in Figure 44.

It is thus seen that when the magnet (d) is energized to reset the valve mechanism 637a shown in Figure 42 to reset position it opens the same and allows air to pass from supply pipe 906 through the valve and through supply pipe 904 into the casing 905 to force the rod 911 upwardly and thereby force the assembling mechanism 854 upwardly, because it is operated by hand in the conventional line-casting machine.

Conventional assembler slide 913 is shown in Figure 44 which has a pin 914 projecting therefrom adapted to engage the pivoted lever 915, as at 916 in the casing 917 which is mounted on the upper surface of casing 828. This lever is normally forced to the left in Figures 44 and 45 by a leaf spring 918 which is secured to the casing 917. The lower end of this lever 915 has an insulated contact point 919 therein, which is adapted to engage contact point 920, which is insulated from the bell crank lever 921 when the pin 914 has placed the lever 915 in the position shown in Figure 45. This bell crank lever 921 is pivoted as at 922 in the upper portion of the casing 917, and has an outwardly projecting portion 921a, which is adapted to be engaged by a portion 923 on the lower portion of the assembled mechanism 854 when the assembler mechanism is brought to elevated position. This switch is referred to in the wiring diagram as 6a.

It is thus seen that when the assembler mechanism is brought to elevated position and the portion 921a is raised, it breaks the circuit between the contact members 920 and 919. When bar 913 is advanced to the left in Figure 44 the contact between 919 and 920 will also be broken though the portion 921a may be in lowered position as shown in bold lines in Figure 44. Figure 45 shows the control switch which insures that the assembling mechanism of the line-casting machine must be in proper position before any current passes through the part of the mechanism which has heretofore been described, which is adapted to be associated with a line-casting machine.

The lever 428 which has previously been described (see Figures 5 and 40) has a projecting arm 924 adapted to press a button 925 in casing 926 mounted on a bracket 927, secured to frame portion 406. Casing 926 has a tubular portion 928 in which a compression spring 929 is mounted around the button portion 925 and in the lower end of the portion 928 is a hole through which the lower end of button 925 projects, and to the lower end of button 925 is secured an insulated plate 930 by means of screw 931, and on the lower side of insulating plate 930 is secured an upper contact point number 932, which has leaf spring contact portions 933 and 934, which are adapted to press simultaneously against contact point members 935 and 936 when the projection 924 presses the button 925 downwardly. Suitable wires 979 are connected to the contact points 935 and 936. This switch 7a controls the current through the distributor or selector mechanism, after the combnation for a character has been set.

Referring to the wiring diagram shown in Figure 49 there is the photo-electric cell 722 with wires 936a and 946a leading therefrom. Wire 936a leads through a source of energy 937 through an adjustable take-off wire 938, which wire is connected to another source of energy 956 and also to another source of energy 967, and current passes through wire 968 into relay coil 970 which is wound around relay 969. This relay 1a has a contact point member 968 on the lower end thereof. Leading from the other side of the photo-electric cell is a wire 946a leading to a resistance member 939a connected to a source of energy 939 with a variable resistance 940 shunted therearound to which a take-off wire 941 is connected, said wire being connected to wire 942, which wire leads to a part of an amplifier tube 946, and from the other side of the amplifier tube 946, wire 945 leads to a resistance 944, said wires being connected to opposite sides of a source of energy 943. Wire 946 is led from the photo-electric cell and connected to grid in 946, and wire 946a is led from the plate member in tube 947. Wire 952 leads through a resistance 958 up to the plate member in tube 947. Tapped off from one side of the source of energy 947 is a wire 948 which is led to the grid member in tube 949. The filament in tube 949 is lighted by wire 950 from the source of energy 953, and connected to the other side of the source of energy 953 is the resistance 954 to which the variable contact member 955 is connected. The wire 958 leads from wire 938 through resistance 958 and to the plate member in tube 949, the source of energy 959, and wire 960 to the grid tube 961.

On the other side of tube 961 and from the plate member thereof the wire 966 is led back to the other side of coil 970 around relay member 969 in 1a. Leading from the wire 938 and connected to the source of energy 964 is the wire 965 which passes out of the other side of the tube and is connected to the variable resistance 965a. The above brief description is a conventional resistance coupled amplifier unit which is conventional in use in photo-electric cells.

Leading from the contact points 328a to 334a of the distributor or selector mechanism, which has been described, are wires 1001, 1000, 997, 995, 993 and 991 which lead to one side of magnets g, h, i, j, k and l. Leading from the other side of the magnets g, h, i, j, k and l are the wires 985, 992, 993, 996, 998 and 999 which are connected to the main lead wire 985, and leading from the feed wire 985 is the wire 990 which leads to one side of the magnet a.

It might here be stated that when the photo-electric cell window is played upon the letter "H" (see Figure 2), and when the ray of light strikes square 328 it will pass a current through the amplifying mechanism just described, and energize relay 1a and close the circuit through contact points 971 and 972, and at this time the finger 523 of the timing mechanism will be resting on the contact point 328a which will cause the magnet l to become energized, and will release the bar 775a which will allow the spring 782 to push this rod outwardly which will not be pressed inwardly at that time by the lever 451, and this will allow the projection 757a (not shown) but which is identical to projection 757 in Figure 35 to enter into a notch 768a which is identical to notch 768 in Figure 37 except as to depth.

It might be stated that the bars 765, 766, 767 into which the notches 768, 769 and 770 are cut are the following approximate depth: ⅛, ¼ and ½ inch. Thus it can be seen no two will give the same result, when added together. This same arrangement occurs for the other side of the distributor or selector mechanism.

Wire 990 leads from the feed line 985 to the magnet (a) and wire 975 passes through the contact point 673, and from the contact point 650 is led the wire 1012 which goes to the contact point 800a of the selector mechanism. The wire 954 leads from contact point 972 of the relay a.

From point 666 the wire 978 is led to wires 980 and 981 which lead to one side of magnets d, c and b. From a spring leaf member 649 the wire 976 is led, which wire 976 goes through the contact point 672 against which leaf spring 648 is adapted to press at times, and from the contact point 651 the wire 977 is led to the feed wire 979. From the contact point 650 wire 1012 leads to contact point 800a of the selector mechanism. Feed wire 988 is connected to feed wire 985 and is connected to one side of magnet b, and by the wire 989 to one side of magnet (c). Wire 981 leads from magnet (c) to wire 978 which is connected to circuit breaker 10a as shown in Figure 43. From the other side of this circuit breaker the wire 982 is led to magnet (d), magnet (d) being connected at its upper side to the feed wire 985 by wire 987. From the feed wire 985 wire 986 leads to one side of the magnet (e) and from the other side of magnet (e) wire 984 leads to contact point 919 on the pivoted lever 915 in switch 6a, and wire 983 leads from the contact point 920 to the feed wire 979, which mechanism appears in Figure 45.

Feed wire 979 runs through switch 7a and through wire 979 to the leaf spring member 789 which is adapted to press against the contact points 790a to 797a selectively. The wire 1024 leads from one of the contact points in the 807' row of the distributor or selector block, and one side of magnet (f), the other side of magnet (f) being connected by wire 1025 to the feed wire 985. Wire 986 runs from the feed line 985 to magnet (e). The wire 1010 leads from any selected point in row 802' of the distributor block or selector mechanism to one side of the dog 727 in 9a. The other side of dog 727 has the wire 1011 connected thereto, which leads back into another row in the distributor or selector mechanism, such as 801'. Wire 1023 branches out from 1011 and goes to the other side of one of the magnets (y) of the key board mechanism. Wire 1020 is connected to wire 1021 which goes to one side of the magnet (x) and wire 1022 is connected to the other side of magnet (x) and runs to wire 1010, said wire 1010 leading back into the selector mechanism. Magnets (n) have wires 1019 and 1018 leading therethrough, 1019 coming from the wire 1017, and 1018 running to one of the contact points 508. Wire 1016 leads from point 331a of the timer to the magnet (m), and wire 1015 leads from magnet (m) back to the feed line 985.

All the magnets except two in the key board mechanism are designated by reference character (n), there is one magnet for each key rod. The two special magnets in the key board mechanism are designated by (x) and (y). The (y) magnet controls the space bands and magnet (x) controls the thin spaces. When circuit breaker 9a is closed both magnets will operate simultaneously, and when 9a is open only magnet (y) will operate which controls regular space bands.

As set forth on page 21, of my co-pending patent application, Serial Number 426,854, which is a division of this application, means are provided for printing an extra spacing code characteristic at the beginning of the line, so as to place all necessary justification in the line, and by placing the extra spacing code characteristic at the beginning of the line, the magnets x and y will release the extra spacing characters into the line each time a space band is released, and therefore, the line of type will be justified by placing this extra spacing characteristic at the beginning of the line, and these code characters will be scanned by the scanning mechanism while it is over the blank portion at the beginning of the line and the carriage return mechanism is held in inoperative position.

As described on page 28, of said co-pending application, the space band characteristics are placed between the words and the extra spacing characteristic is placed at the beginning of the line so that when the spacing characteristic is operated an extra spacing will also be thrown into the line by means of magnets x and y.

With the machine fully constructed and ready for operation and being connected to a line-casting machine as previously outlined. The operator will grip the levers 593 and 594 (see Figure 16) which clears the mechanism to receive the copy 335, which copy is slipped into the carriage mechanism as previously described. The roller 597 will engage the top surface of the control sheet 335, and the projections 585 will penetrate the holes 336 in the sheet which alines the code (see Figure 32) with the window mechanism which is resting directly on the copy, the other side of the copy is supported by the top of the carriage casing, and the top portion 617a of the cover 617 of the photo-electric cell housing which portion 617a travels in the slot 588 of the carriage casing 539. It will be noted that the window through which a ray of light will project will be resting over the space 328 of Figure 2, and the motion of travel of this window will be upwardly in three steps by means of the three projections immediately following the point 328b, 329b, 330b, and when the roller 417 is resting in these points the window will be resting over the corresponding section beneath the letter of the copy, and as the cam 416 progresses it will cause the window to move upwardly in three steps and while it is at the top of the code matter the carriage will be shifted one-half the space of a letter by means of the cam 453, and in Figure 2 it is seen that the ray of light will be passing over a dark spot 331 controlling a high case character. The roller following cam 416 drops downwardly into the spaces 332b, 333b and 334b and causes the window to move back down across the spaces 332, 333 and 334 to read the same.

It is apparent that if one of the spaces (see Figure 2) is white that it will permit the photo-electric cell to energize the relay and release one of the bars of which one is shown in Figure 15 which has already been described, and when the window travels over a dark space such as 329 the relay will not be energized and the magnet controlled thereby will not release its bar in the distributing mechanism. When the window has travelled over all of the spaces in Figure 2 and the proper magnets have been energized to set up a combination in the selector mechanism to release a certain character through one of the magnets in the electric keyboard operating mechanism in Figures 46 and 47, this will cause a selected matrix to fall from the magazine into the assembly mechanism. The operation just described for the reading of the code beneath one letter is repeated, and between the words on the copy, code appears for the placing of spacing members in the line-casting machine which operates spacing magnets, and when the window mechanism has reached the end of the line on the copy due to the advancing of the carriage the ray of light strikes, and penetrates the blank paper and the window travelling upwardly and downwardly finds each one of the spaces white, and therefore all of the magnets g, h, i, j, k and l are energized and causes the transverse bars in the distributor mechanism to move to the position shown in Figure 34, which allows the current to pass through wire 1012 through circuit breaker 5a and through wire 975 to magnet (a) which energizes the same, and permits the contact member 649 in 3a to rest against the contact point 666, which is the finished line mechanism, and energizes magnet (b) to allow the carriage to return to starting position, and also energizes magnet (d) to raise the assembly mechanism in Figure 44 and energizes solenoid (c) to advance the control sheet 335 to another line.

Figure 2:
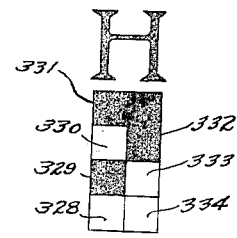
Figure 2 is an enlarged detailed view of a specimen printing.
Figure 2A:
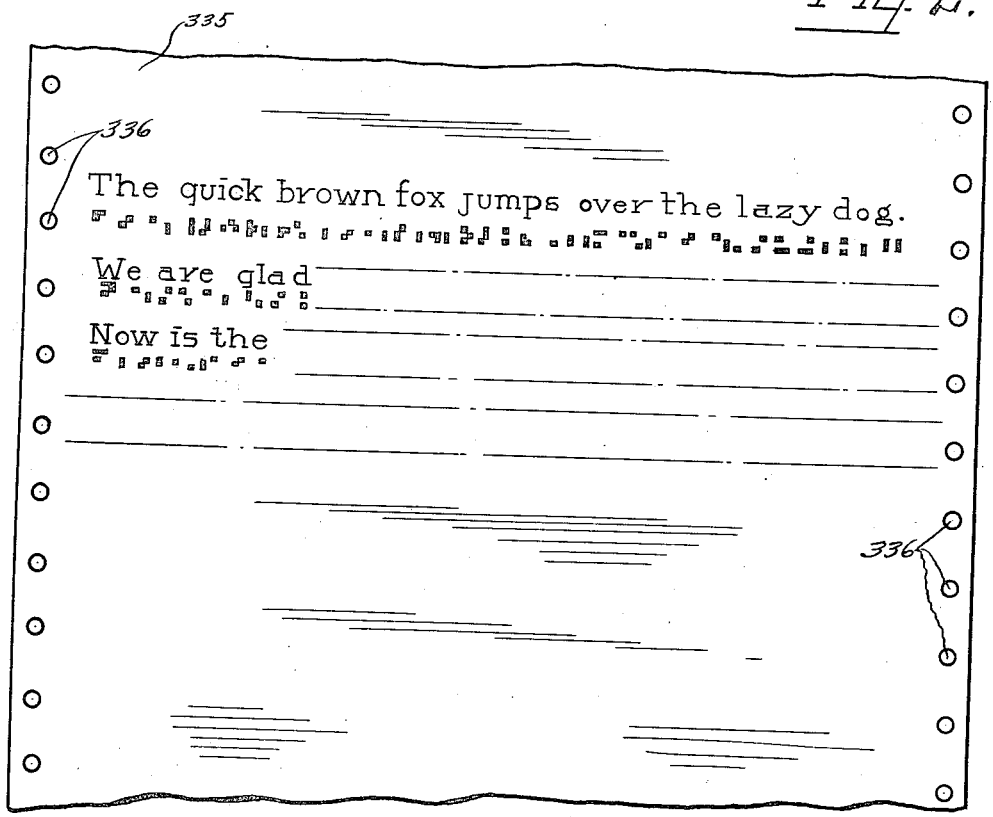
Figure 2a is a view of my control sheet produced by my special typewriting mechanism and ready to be inserted into the mechanism associated with the typesetting machine.

The photo-electric cell windows 714 and 715 will travel to the point where the beam of light from the bulb 694 is over the section 328 of the first code in a line, and will cause light to pass through the paper and cause cell 722 to energize relay 1a, and finger 523 being on contact 328a in the timer will pass a current to magnet (e), which allows rod 775a to be pressed outwardly next the window and will move over section 329 as appears in Figure 2, and the finger 523 being on point 329a in the timer, the relay 970 will not be energized because no current will be passed from the photo-electric cell mechanism, and therefore the magnet (k) will not be energized. The next step will be the passing of the window over the portion 330 and at this point the finger of the timer 523 will be on the point 330a, and relay 1a will be energized to operate magnet (j) to cause it to become energized, and pull the dog in away from one of the sliding members to cause the same to slide as explained for magnet (l). The window mechanism will next move over the left-hand portion of 331, and the carriage being moved one-half a letter space will cause the window to be over the right-hand portion of 331 in Figure 2, and this being darkened will fail to let light pass therethrough while the finger of 523 of the timer is on contact point 331a, the beam of light will thus have covered the entire section 331, and as no light can pass through this darkened portion the relay 1a will not be energized, and therefore no current will be passed through wires 1016 to magnet (m) and therefore dog 513 will hold lever 483 in the position shown in Figure 5, with finger 496 resting on the capital letter contacts 508 of the bar 501. It will mean that current will be passed through one of these contact points when the other code has been traversed, and thus to cause the capital letter to be released from the magazine later on.

Next by movement of the window plate the ray of light plays on the space 332 which is darkened and no current will pass through the contact point 332a in the timer, and therefore magnet (i) for example will not be energized. Next the beam of light will play through the window of the photo-electric cell through space 333, and this being an undarkened space will cause relay 1a to be energized passing current through contact point 333a and cause magnet "h" to be energized to release the dog of the longitudinally disposed sliding member such as 774a, and then the window will pass over the space 334 and this being a light space will cause the photo-electric cell to energize relay 1a to cause the current to pass through contact point 334a in the timer to energize the magnet (g) which will pull back rod 779a from the sliding member 775a to cause the spring 782 to push it outwardly, and at this point lever 431 and 432 will move in mechanically as previously described.

The cam is designated by the reference character 426, and these levers 431 and 432 push the sliding bars 743, 744, 745, 746, 747 and 748 into the distributor normally. The slides 773, 774, and 775 and the slides on the other end of the assembling mechanism designated by the same reference characters with suffix a added thereto, normally pressed by springs 782 are allowed to move outwardly by means of being released by the magnet associated therewith just above described, allowing the corresponding notches 768 in the bars 765, 766 and 777 to register with the projections extending downwardly such as 761, 756, 751 from the bars 746, 747 and 748 to register, and allow these bars 746, 747 and 748 to be pulled away from the observer in Figure 14 by springs 763 which forces the contact points on the ends of contact members 789, 800 to 807 inclusive, to a certain contact point in the mechanism shown in Figures 24 and 25 which allows current to pass, and the lever which has the projection 924 thereon which presses the button 925 and cause the circuit through contact point member 793 and 935 to pass the current through the selected contact point to engage one of the contact points 790a to 797a and passes the current through one of the wires 1002 to 1009 through a selected contact point in one of the selected rows 800' to 807', as the case may be, and allows the current to go to one of the contact levers 496, and then to a magnet controlling a rod 840, which rod 840 will cause the matrix to be dropped into the assembling mechanism, by raising rod 853.

In the drawings and specification I have set forth a preferred embodiment of my invention, and although specific terms are employed they are used in a generic and descriptive sense only, and not for purposes of limitation, the scope of the invention being set forth in the appended claims.

I claim:—

1. Means associated with a type-setting machine to automatically set the type therein which comprises photo-electric cell mechanism adapted to be operated by code characters on a sheet of translucent material, said photo-electric cell being adapted to read the code characters on said sheet of material to energize a magnet associated with a particular key bar to cause the key bar to release a certain matrix from the magazine of a type-setting machine into the assembly mechanism of the type-setting machine, and code characters on said sheet for operating said type-setting machine to further expand the space bars in the line.

2. In a type-setting machine, means for automatically setting the type therein, said means comprising a control sheet of translucent material, said sheet having thereon certain imperforate cell control code characters, photo-electric cell means adapted to be operated by a ray of light when passing through the sheet of material not occupied by a code characteristic to operate certain magnets to set up a combination to cause a certain magnet to be energized to lift a certain key bar in the type-setting machine to cause the same to release the matrix controlled thereby into the assembly mechanism.

3. Means for automatically setting type in a type-setting machine which comprises a control sheet of suitable material having code characters thereon, said code characters comprising a plurality of cell controls, means associated with the type-setting machine into which said copy is adapted to be placed, photo-electric cell mechanism in the means associated with the type-setting mechanism, a magnet in the means associated with the type-setting mechanism for each key bar on the type-setting machine, means for successively scanning the code characters for each character desired to be set by the type-setting machine.

4. In a selector switch mechanism, a plurality of members adapted to be moved in one direction, a plurality of other members associated with the first members and being adapted to move in a direction different from the first members, a fixed contact block having a plurality of contacts therein and being adapted to be engaged by the contact on one of the members, means for selectively controlling the first set of members to determine which contacts shall coincide.

5. In a machine of the kind described, a carriage mechanism adapted to hold a sheet of material, a photo-electric cell associated with said carriage, a window mechanism, means for moving the window mechanism with relation to the carriage and means for automatically moving the carriage mechanism with relation to the photo-electric cell and window mechanism.

6. In means adapted to be associated with a type-setting machine, a photo-electric cell, amplifying means associated with said cell, a switch mechanism adapted to be closed by said cell, a timer connected with said cell and having a plurality of contacts, a magnet connected to each contact in said timer, a switch board having a plurality of contacts adapted to be selectively operated by said magnets, a wire leading from each contact in the switch board to a separate magnet means associated with the last magnets for operating the key rods of the type-setting machine, means associated with said cell for determining which key rod is to be operated, a carriage mechanism for feeding an object to said cell, all of said means being adapted to automatically operate the type-setting machine.

7. Means for automatically setting type in a type-setting machine comprising a sheet of translucent material having imperforate code characters thereon, a photo-electric cell adapted to be operated upon by an absence of said code characteristics, a selector switch mechanism having a plurality of fixed and movable contacts, means controlled by the said photo-electric cell adapted to position a predetermined set of contact points, a magnet associated with each key rod in the type-setting machine, electric connections between some of said contacts and said magnets, said combination of means being adapted to automatically set the type in a type-setting machine when one of said magnets is energized.

8. Means for automatically setting type in a type-casting machine comprising a sheet of translucent material having imperforate code characters thereon, means for moving said sheet, a photo-electric cell associated with said means for moving said sheet, a relay associated with said photo-electric cell, a timer mechanism associated with said relay, a plurality of magnets associated with said timer, a selector switch adapted to be operated by said magnets to set up a circuit to a selected key bar, and electric means associated with each key bar adapted to be energized through said selector switch to automatically operate said key bar.

9. Means adapted to be associated with a type-setting machine for automatically setting type therein, comprising a photo-electric cell, a relay adapted to be closed by said cell, a rotary switch connected with said relay and having a plurality of contacts, a magnet connected to each contact, a switch board having a plurality of contacts adapted to be selectively operated by said magnets, electrical connections between each contact in the switch board and one of a set of second magnets, means associated with each of said second magnets for operating the key rods of a type-setting machine, means for controlling said photo-electric cell for determining which key rod is adapted to be operated, a carriage mechanism for feeding said controlling means over said photo-electric cell, and means for operating said carriage mechanism.

10. Means adapted to be associated with a type-setting machine for automatically setting type therein comprising a photo-electric cell, a relay adapted to be closed by said cell, a rotary switch connected with said relay and having a plurality of contacts, a magnet connected to each contact, a switch board having a plurality of contacts adapted to be selectively operated by said magnets, electrical connections between each contact in the switch board and one of a set of second magnets, means associated with each of said second magnets for operating the key rods of a type-setting machine, and means for controlling said photo-electric cell for determining which key rod is to be operated.

11. Means associated with a type-setting machine to automatically set the type therein which comprises a control sheet, means for receiving and scanning the said control sheet, said control sheet having code indications thereon, said code indications being placed thereon in an imperforate manner and the control sheet being translucent, a photo-electric cell associated with said mechanism adapted to be operated by said control sheet, said photo-electric cell mechanism being adapted to read the code characters on said control sheet to energize a magnet associated with a particular key bar in a type-setting machine to cause said key bar to release a certain matrix from the magazine into the assembly mechanism of the type-setting machine, and means cooperating with said control sheet for determining the case of the characters released from the magazine in the type-setting machine.

12. In a type-setting machine, means for automatically setting the type therein comprising means for determining the case of the type set, a control sheet of translucent material, code characters placed in an imperforate manner on said control sheet, a photo-electric cell adapted to be operated by a ray of light when passing through a portion of the sheet of material not occupied by a code character to operate certain magnets to set up a combination to cause a certain magnet to be energized to lift a certain key bar in the type-setting machine to cause the same to release the matrix controlled thereby into the assembly mechanism.

13. Means for automatically setting type in a type-setting machine which comprises a control sheet having imperforate code characters thereon, and being of translucent material, means associated with the type-setting machine into which said control sheet is adapted to be placed, photo-electric cell mechanism in the means associated with the type-setting mechanism, a magnet in the means associated with the type-setting mechanism for each key bar on the type-setting machine, said means associated with the type-setting machine being adapted to scan successively the code characters for each type character on the copy to operate a particular magnet to operate the key bar associated therewith to cause a particular type character to be released by the type-setting machine into the assembly mechanism of the type-setting machine, and means on said control sheet adapted to cooperate with the means associated with the type-setting machine for determining the case of the character which is released from the magazine of the type-setting machine.

14. In an automatic type-setting mechanism adapted to be associated with and driven by a type-setting machine, a control sheet, a carriage mechanism adapted to receive said control sheet, photo-electric cell mechanism adapted to scan the said control sheet, a relay associated with said photo-electric cell, a selector switch mechanism adapted to be controlled by the code characteristics on said control sheet and said photo-electric cell, a magnet associated with each key bar in a type-setting machine, a connection between each magnet and a contact point in said selector switch mechanism, said code characteristics on said control sheet being adapted to set up the selector switch mechanism to actuate one at a time the key bars in the type-setting machine and means adapted to be operated by the code matter on the control sheet to automatically determine the case of the character released by the key bars in a type-setting machine.

15. In an automatic type-setting machine, a type-setting mechanism, a prepared control sheet on which a set of imperforate code characteristics appear in transverse and vertical order, a window mechanism adapted to be moved successively over the code characteristics by moving over one code character of a set of code characteristics at a time, photo-electric cell mechanism associated in proximity to said control sheet and being adapted to be operated upon by said code characteristics, a selector switch mechanism having a plurality of fixed contact points therein, and also having a plurality of movable contact points therein, a plurality of magnets associated with each of the key bars in the type-setting machine and electric connections between some of said contact points and said magnets, said photo-electric cell mechanism being adapted to be operated upon by said code characteristics to select a certain combination in the selector switch mechanism to automatically operate a selected key bar.

16. Means for automatically setting type in a type-casting machine comprising a prepared control sheet of translucent material and having a set of imperforate code characters thereon for each type bar desired to be operated in the type-setting mechanism, a selector switch mechanism comprising a plurality of electrical contacts arranged for selective operation, photo-electric cell mechanism associated with said control sheet, and being adapted to operate the selector switch mechanism to control certain contact points, electrical means associated with the key bars of a type-casting machine adapted to be operated by the set up of said electrical contacts in said selector switch mechanism to automatically set the type in a type-setting machine.

17. An automatic type-setting machine comprising in combination a control sheet, imperforate code matter on said controlled sheet, a selector switch, means for scanning successively the code on said sheet, means adapted to be operated by the scanning operation to set up a combination of contacts in said selector switch, a magnet associated with each key bar of the type-setting machine adapted to be selectively operated by the said control sheet, the scanning mechanism and the selector switch to automatically set the type in the type-setting machine, and means on said control sheet adapted to cooperate with the type-setting means for determining the case of the character released from the type-setting machine.

18. In means for automatically setting type in a type-setting machine, a magnet associated with each key rod in said type-setting machine, a plurality of relatively movable transmitting contacts, a wire leading from each magnet to one of said contacts, a prepared control sheet for controlling the relative position of said contacts, mechanism to move said control sheet, photo-electric means adapted to be controlled by said control sheet and said photo-electric means in turn being adapted to control the position of said contacts to selectively operate one at a time the key bars in the type-setting machine to automatically set the type therein, and means on said control sheet for controlling the mechanism to determine the case of a character released from the magazine of the type-setting machine by said bars.

19. In means for automatically setting type in a type-setting machine comprising in combination a prepared control sheet having a plurality of code characters associated with each character on said control sheet, photo-electric mechanism adapted to successively scan each of the sets of the code characters on said control sheet, a selector switch mechanism adapted to be operated by the code characters on said control sheet to set up a combination of contact points in said selector switch, a plurality of magnets, there being one magnet for each key bar in the type-setting machine, electrical connections between said magnets and the contact points in said selector switch mechanism, the code characters and photo-electric mechanism being adapted to set up the combination in said selector switch mechanism to cause a selected key bar to be operated to release the type from the magazine to the assembly mechanism, and means adapted to be controlled by said control sheet for determining the case of the characters released from the magazine of said type-setting machine.

20. In an automatic type-setter adapted to be associated with a type-setting machine comprising in combination, a type-setting mechanism, a prepared control sheet on which code characters appear in imperforate form in vertical and transverse positions, a photo-electric cell, mechanism arranged to effect relative movement between said form and said photo-electric cell, a selector switch mechanism adapted to be controlled by said imperforate code characteristics and the photo-electric cell to complete a circuit to a selected key bar, electric means associated with said key bar for releasing type from the type magazine to the assembly mechanism, and means for determining the case of the character released by said key bar.

21. Means adapted to be associated with and to be driven in unison with a type-setting machine comprising in combination, a type-setting machine, a transmitting mechanism, a prepared control sheet on which code indications appear in the form of imperforate printed matter in transverse lines, spacing mechanism for effecting relative movement between said control sheet and the transmitting mechanism both transversely and longitudinally of the control sheet, mechanism to return said parts to the commencement of a new line of said code indications, the said return mechanism being controlled by the code indications on the said control sheet itself, the type-setting mechanism comprising means for operating the key bars of the type-setting machine, said transmitting mechanism comprising a photo-electric cell mechanism adapted to be influenced by the code indications appearing on the said control sheet to set up a combination of electric circuits to automatically operate a selected key bar for each combination of code indications associated with each character on the control sheet.

22. In an automatic type-setting mechanism adapted to be associated with and driven by the type-setting machine, a plurality of contacts adapted to be operated in combination, a control sheet having thereon legible characters and code characters in combination therewith, all of said characters being imperforate, photo-electric cell mechanism adapted to be influenced by an absence of said code characteristics, said photo-electric cell mechanism being adapted to set up a combination of contact points, electrical means associated with each key bar in the type-setting machine adapted to be operated successively by different set ups of combinations in the said contact points to automatically set the type in the type-setting machine, and means on the control sheet adapted to influence means in the automatic type-setter adapted to return the mechanism to cause the said mechanism to scan successive lines on the control sheet.

23. In an automatic type-setting apparatus, a control sheet on which information to be set up in the type-setting machine occurs in a succession of lines of imperforate code matter reading from line to line as in page printing, a selector switch, a magnet for each key bar of the type-setting machine, a photo-electric cell mechanism adapted to successively scan each of said code characteristics on said sheet to set up a combination of contact points in said selector switch, a wire leading from each of said contact points to one of the magnets associated with the key bars in the type-setting machine, means for moving said control sheet with relation to the photo-electric cell mechanism to cause the scanning of the control sheet from line to line, means for returning the mechanism to cause the code characteristics on successive lines to be scanned to operate said key bars, all of said movements being controlled by the imperforate code characteristics on said sheet itself.

24. Means for automatically setting type comprising in combination type forming means, means for operating the type-forming means, a selector switch mechanism having connection with said means for operating said type-forming means, a photo-electric cell for operating said selector switch mechanism, a control sheet associated with said photo-electric cell, said control sheet having thereon a plurality of cell controls for each type to be formed, and means for successively exposing said cell controls to said photo-electric cell to operate the above set forth combination to automatically set type.

25. Means for automatically operating character controlling means comprising a control sheet having code thereon for any desired combination of characters, a fixed source of light, means for receiving said control sheet and moving said sheet with relation to said light, a window mechanism for determining the points on said control sheet to be exeposed to said light, a light operated switch adapted to be closed by light from said control sheet, a selector switch having relatively movable contacts, connections between said light switch and said selector switch for operating said selector switch, means for operating the character controlling means, and means connected to some of the points in said selector switch from said character controlling means.

26. Means for automatically setting type in a type-setting machine comprising in combination a control sheet having code thereon for each character to be set, light actuated means for successively scanning each portion of the code for each character, a rotary switch through which electric current is passed from said light actuated means, a selector switch for receiving current from said rotary switch, type setting means, electric means for operating the type-setting means, connections between said selector switch and said means for operating said type-setting means, means for determining the case of the character set and means for further expanding the line of type after the same is set by said combination of means.

27. Means for setting type in a type-setting machine comprising a control sheet, a photo-electric cell, a switch adapted to be closed at times by said cell, a selector switch mechanism having a plurality of relatively movable contacts, means controlled by said cell for effecting a combination of contacts in said selector switch, electric means connected with said selector switch for operating the type-setting means, means for moving said control sheet with relation to said cell to selectively operate the selector switch and the key bars to automatically set type.

28. In means adapted to be associated with a matrix-setting machine, a photo-electric cell, a switch mechanism adapted to be closed by said cell, a timer connected to said switch and having a plurality of contacts, a magnet connected to each contact in said timer, a switch board having a plurality of relatively movable contacts adapted to be selectively operated by said magnets, wires leading from some of the contacts in said switch board to a series of second magnets, means associated with the last magnets for operating the key rods of a matrix-setting machine, control means associated with said cell for determining which key rod is to be operated, a carriage for feeding said control means to said cell, all of said means being adapted to automatically operate the matrix-setting machine.

29. Means for automatically setting type in a type-setting machine comprising a sheet of translucent material having imperforate code characters thereon, light actuated means adapted to be operated upon by said code characters, a selector switch having a plurality of fixed and movable contacts, means controlled by said light actuated means adapted to position a predetermined set of contact points, means associated with each key rod in the type-setting machine, said means associated with said key rods being adapted to be operated by the said selector switch mechanism to automatically set the type in the type-setting machine.

30. Means for automatically setting type in a type-setting machine comprising a sheet of translucent material having imperforate code characters thereon, legible characters on said sheet but removed from said code characters, means for moving said sheet, a light actuated switch associated with said means for moving said sheet, a selector switch mechanism adapted to be operated at times by said light actuated switch, a timer mechanism for determining when said selector switch is to be operated by said light actuated switch, and means associated with each key bar in the type-setting machine adapted to be selectively operated by said selector switch mechanism.

31. Means adapted to be associated with a matrix-setting machine for automatically setting matrices therein, comprising a light actuated switch, a rotary switch connected to said light actuated switch and having a plurality of contacts, a magnet connected to each contact, a switch board having a plurality of relatively movable contacts adapted to be selectively operated by said magnets, electrical connections between each contact in the switch board and one of a set of second magnets, means associated with each of said second magnets for operating the key rods of the matrix-setting machine, means for controlling said light actuated switch for determining which key rod is to be operated, a carriage mechanism for feeding said controlling means over said light actuated switch and means for operating said carriage mechanism.

32. A device for automatically controlling the selection of character bearing members in type-casting and type-setting machines and the like, comprising a control sheet provided with code indicia, each character including portions differing from each other in their light affecting properties, means for receiving said control sheet, light sensitive means for successively scanning the portions of the code indicia for each character, and means responsive to the light sensitive means which includes a plurality of cooperative elements capable of actuation in different respects relative to each other and also including a magnet for each character bearing member for independently selecting the different character bearing members.

33. In an automatic type-setting machine, a type-setting mechanism, a prepared control sheet on which a set of imperforate code characteristics appear in transverse and vertical order, a window mechanism adapted to be moved successively over the code characteristics by moving over one code character of a set of code characteristics at a time, photo-electric cell mechanism associated in proximity to said control sheet and being adapted to be operated upon by said code characteristics, a selector switch mechanism having a plurality of fixed contact points therein, and also having a plurality of movable contact points therein, a magnet associated with each of the key bars in the type-setting machine and electric connections between some of said contact points and said magnets, said photo-electric cell mechanism being adapted to be operated upon by said code characteristics to select a certain combination in the selector switch mechanism to automatically operate a selected key bar.

34. An automatic type-setting machine comprising in combination a control sheet, imperforate code matter on said control sheet, a selector switch, means for scanning successively the code on said sheet, means adapted to be operated by the scanning operation to set up a combination of contacts in said selector switch, a magnet associated with each key bar of the type-setting machine adapted to be selectively operated by the said control sheet, the scanning mechanism and the selector switch to automatically set the type in the typesetting machine.

35. In means for automatically setting type in a type-setting machine, a magnet associated with each key rod in said type-setting machine, a plurality of relatively movable transmitting contacts, a wire leading from each magnet to one of said contacts, a prepared control sheet for controlling the relative position of said contacts, mechanism to move said control sheet, photo-electric means adapted to be controlled by said control sheet and said photo-electric means in turn being adapted to control the position of said contacts to selectively operate one at a time the key bars in the type-setting machine to automatically set the type therein.

36. In means for automatically setting type in a type-setting machine comprising in combination a prepared control sheet having a plurality of code characters associated with each character on said control sheet, photo-electric mechanism adapted to successively scan each of the sets of the code characters on said control sheet, a selector switch mechanism adapted to be operated by the code characters on said control sheet to set up a combination of contact points in said selector switch, a plurality of magnets, there being one magnet for each key bar in the type-setting machine, electrical connections between said magnets and the contact points in said selector switch mechanism, the code characters and photo-electric mechanism being adapted to set up the combination in said selector switch mechanism to cause a selected key bar to be operated to release the type from the magazine to the assembly mechanism.

37. In an automatic type-setter adapted to be associated with a type-setting machine comprising in combination, a type-setting mechanism, a prepared control sheet on which code characters appear in imperforate form in vertical and transverse positions, a photo-electric cell, mechanism arranged to effect relative movement between said form and said photo-electric cell, a selector switch mechanism adapted to be controlled by said imperforate code characteristics and the photo-electric cell to complete a circuit to a selected key bar, means associated with said key bar for releasing type from the type magazine to the assembly mechanism, and means for determining the case of the character released by said key bar.

38. In an automatic type-setter adapted to be associated with a type-setting machine comprising in combination, a type-setting mechanism, a prepared control sheet on which code characters appear in imperforate form in vertical and transverse positions, a photo-electric cell, mechanism arranged to effect relative movement between said form and said photo-electric cell, a selector switch mechanism adapted to be controlled by said imperforate code characteristics and the photo-electric cell to complete a circuit to a selected key bar, electric means associated with said key bar for releasing type from the type magazine to the assembly mechanism.

39. Means for automatically setting type in a type-setting machine comprising in combination a control sheet having code thereon for each character to be set, light actuated means for successively scanning each portion of the code for each character, a rotary switch through which electric current is passed from said light actuated means, a selector switch for receiving current from said rotary switch, typesetting means, electric means for operating the typesetting means, connections between said selector switch and said means for operating said typesetting means.

40. Means for automatically setting type in a type-setting machine comprising in combination a control sheet having code thereon for each character to be set, light actuated means for successively scanning each portion of the code for each character, a rotary switch through which electric current is passed from said light actuated means, a selector switch for receiving current from said rotary switch, typesetting means, electric means for operating the typesetting means, connections between said selector switch and said means for operating said typesetting means, and means for further expanding the line of type after the same is set by said combination of means.

41. Means for automatically setting type in a type-setting machine comprising a control sheet having imperforate code characters thereon, light actuated means adapted to be operated upon by said code characters, a selector switch having a plurality of fixed and movable contacts, means controlled by said light actuated means adapted to position a predetermined set of contact points, means associated with each key rod in the type-setting machine, said means associated with said key rods being adapted to be operated by the said selector switch mechanism to automatically set the type in the type-setting machine.

42. Means for automatically setting type in a type-setting machine comprising a control sheet having imperforate code characters thereon, legible characters on said sheet but removed from said code characters, means for moving said sheet, a light actuated switch associated with said means for moving said sheet, a selector switch mechanism adapted to be operated at times by said light actuated switch, a timer mechanism for determining when said selector switch is to be operated by said light actuated switch, and means associated with each key bar in the type-setting machine adapted to be selectively operated by said selector switch mechanism.

43. Means for automatically selecting character bearing members in typesetting, linecasting and the like comprising electrical means associated with each of the key bars of a linecasting machine and the like, a control sheet, a selector switch mechanism, said switch mechanism having a fixed contact for each of the electrical means, means operable by the control sheet for establishing a circuit thru the switch mechanism and means on the control sheet for determining the case of the selected character bearing member.

44. Means for selecting characters in typesetting, linecasting and the like comprising a control sheet, a rotary switch mechanism having a movable contact and a plurality of fixed contacts, a magnet connected to each of said fixed contacts, a selector switch mechanism adapted to be controlled by said magnets, a second set of magnets for rendering operative the characters, the magnet for each character being connected to the selector switch mechanism.

45. In a machine for automatically selecting character bearing members in typesetting, linecasting and the like, a control sheet, a carriage mechanism for holding the control sheet, means for moving said carriage mechanism step by step in one direction, a movable member mounted above the carriage mechanism and having a slot therein for exposing portions of said control sheet to a source of light and means for automatically advancing the control sheet thru said carriage mechanism.

46. Means for automatically selecting characters in linecasting, typesetting and the like, comprising a control sheet having a plurality of imperforate cell controls for at least some of the characters to be selected, a selector switch mechanism, a magnet associated with each character selecting means, light sensitive means for successively scanning the cell controls for at least some of the characters to be selected and for operating the selector switch mechanism to set up a combination in said switch mechanism to cause a certain magnet to be energized to select a character in linecasting, typesetting and like machines.

47. Means for automatically selecting characters in linecasting, typesetting and like machines comprising a control sheet having thereon a plurality of cell controls for at least some of the characters to be selected, a light sensitive cell, means for causing said cell to successively scan the cell controls for each character to be selected, a selector switch mechanism having a plurality of contact points and being controlled by said light sensitive cell and the control sheet, a magnet, solenoid and the like in operative relation with each character to be selected, connections between the selector switch mechanism and said magnets whereby the scanning operation will set up a combination in the selector switch mechanism to energize a selected magnet, solenoid and the like to automatically operate a selected character in linecasting, typesetting and like machines.

48. In a machine for the kind described, a carriage mechanism for receiving a control sheet, light sensitive means fixedly mounted with relation to said carriage, a window mechanism movable transversely with relation to said carriage and means for automatically moving the carriage mechanism with relation to the light sensitive means and the window mechanism.

49. Means for automatically operating linecasting machines, typesetting machines and the like comprising a light sensitive cell, a light actuated switch mounted in operative relation to said cell, a movable switch connected with said light actuated switch, said movable switch having a plurality of contacts, a magnet connected to some of the contacts in said rotary switch, a selector switch mechanism operable by said magnet, a magnet, solenoid and the like mounted in operative relation to the character selecting means of the linecasting machine and the like, electrical connections between each of the magnets and the like associated with the character selecting means and the selector switch mechanism, a control sheet and a carriage mechanism for holding said control sheet and presenting it to the light sensitive cell.

50. Means for automatically selecting characters in linecasting, typesetting and the like, comprising a control sheet, means for scanning said control sheet, a selector switch mechanism having a plurality of fixed and movable contacts, means controlled by the scanning means for setting up a predetermined set of contact points, a magnet, solenoid and the like associated with each character in the linecasting machine, typesetting machine and the like, connections between some of the said contacts in the selector switch mechanism and said magnets and the like associated with the character selecting means in the linecasting machine and the like, said combination of means being adapted to automatically select the characters in linecasting, typesetting machines and the like.

51. In a typesetting machine, means for automatically setting type therein comprising a control sheet, said control sheet having cell controls thereon, a light sensitive cell for scanning said control sheet, a selector switch mechanism operable by said cell and the cell controls, electrical means associated with the key bars of the typesetting machine, connections between each of the electrical means and the selector switch mechanism, a light actuated switch for controlling the selector switch mechanism, a movable switch for also controlling the selector switch mechanism, the above means being adapted to operate selectively the key bars in the typesetting machine.

52. Means for automatically setting type in a typesetting machine which comprises a printed sheet having thereon a legible copy, with imperforate code matter associated with but separate from each letter on said copy, means associated with a typesetting machine into which this sheet is adapted to be placed, and to be scanned successively by a photo-electric cell mechanism to automatically set the type in a typesetting machine.

53. Means for automatically setting type in a typesetting machine which comprises a control sheet having both a legible copy of words and code characters associated with but separate from each of the letters of said words, means associated with a typesetting machine and being adapted to be driven by said typesetting machine to automatically set the type from the code characters associated with said letters and the spaces therebetween, said code characters comprising a plurality of photo-electric cell controls and said means comprising a photo-electric cell and mechanism for successively scanning said cell controls.

54. Means for automatically setting type in a typesetting machine comprising a translucent control sheet having code characteristics thereon, some of said code characters comprising a plurality of photo-electric cell controls, means associated with the typesetting machine into which said copy is adapted to be placed to cause the photo-electric cell means to successively scan the cell controls on said copy for each character to be set to set up a combination to allow the key bar of the typesetting machine controlled by said combination to be operated to automatically set the type in the typesetting machine.

55. Means for automatically setting type in a matrix-setting machine comprising a sheet of translucent material having a plurality of cell control characters thereon for each matrix, photo-electric means for successively scanning the cell controls for each matrix to be set and means adapted to be operated by said cell control characters and photo-electric means to automatically set the type in a type-setting machine.

56. A control sheet having code characters thereon, some portions thereof being translucent and other portions thereof being opaque and means operable by a ray of light passing successively through the translucent portions of a code character to automatically set a character in a typesetting machine.

57. Means for automatically setting type in a typesetting machine comprising a control sheet of imperforate material and having thereon both legible characters and code matter, code characters for determining the amount of expansion which may be imparted to the space bands already in the line in the typesetting machine, means associated with a typesetting machine adapted to receive said sheet, photo-electric cell mechanism associated with said last named means adapted to selectively operate the key bars of a typesetting machine from the code characters on said sheet of material.

58. A control sheet adapted to be placed in mechanism associated with a typesetting machine, said control sheet having thereon both legible characters and code characters associated with each legible character, photo-electric means for successively scanning the code characters associated with each legible character to selectively operate key bars of a typesetting machine and means associated with said code characters adapted to determine the case of the character set by the typesetting machine.

59. Means adapted to be associated with and driven by a typesetting machine for automatically setting the type in the typesetting machine, comprising a control sheet having a set of code indicia for each character desired to be set by the typesetting machine, means for advancing said control sheet automatically through said automatic typesetting means, a photo-electric cell mechanism adapted to successively scan each set of code characteristics on said control sheet to automatically set the type in the typesetting machine, and means adapted to be controlled by said control sheet for determining the case of the characters released from the magazine of the typesetting machine.

60. Means for automatically setting type in a typesetting machine comprising a control sheet of translucent material having a set of code characteristics thereon for each character to be set by the typesetting machine, means associated with the typesetting machine into which said sheet is adapted to be placed, photo-electric cell means in said means associated with the typesetting machine for scanning each set of the code characters successively on said copy to set up a combination to allow the key bars of the typesetting machine controlled by said combination to be operated to automatically set the type in the typesetting machine.

61. An automatic typesetting mechanism comprising in combination, a typesetting device, a prepared control sheet on which both legible characters and code characters appear in an imperforate manner, photo-electric cell means, means for causing said photo-electric cell means to successively scan one at a time the imperforate code characters associated with each legible character on said control sheet, means adapted to be controlled by said control sheet for placing space bands and other necessary characters in the assembly mechanism, means for automatically raising the assembly mechanism when a line is completed and causing the photo-electric cell mechanism to begin the scanning of another line on the control sheet, and means for determining the case of the characters set by said typesetting mechanism.

62. That method of automatically setting characters in a typesetting machine which comprises preparing a control sheet having thereon a plurality of photo-electric controls for each character in a typesetting machine desired to be set, and scanning successively each set of cell controls to automatically operate the typesetting machine to set the type therein.

63. Means associated with a typesetting machine for automatically setting type therein, comprising a control sheet having code indicia for each character desired to be set in said typesetting machine, each code indicia comprising a plurality of photo-electric cell controls, means for successively scanning said cell controls for each character, and means adapted to be operated by the scanning means for automatically scanning said cell controls for each character, and means adapted to be operated by the scanning means for automatically setting a selected character in said typesetting machine.

64. A control sheet of translucent material having thereon legible characters and imperforate code matter associated with but separated from the legible character, means associated with a matrix-setting machine adapted to receive said sheet and to be controlled thereby to automatically set the matrices in said matrix-setting machine.

65. A control sheet having portions thereof translucent and other portions thereof shaded, and means adapted to be operated by a ray of light passing successively over said shaded and translucent portions of said sheet to automatically set a character in a typesetting machine.

66. Means for automatically setting type in a typesetting machine comprising means for determining the points at which a ray of light can pass successively through a sheet of material for determining what character is to be released by the typesetting mechanism, and means adapted to be operated by said ray of light after passing through said sheet of material successively to automatically operate certain of the typesetting mechanisms.

67. Means for automatically setting type in a matrix-setting machine comprising a control sheet of imperforate translucent material, and having thereon both legible characters and code matter, said code matter being separate from but associated with each of the legible characters, code characters for determining the amount of expansion which may be imparted to the space bands already in the line of a matrix assembling mechanism, means associated with the matrix-setting machine adapted to receive said sheet, light actuated mechanism associated with said last named means adapted to selectively operate the key bars of the said machine from the code characters on said sheet of material.

68. A control sheet adapted to be placed in mechanism associated with a matrix-setting machine, said control sheet having thereon both legible characters and code characters associated with, but separated from, each legible character, a light actuated means for successively scanning the code characters associated with each legible character to selectively operate the key bars of the matrix-setting machine, and means associated with said code characters for determining the case of the character set by the matrix-setting machine.

69. Means for automatically setting type in a typesetting machine which comprises a control sheet having both code and letters thereon, means associated with a typesetting machine into which said control sheet can be placed to automatically set the type from said control sheet, said means comprising a photo-electric cell, and each code comprising a plurality of cell controls.

70. Means for automatically setting type in a typesetting machine which comprises a control sheet having a legible and readable copy thereon, said control sheet also having a plurality of photo-electric cell controls in association with each readable character, said control sheet also having proper spacing characteristics thereon to cause the typesetting machine to properly space the copy, means associated with the typesetting machine adapted to receive the control sheet, a photo-electric cell in said means, means for causing said cell to successively scan the cell controls to automatically set the type in the typesetting machine.

71. Means for automatically setting type in a typesetting machine comprising a control sheet, a plurality of cell controls on said sheet, there being a plurality of cell controls for some of the type characters to be set, photo-electric cell means associated with the typesetting machine and adapted to be driven in timed relation thereto, means in said last-named means for causing said photo-electric cell to progressively scan the cell controls, and means controlled by said cell controls for automatically setting the type in the typesetting machine.

72. Means for reproducing printed characters comprising a control sheet, a plurality of cell controls on said sheet for each character to be reproduced, a machine for reproducing printed characters, means associated with said reproducing machine and driven in timed relation thereto for receiving said control sheet, photo-electric cell means in said means associated with the reproducing machine, means for causing said cell to progressively scan said cell controls to automatically cause said reproducing machine to reproduce the characters represented on the control sheet by said cell controls.

73. Selective control means comprising a sheet having opaque and translucent portions, a plurality of work-performing instrumentalities and means for operating said instrumentalities, and single light sensitive means for successively scanning the portions of said sheet for selectively operating any one of said instrumentalities.

74. A device for automatically controlling the selection of character bearing members, comprising a control sheet provided with code indicia for each character, including portions differing from each other in their light affecting properties, means for receiving said control sheet, light sensitive means for successively scanning the portions of the code indicia for each character, and means responsive to the light sensitive means for selecting a character bearing member.

75. A device for automatically controlling the selection of character bearing members in typecasting and typesetting machines, comprising means for driving the device from the machine, a control sheet provided with code indicia for each character including portions differing from each other in their light affecting properties, means for receiving said control sheet, light sensitive means for successively scanning the portions of the code indicia for each character, and means responsive to the light sensitive means for selecting a character bearing member.

76. A device for automatically controlling the selection of character bearing members in typecasting and typesetting machines and the like, comprising a control sheet provided with code indicia, each code indicia including portions differing from each other in their light affecting properties, means for receiving said control sheet, light sensitive means for successively scanning the portions of the code indicia for each character, and means responsive to the light sensitive means which includes a plurality of cooperative elements capable of actuation in different respects relative to each other for independently selecting the different character bearing members.

77. Means for automatically controlling the selection of character bearing members in typecasting, and typesetting machines, comprising a control sheet of imperforate material having code indicia thereon, means associated with a machine to be operated adapted to receive said control sheet, a light-sensitive cell associated with said last named means operative to selectively actuate the key operative elements of the machine from the code indicia on said sheet of material.

78. In a device for automatically controlling the selection of character bearing members in typecasting and typesetting machines, a control sheet having thereon code indicia for each character bearing member to be selected, the code indicia for each of said members including a plurality of cell control portions, a light sensitive cell for successively scanning said portions, and means responsive thereto to selectively operate the key bars of a machine.

79. Means adapted to be associated with and driven by typesetting machine for automatically setting type in the typesetting machine, comprising a control sheet having a set of code indica for each character desired to be set by the typesetting machine, means for advancing said control sheet automatically thru said automatic typesetting means, a photo-electric cell mechanism adapted to successively scan each set of code characteristics on said control sheet to automatically set the type in the typesetting machine.

80. A device for controlling the selection of character bearing members in typecasting and typesetting machines comprising a control sheet having a set of code indicia thereon for each character to be selected, means associated with the machine to be operated for receiving said control sheet, a light sensitive cell in operative relation with said control sheet receiving means for successively scanning each set of code indicia on the control sheet to set up for each character desired an association of cooperative elements to select the desired character bearing member.

81. A method for automatically selecting character bearing members in typesetting and typecasting machines and the like which comprises preparing a control sheet having thereon for each character to be selected code indicia including a plurality of portions differing from each other in their light affecting properties, successively scanning with a light sensitive cell said portions of the code indicia for each character to be selected to automatically actuate mechanism for selecting the character corresponding to the code indicia scanned.

82. A device for controlling the selection of character bearing members in typesetting and typecasting machines and the like comprising a control sheet having code indicia for each character bearing member to be selected, each code indicia including a plurality of light sensitive cell control areas, a light sensitive cell for successively scanning said area for each code indicia and means responsive to the light sensitive cell for automatically selecting the character bearing member identified by the code indicia scanned.

83. A device for automatically selecting character bearing members in typesetting and typecasting machines and the like, comprising means for operating the character bearing members, a selecting mechanism in operative relation with said operating means, a light sensitive cell for controlling said selecting mechanism, a control sheet, means for bringing the control sheet into operative relation with said light sensitive cell, and means for successively exposing a plurality of portions of the control sheet to said light sensitive cell, for each character to be selected, to actuate said selecting mechanism.

84. A device for automatically selecting character bearing members in typesetting and typecasting machines and the like comprising a control sheet having code indicia thereon for each character to be selected including a plurality of portions differing from each other in their light affecting properties, a source of light, means for receiving said control sheet and for moving the same in relation to said source of light, a window mechanism for determining the points of the control sheet to be exposed to said light, a light sensitive cell for successively scanning the points of the control sheet exposed to said light source, and means responsive to said light sensitive cell for selecting a character bearing member.

85. A device for automatically selecting character bearing members in typesetting and typecasting machines and the like comprising means for determining the points at which a ray of light can pass successively thru a control sheet to identify the character to be selected, and means responsive to the ray of light after successively penetrating said control sheet to select the identified character.

86. A device for automatically selecting character bearing members in typesetting and typecasting machines and the like comprising a control sheet adapted to be placed in mechanism associated with the machine to be operated, said control sheet having thereon code indicia corresponding to each character bearing member of the machine to be operated, the code indicia for each character including a plurality of areas differing from each other in their light affecting properties, a light sensitive cell for successively scanning the area of the code indicia for each character, and means responsive to said light sensitive cell for actuating the key bars of the machine to be operated.

87. A device for automatically selecting character bearing members in typesetting and typecasting machines and the like comprising a control sheet having code indicia thereon for each character to be selected, means associated with the machine to be operated into which said control sheet can be placed to automatically select character bearing members corresponding to the code indicia thereon, said means including a light sensitive cell and each code indicia including a plurality of areas differing from each other in their light affecting properties.

88. A device for automatically selecting character bearing members in typesetting, typecasting and like machines comprising a control sheet having code indicia thereon for each character to be selected, including a plurality of areas differing from each other in their light affecting properties, means associated with the machine to be operated for receiving said control sheet, a photo-electric cell in operative relation with said control sheet receiving means, means for causing said cell to successively scan said areas of the code indicia for each character to be selected and means responsive to said cell after the same has scanned the areas of a particular code indicia for selecting the character bearing member identified by such code indicia.

89. A device for automatically selecting character bearing members in typesetting and typecasting machines and the like comprising a control sheet having code indicia thereon for each character to be selected, arranged in transverse lines, means associated with a machine to be operated for receiving said control sheet, light sensitive means, means for exposing the code indicia on the control sheet to the light sensitive means and to a source of light, means for causing the control sheet to move in relation to the source of light and the light sensitive means to successively pass code indicia of an entire line into operative relation with said light source and light sensitive means, and means responsive to the light sensitive means when a complete line of code indicia has been scanned thereby for moving the control sheet to a new line position.

90. In combination with a device in which a control sheet is scanned by a light sensitive means, a source of light, a light sensitive cell, a control sheet carrying indicia including areas differing from each other in their light affecting properties, said indicia being arranged in transverse lines across the said control sheet, means for moving the control sheet to bring the indicia of a transverse line successively into operative relation with said source of light and said light sensitive cell and means responsive to the light sensitive cell for moving the control sheet, after a transverse line of indicia has been scanned, into new line position.

91. In combination with a device in which instrumentalities are actuated in response to the scanning of a control sheet by light sensitive means, a control sheet having thereon a succession of lines of code indicia reading from line to line as in page printing, a light source, light sensitive means for successively scanning the code indicia of each line, means responsive to the light sensitive means for effecting, after a line of code indicia has been scanned, relative movement between the control sheet and light sensitive means to adjust the same to new line position.

92. In combination, a control sheet having thereon a plurality of parallel lines of code indicia, a single means for scanning said indicia, means for moving the control sheet to successively present to the single means the indicia of a single line, and means rendered active by the scanning of a portion of said sheet occurring at the end of a line for moving the control sheet to present to the single means a new line of indicia.

93. In combination, a control sheet having thereon a plurality of parallel lines of code indicia, a single means for scanning said indicia, means for causing the single means to successively scan the different portions of each indicia presented to the same, means for moving the control sheet to successively present to the single means the indicia of a single line, and means rendered active by the scanning of a portion of said sheet occurring at the end of a line for moving the control sheet to present to the single means a new line of indicia.

94. A device for controlling the successive operation of a machine comprising a plurality of instrumentalities, the repeated actuation of which effects said successive operations of the machine, a control sheet having thereon a plurality of transverse lines of code indicia, a single means for scanning said indicia and functioning in accordance with the different characteristics of each individual indicia to cause the actuaton of said instrumentalities to effect a single operation of the machine, means for moving the control sheet successively to present to said single means the indicia of a single line, and means rendered active by the scanning of a blank portion of said sheet substantially equal in size to the size of a single indicia for moving the control sheet to present to the single means a new line of indicia.

95. A device for automatically selectively actuating the key bars of a typecasting, typesetting or like machine, comprising key bar operating means, a single light sensitive means for controlling said operating means, means for successively exposing said light sensitive means to a source of light preliminary to the actuation of said key bar, and means dependent upon said successive exposures for selecting the key bar to be actuated.

96. A device for automatically selectively actuating the key bars of typesetting and typecasting and the like machines comprising a control sheet having code indicia thereon, each comprising a plurality of portions differing from each other in their light affecting properties, means for operating each key bar of the machine, light sensitive means, means for causing said light sensitive means to successively scan the portions of each code indicia on the control sheet and means responsive to said light sensitive means after the complete scanning of a given code indicia thereby for actuating the operating means for a selected key bar.

97. A control unit for a machine capable of performing a multiplicity of different operations, said unit comprising a control sheet adapted to bear in any desired order code indicia, the number of different indicia which may appear on said sheet being equal to the number of different operations of said machine, each indicia possessing a plurality of control areas less in number than the number of operations of said machine, a plurality of correlated devices, one for each control area of an indicia, adapted to be actuated to produce a number of different combinations equal to the number of said operations, means including a light sensitive cell controlled by the indicia appearing on said sheet for actuating said devices to cause a combination to be set up, and means operated in response to the setting of said devices to bring about a desired operation of the machine.

98. Means for automatically operating typesetting machines and the like comprising a control sheet having code characters thereon for each character to be set, some of the code characters comprising a plurality of controls, the control members differing from the sheet in light affecting properties, a light sensitive cell and means for causing said cell to successively scan said controls to automatically select a character to be set.

99. A control sheet for selecting character bearing members, said sheet having portions thereof differing from each other in their light affecting properties and means operable by a ray of light directed successively over a portion of said control sheet to automatically select a character bearing member.

100. Means for determining the points at which a ray of light can strike a character on a control sheet and means operable by said ray of light after successively striking said character for automatically rendering operative a character in typesetting machines, a matrix-setting line-casting machine and the like.

101. Means adapted to be associated with typesetting machines and the like for automatically setting the type therein, comprising a control sheet having a set of code indicia for each character to be set, a light sensitive cell, means for causing relative movement between the control sheet and said cell to cause the code indicia for each character to be successively scanned by said cell and means operable by said scanning operation for automatically setting a character in said typesetting machine and the like.

102. Means for automatically selecting character bearing members in typesetting machines and the like comprising a light sensitive cell, a control sheet having code characters thereon, some of said code characters comprising a plurality of cell controls, means associated with the character selecting means for receiving said control sheet and scanning successively the cell controls for each character and means operable by said scanning operation for selecting the character bearing member represented by said code character.

103. In a machine having character bearing members, means for automatically selecting for operation some of said character bearing members, said means comprising a control sheet having a plurality of controls for each character bearing member in said machine, means for successively scanning said plurality of controls for each character bearing member and means operable by said controls when scanned for rendering operable a character bearing member.

104. Selective control means for typesetting machines and the like comprising a control sheet having shaded and unshaded portions and single light sensitive means for successively scanning a portion of said sheet for selectively operating a character in the typesetting machine and the like.

105. A control sheet for a plurality of work performing means having portions differing from each other in their light affecting properties, and means operable by a ray of light directed successively on portions of said sheet to automatically effect selective control of one of the plurality of work-performing means.

106. A control sheet for work-performing means having portions differing from each other in light-affecting characteristics and means operable by a ray of light directed successively on portions of said sheet to automatically effect control of the work-performing means.

107. Means for determining the points at which a sheet of material is successively exposed to a ray of light and means adapted to be operated by said exposures of the sheet of material to said ray of light to automatically select a character for typecasting, typesetting and like machines.

108. Means for automatically setting type in a typesetting machine comprising a mechanism connected to said typesetting machine, means for driving the mechanism, means in said mechanism for receiving a control sheet having a plurality of code characters thereon, there being a code for each type, and each code comprising a plurality of cell controls, a light sensitive cell, means for causing the light sensitive cell to successively scan the cell controls in each character and means operable by said cell control for determining which of the type shall be set by the typesetting machine.

109. Means for automatically setting type in a typesetting machine which comprises a mechanism connected to the typesetting machine, means in said mechanism for receiving a control sheet, said control having thereon a legible and readable copy and also having a plurality of light sensitive cell controls in association with each readable character, a light sensitive cell in said mechanism, means for causing said light sensitive cell to successively scan cell controls in each code character, means for shifting the control sheet with relation to said light sensitive cell and means for returning the control sheet to the starting of a new line position when the end of a line has been reached by said scanning mechanism.

110. Means for automatically setting type in a typesetting machine comprising a mechanism adapted to receive a control sheet, a plurality of imperforate code matter on said control sheet, there being a plurality of cell controls for some of said code characters, light sensitive means mounted in said mechanism, means for causing said light sensitive cell to successively scan the control sheet by causing said control sheet to be moved with relation to said light sensitive cell and means controlled by said light sensitive cell for automatically setting the type in the typesetting machine.

111. Means for automatically setting type in a matrix-setting machine comprising a sheet of material having a plurality of code characters thereon, some of said code characters comprising a plurality of cell controls for each matrix to be set, a light sensitive cell, means for causing said light sensitive cell to successively scan the cell controls of each code character and means operable by said cell controls and said light sensitive cell for automatically setting the matrices in the matrix setting machine.

112. Means for determining the point at which a ray of light can pass successively thru a sheet of material and means operable by said ray of light after passing through said sheet of material successively for a plurality of times for automatically setting a character in a typesetting machine.

113. Means for automatically setting type in a typesetting machine comprising a control sheet of imperforate material and having thereon code matter for each character to be set by the typesetting machine, other code characters for determining the amount of expansion which may be imparted to the space bands already in the line in the typesetting machine, means attachable to a typesetting machine and having mechanism for receiving said sheet, means for moving said sheet, a light sensitive cell in said mechanism, means for successively passing a ray of light through portions of said sheet to cause it to strike said light sensitive cell and means operable by said light sensitive cell for automatically operating the key bars of the typesetting machine.

114. Means attachable to a typesetting machine comprising a light sensitive cell, means for receiving a control sheet, and moving said control sheet with respect to the light sensitive cell, means for focusing a light on said control sheet to cause the beam of light to pass through said control sheet onto the light sensitive cell, said control sheet having a plurality of code characters thereon, at least one of said code characters comprising a plurality of cell controls, means for causing the beam of light to pass successively over the cell controls of the code characters to impinge on the light sensitive cell, and means operable by said light sensitive cell for selectively operating the key bars of the typesetting machine, said control sheet having thereon code characters for determining the case of the letter to be set by the typesetting machine.

115. In a typesetting machine, means for automatically setting the type therein comprising means for determining the case of the type set, a control sheet of translucent material, code characters placed in an imperforate manner on said control sheet, a light sensitive cell operable by a ray of light when passing through said code character to operate a selector mechanism to set up a combination to cause a certain key bar in the typesetting machine to be lifted to release the type controlled thereby.

116. Means adapted to be associated with and driven by a typesetting machine for automatically setting the type therein comprising a control sheet, there being a code character on the control sheet for each character which is desired to be set by the typesetting machine, each code character comprising a plurality of cell controls, a light sensitive cell, means for passing a ray of light successively through each of the cell controls in each code character and means operable by said cell for automatically setting the type in the typesetting machine and means controlled by said control sheet and said cell for determining the case of characters set by the typesetting machine.

117. Means for automatically setting type in a typesetting machine comprising a control sheet of translucent material having a set of code characteristics thereon for each character to be set by the typesetting machine, means associated with the typesetting machine into which said sheet is adapted to be placed, a light sensitive cell in said means associated with the typesetting machine for successively scanning each of the code characters on said control sheet to set up a combination of elements in said mechanism to actuate selectively the key bars of the typesetting machine to automatically set the type therein.

118. Means for automatically setting type in a typesetting machine, elevating means for the key rods of the typesetting machine, reciprocating means for raising said elevating means, said elevating means being adapted to assume a normal position out of the path of said reciprocating means, selectively operative means for placing a selected key rod elevating means in the path of the reciprocating member, selective means for operating the means for placing an elevating member in the path of the said reciprocating member, a light sensitive cell for controlling said means, a control sheet, means for moving said control sheet with relation to said light sensitive cell, a source of light and means for focusing the same on the light sensitive cell, said control sheet having a plurality of code matter thereon, each code comprising a plurality of cell controls, means for passing said ray of light successively over said cell controls, said cell being operable to control the means for positioning the means for placing an elevating member in the path of the reciprocating member.

119. Means for automatically setting type in a typesetting machine comprising in combination, means for operating the key bars of the typesetting machine, a prepared control sheet having a plurality of code characters associated with each character on the control sheet, each code character comprising a plurality of cell controls, a light sensitive cell adapted to successively scan each of the cells of the said code characters on the control sheet, a selector mechanism operable by the cell controls on the control sheet to set up a combination in said selector mechanism to selectively position the means for operating the key bars.

120. Means for automatically setting type in a typesetting machine, elevating means for the key rods of the typesetting machine, reciprocating means for raising said elevating means, said elevating means being adapted to assume a normal position out of the path of said reciprocating means, selectively operative means for placing a selected key rod elevating means in the path of the reciprocating member, selective means for operating the means for placing an elevating member in the path of the said reciprocating member, a light sensitive cell for controlling said means, a control sheet, means for moving said control sheet with relation to said light sensitive cell, a source of light and means for focusing the same on the light sensitive cell, said control sheet having a plurality of code matter thereon, means for passing said ray of light over said control sheet, said cell being operable to control the means for positioning the means for placing an elevating member in the path of the reciprocating member.

121. Means associated with a typesetting machine for automatically setting type therein, comprising a control sheet having code indicia for each character desired to be set in the typesetting machine, each code indicia comprising a plurality of cell controls, a light sensitive cell, means for causing said cell to successively scan the cell controls of each character, and means operable by the cell for automatically setting a selected character in said typesetting machine.

122. Means for automatically setting type comprising in combination typesetting means, means for operating selectively and one at a time the typesetting means, a selector mechanism having connections with said means for operating the typesetting means, a light sensitive cell for operating said selector mechanism, a control sheet associated with said cell, said control sheet having thereon code characters, and each code character comprising a plurality of cell controls and means for successively exposing said cell controls in each character to said cell to operate the selector mechanism to automatically set the type.

123. Means for automatically operating character controlling means, comprising a control sheet having code thereon for any desired combination of characters, a fixed source of light, means for receiving said control sheet and moving said sheet with relation to said light, means for successively passing said light over various portions of each code, a light operated switch adapted to be closed by light from said control sheet, a selector mechanism having relatively movable members, connections between said light actuated switch and selector mechanism for operating said selector mechanism, means operable by the selector mechanism for operating the character controlling means.

124. Means for setting type in a typesetting machine comprising a control sheet, a light sensitive cell, a switch adapted to be closed at times by said cell, a selector mechanism having a plurality of relatively movable members, means controlled by said cell for effecting selective movement of some of said movable members in said selector mechanism, means connected with said selector mechanism for operating the typesetting means, means for moving said control sheet with relation to said cell to cause said cell to successively scan the various portions of each code character to selectively operate the selector mechanism to selectively operate the typesetting means in said typesetting machine.

125. A control sheet of translucent material having thereon imperforate code matter, each code matter representing a character of a typesetting machine, and each code matter comprising a plurality of cell controls, a single light sensitive means associated with the typesetting machine adapted to successively scan the cell controls of each code matter and means controlled by said scanning for automatically setting the type in said typesetting machine.

126. Means for automatically setting type in a typesetting machine comprising a sheet of translucent material having imperforate code characters thereon, a light sensitive cell adapted to be operated by said code characters, a selector mechanism having a plurality of movable members, means controlled by said cell for positioning a predetermined number of said movable members in said selector mechanism, operating means associated with each key rod in the typesetting machine, connections between the selector mechanism and all of the key rods of the typesetting machine, and means for selectively positioning said connections to selectively operate the key rod of the typesetting machine.

127. Means for automatically setting type in a typesetting machine comprising means for determining the point at which a ray of light can pass successively through a sheet of material for determining what character is to be released by the typesetting machine, and means operable by said ray of light after passing through said sheet of material successively for automatically releasing one of said characters of the typesetting mechanisms.

128. Means for automatically setting type in a typesetting machine comprising a control sheet of imperforate translucent material and having thereon code matter, the code for some of the characters in the typesetting machine comprising a plurality of cell controls, code characters on said control sheet for determining the amount of expansion which may be imparted to the space bands already in the line of a typesetting machine, means associated with the typesetting machine adapted to receive said control sheet, a light sensitive cell associated with said last-named means and being adapted to selectively operate the key bars of said machine from the code characters on said sheet of material.

129. A control sheet adapted to be placed in a mechanism associated with a typesetting machine, said control sheet having thereon both legible characters and code characters associated with but separated from each legible character, a light sensitive cell for successively scanning the code characters associated with each legible character to selectively operate the key bars of the typesetting machine, and means on said control sheet for determining the case of the character set by the typesetting machine.

130. In a machine of the kind described, a carriage mechanism adapted to hold a sheet of material, a light sensitive cell associated with said carriage, a source of light, means for focusing said light on a portion of said sheet of material, means for moving said sheet of material with relation to the source of light and also for moving said sheet of material with relation to the carriage mechanism to a new line position, and means for automatically moving the carriage mechanism with relation to the cell and the source of light.

131. In a typesetting machine, means for automatically setting type therein, a control sheet, a light sensitive cell, said control sheet having a plurality of code characters thereon and each code character comprising a plurality of cell controls, and means for causing said light sensitive cell to successively scan the cell controls of each character and to successively scan said code characters, a plurality of movable members associated with each key rod in the typesetting machine and means operable by said light sensitive cell for selectively operating said movable members to selectively operate the key rods of the typesetting machine.

132. In a machine for automatically setting type in a typesetting machine, a control sheet, said control sheet having a plurality of imperforate code characters thereon, and each code character comprising a plurality of cell controls, said control sheet having equally spaced perforations in each of the marginal portions thereof, a carriage mechanism adapted to receive said control sheet, members for penetrating a set of perforations in said control sheet, means for withdrawing said members from said perforations and shifting said control sheet to a new line position.

133. In a mechanism for automatically setting type in a typesetting machine, means for selectively lifting the key rods in the typesetting machine, means for normally holding the capital letter section of the typesetting machine out of operation, a control sheet for controlling the operation of the key rods, said control sheet having thereon a plurality of code characters for controlling said key rods, means operable by said code characters for controlling said key rod operating means, said control sheet having thereon a code character for rendering operable the capital letter section and at the same time rendering inoperable the lower case section of the mechanism.

134. In a typesetting machine having a plurality of key-rod lifters, a movable member for each key-rod lifter, a striking bail for engaging the movable members, means for normally holding the movable member out of the path of the striking bail and light actuated means for controlling the movable members for selectively placing them in the path of the striking bail.

135. In a typesetting machine having character selecting means, a control sheet for operating the character selecting means, said character selecting means comprising movable members for releasing the type characters, other movable members for operating the first named movable members, a striking bail, means for normally holding the second movable member out of the path of the striking bail, and light actuated means selectively controlled by the control sheet for selectively positioning the second movable members in the path of the striking bail.

136. In a typesetting machine having type characters, movable members for releasing the type characters, other movable members for operating the first movable members, a striking bail, means for normally holding the other movable members out of the path of the striking bail, a control sheet for controlling the releasing of the type characters, and a magnet for each of said other movable members selectively controlled by the control sheet for moving the other movable members selectively into the path of the striking bail.

137. In a typesetting machine having a plurality of type characters, a plurality of movable members for selectively releasing the type characters, selectively operated means for moving said movable members, said selectively operating means comprising a magnet for each of said type characters, a printed control sheet, a light actuated cell for scanning said control sheet and means controlled by the control sheet and said light actuated cell for selectively energizing said magnets to selectively release the type characters.

138. In a typesetting machine, means for automatically releasing the type characters in said machine comprising a control sheet, a carriage mechanism for supporting said control sheet, a photo-electric cell disposed in operative relation to said carriage mechanism, a source of light disposed in operative relation to said carriage mechanism, means for moving the carriage mechanism and the control sheet with relation to the photo-electric cell, a window mechanism for shading a portion of said control sheet and means for moving said window mechanism to successively expose a portion of said control sheet to said source of light.

139. In a typesetting machine having a plurality of type characters, means for selectively releasing said type characters comprising a control sheet, a carriage mechanism for holding said control sheet, a source of light in operative relation to said carriage mechanism, a photo-electric cell in operative relation to said carriage mechanism, means for moving the carriage mechanism with relation to said photo-electric cell and said source of light, a window mechanism shading a portion of the control sheet and means for moving the window mechanism successively to expose portions of the control sheet to said source of light, and means controlled by the photo-electric cell for selectively releasing the type characters.

140. In a machine for automatically controlling typesetting machines, a control sheet, a photo-electric cell for successively scanning portions of the control sheet, a carriage mechanism for holding the control sheet, means for moving the carriage mechanism step by step in one direction with relation to the photo-electric cell, a source of light and means for focusing the same on the control sheet, a window mechanism for shading the control sheet adjacent the point at which the light is focused, and means for moving the window mechanism with relation to the control sheet to successively expose portions of the control sheet to said source of light.

141. In a typesetting machine having a control sheet for automatically controlling the releasing of type characters, a photo-electric cell for successively scanning said control sheet, a source of light and means for focusing the light on the control sheet, means for causing relative movement between the control sheet and the photo-electric cell to successively expose portions of the control sheet to said photo-electric cell, and means operable by said cell for selectively releasing said characters.

142. Means for controlling a typesetting machine comprising a control sheet, a photo-electric cell for successively scanning the control sheet, a carriage mechanism for holding the control sheet, means for moving the carriage mechanism with relation to said cell, means for covering the control sheet and having a window mechanism therein, a movable window mechanism mounted in operative relation with the carriage mechanism, a source of light and means for focusing said source of light on said control sheet, the movable window mechanism being operable to successively expose portions of the control sheet to the said source of light to actuate said photo-electric cell, and means operable by the photo-electric cell for selectively releasing the characters in the typesetting machine.

143. In a typesetting machine, a control sheet for selectively controlling the selection of characters in the typesetting machine, a carriage mechanism for holding the control sheet, means for moving the carriage mechanism and control sheet as a unit with relation to the machine, said control sheet having perforations therein, means on the carriage mechanism for engaging said perforations for holding the control sheet, means for moving the control sheet with relation to the carriage mechanism including means for removing the holding means from said perforations while the control sheet is moved with relation to the carriage mechanism and causing said holding means to enter a new set of perforations to hold the control sheet after it is moved to new position.

144. In a typesetting machine having a control sheet and a selector mechanism, said selector mechanism comprising a plurality of selectors, a second set of selectors movable with relation to the first set of selectors, a magnet for each selector, means for scanning the control sheet, and means controlled by the control sheet for selectively energizing said magnets to selectively operate said selectors and means operable by the selectors for selecting characters in said typesetting machine.

145. In a typesetting machine having a control sheet and a selector mechanism operated by said control sheet, said selector mechanism comprising a plurality of selectors, a second set of selectors movable with relation to first set of selectors, a magnet for each selector, means for scanning the control sheet, means controlled by the control sheet for selectively energizing said magnets to selectively operate said selectors, means operable by the selectors for selecting characters in said typesetting machine, and means for restoring the selectors to normal position after a character has been selected.

146. In a typesetting machine having a control sheet and a selector mechanism operated by said control sheet, said selector mechanism comprising a plurality of selectors, a second set of selectors movable with relation to first set of selectors, a magnet for each selector, and means controlled by the control sheet for selectively energizing said magnet to selectively operate said selectors, means operable by the selectors for selecting characters in said typesetting machine, means for restoring selectors to normal position after a character has been selected and means for locking both sets of selectors in their restored position.

147. In a typesetting machine, a printed control sheet for controlling the selection of type characters, a light actuated cell for scanning the control sheet, means for normally selecting one case of characters in said typesetting machine, means for selecting another case of characters, and means controlled by the control sheet for shifting from selection of one case of characters to another case of characters.

148. In a typesetting machine, a printed control sheet for controlling the selection of type characters in the typesetting machine, a light actuated cell for scanning the control sheet, means for normally selecting one case of characters in said typesetting machine, means for selecting another case of characters, means controlled by the control sheet for shifting from selection of one case of characters to another case of characters, and means automatically operable after the selection of a one case of character for returning the mechanism to a position for a selection of said one case of characters.

149. In a typesetting machine, means for automatically selecting characters, comprising a control sheet, means operable by the control sheet for ordinarily selecting one case of characters, means for locking said case selecting means in position, means operable by the control sheet for releasing said case selecting means to cause the selection of another case of characters and means for automatically returning the case selecting means to one case of characters after another case of characters has been selected.

150. In a typesetting machine having a plurality of type characters and means for selecting the same, comprising a control sheet having a plurality of portions for selection of each character, means for successively scanning a portion of said sheet for each character, a rotary switch having a plurality of contacts, an arm in said switch adapted to move in timed relation to the scanning means on said control sheet to selectively release the characters in the typesetting machine.

151. In a typesetting machine, having a plurality of type characters, means for automatically selecting said characters, comprising a control sheet, means operable by the control sheet for selectively selecting said characters, a carriage mechanism for holding said control sheet and means controlled by the control sheet when a line of characters thereon has been scanned for automatically moving the selected line of characters to another position in the machine.

152. In a typesetting machine, a selector for selecting type characters, a control device for controlling the selector to select the type characters, a shift mechanism normally held in one position for selecting one case of characters and means including a cam for moving the shift mechanism to a position to select the other case of characters.

153. Means for automatically setting type in a typesetting machine comprising a mechanism adapted to be secured in position in lieu of the conventional keyboard, said mechanism comprising a carriage mechanism, means for moving said carriage mechanism, means for supporting a control sheet in said carriage mechanism, said control sheet having a plurality of code characters thereon, each code character comprising a plurality of cell controls, some of said cell controls being translucent and others being opaque, a light sensitive cell, a source of light, means for passing rays from said source of light to one side of said control sheet and through the same to the cell, said cell being disposed on the other side of said control sheet from said source of light, means for operating the key rods of the typesetting machine, and means controlled by said control sheet in cooperation with said cell for selectively operating said key rods.

154. In a mechanism for automatically operating the key rods in a typesetting machine, a control sheet having code characters thereon, means in said mechanism for receiving said control sheet, a light actuated cell and means for causing relative movement between the control sheet and said cell, an amplifier connected to said cell, a relay connected to said amplifier, a magnet operable by said relay, a selector mechanism for selectively operating the key bars, means associated with said magnet for controlling said selector mechanism.

155. Means for automatically setting type in a typesetting machine which comprises a control sheet having thereon a legible message and code characters comprising a plurality of photo-electric cell controls in association with each legible character on said control sheet, said sheet also having indicating characters thereon to cause the typesetting machine to properly space the type in the typesetting machine, means on said sheet for indicating the length a line will occupy in the typesetting machine and means associated with a typesetting machine adapted to receive said control sheet and to successively scan said cell controls to automatically operate from said controls to set the type in the typesetting machine.

156. Selective control means comprising a control sheet provided with portions differing from each other in their light affecting properties, a plurality of work-performing instrumentalities, means for operating said instrumentalities, and single light sensitive means for successively scanning the portions of said sheet for controlling the operating means for said instrumentalities.

157. A control sheet for a plurality of work-performing means having separated portions differing from each other in light-affecting characteristics and single light sensitive means operable by a ray of light directed successively through one of the portions of said sheet symbolizing one of the work-performing means to automatically effect control of one of the work-performing means.

158. Means for determining the point at which a sheet of material is successively exposed to a ray of light and means adapted to be operated by said successive exposures of the sheet of material to said ray of light to automatically select a character for typecasting, typesetting and the like.

159. Selective control means for character bearing members as found in typesetting machines and the like, comprising a control sheet provided with portions differing from each other in their light affecting properties, a plurality of means for rendering operable said character bearing members, and single means for successively scanning a portion of said sheet for controlling the means for rendering operable a given character bearing member.

160. Selective control means comprising a control sheet provided with portions differing from each other in their light affecting properties, a plurality of work-performing instrumentalities, means for operating said instrumentalities, and single means for successively scanning a portion of said sheet for controlling the operating means for one of said instrumentalities.

161. Selective control means comprising a sheet having opaque and translucent portions, a plurality of work-performing instrumentalities and means for operating said instrumentalities, and single means for successively scanning a portion of said sheet for selectively operating any one of said instrumentalities.

162. In a typesetting machine having matrices and means for assembling the matrices, a control sheet containing a record of characters arranged line for line and justified in accordance with a predetermined desired line for line assembly of the matrices, means whereby said control sheet automatically selects said matrices for assembly in the assembling means in lines simulating the line for line control record.

163. In a typesetting machine having matrices and means for assembling the matrices, a control sheet containing a record of characters justified and arranged to simulate line for line a desired assembly of matrices and means controlled by said control sheet for automatically selecting said matrices for assembly in the assembling means in lines corresponding to said control record.

164. In a typesetting machine having matrices and means for assembling the matrices, a control sheet containing a record of characters arranged line for line and justified in accordance with a predetermined desired line for line assembly of the matrices, and means controlled by said control sheet to automatically select said matrices for assembly in the assembling means in lines simulating the line for line control record.

165. In a typesetting machine having matrices, a control sheet containing a record of characters arranged line for line in accordance with a predetermined desired line for line assembly of the matrices and photo-electric cell means controlled by said control sheet to automatically select said matrices for assembly in lines simulating the line for line control record.

166. In a typesetting machine having matrices and means for assembling the matrices, an imperforated control sheet containing a record of characters arranged line for line and justified in accordance with a predetermined desired line for line assembly of the matrices and means whereby said control sheet automatically selects said matrices for assembly in lines simulating the line for line control record.

167. In a typesetting machine having matrices and assembling means for the matrices, an imperforate control sheet containing a record of characters arranged line for line and justified in accordance with a predetermined desired line for line assembly of the matrices and means controlled by said control sheet to automatically select said matrices for assembly in lines simulating the line for line control record.

168. In a typesetting machine having matrices, an imperforated control sheet containing a record of characters arranged line for line in accordance with a predetermined desired line for line assembly of the matrices and photo-electric cell means controlled by said control sheet to automatically select said matrices for assembly in lines simulating the line for line control record.

169. In a typesetting machine having matrices and matrix assembly means, a control sheet containing a record of characters arranged line for line and justified in accordance with a predetermined desired line for line assembly of the matrices, means variably operated in accordance with the characters on said control sheet and a selector controlled by said means for automatically selecting said matrices for assembly simulating the line for line control record.

170. In a typesetting machine for matrices, a control sheet containing a record of symbols arranged line for line in accordance with a predetermined desired line for line assembly of the matrices, photo-electric cell means variably operated in accordance with the symbols on said control sheet and a selector controlled by said photo-electric cell means for automatically selecting said matrices for assembly simulating the line for line control record.

171. A control device for a typesetting machine comprising a record of symbols justified at the beginning of the lines and arranged line for line one above the other in accordance with the desired assemblies on a typesetting machine.

172. A control record for a typesetting machine comprising symbols arranged in lines one above the other to simulate a plurality of desired justified assemblies on a typesetting machine.

173. A control record for a typesetting machine having justified lines of symbols thereon disposed one line above the other and arranged to simulate a plurality of desired justified typesetting assemblies.

174. A control record for a typesetting machine having symbols thereon arranged one line above the other to simulate line for line a plurality of typesetting assemblies and having special characters preceding a line in accordance with a predetermined justification for that line.

175. A control page for typesetting machines having recorded matter thereon arranged one line above the other simulating a plurality of desired matrix assemblies in a linecasting machine, and means controlled by the control page for operating the typesetting machine to set up the matrix assemblies.

176. A control record for a typesetting machine having symbols thereon arranged in lines disposed one above the other and simulating desired assemblies of matrices in a linecasting machine and provided with special symbols for indicating all the necessary justification in each line.

177. In a typesetting machine having assembly means, a control record having a plurality of lines of alphabetical characters arranged one line above the other to simulate desired assemblies of type in said typesetting machine and provided with a code in juxtaposition to the alphabetical characters for controlling the assembling of type in the assembly means in said typesetting machine.

178. In a linecasting machine for matrices, a control sheet containing a record of symbols arranged one line above the other to simulate line for line a plurality of justified assemblies of the matrices, matrix assembly means and means controlled by said control sheet for automatically selecting said matrices to be assembled by said matrix assembly means in lines corresponding to said control record.

179. In a typesetting machine for matrices, a control sheet containing a record of characters arranged to simulate line for line a desired assembly of the matrices, matrix assembly means and photo-electric cell means controlled by said control sheet for automatically selecting said matrices to be assembled by said matrix assembly means in lines corresponding to said control record.

180. In a typesetting machine having matrices, an imperforated control sheet containing a record of characters arranged to simulate line for line a desired assembly of the matrices, matrix assembly means, and photo-electric cell means controlled by said control sheet for automatically selecting said matrices to be assembled by said matrix assembly means in lines corresponding to said control record.

181. In a typesetting machine having matrices adapted to be assembled for casting operation, a control sheet for controlling the operation of said machine, a line feed for stepping said sheet from line to line following each line assembly of matrices on said machine and means whereby when any portion of the line is blotted out following the first character, the unblotted out portion will still operate the selecting mechanism.

182. In a typesetting machine having matrices, a control record containing printed symbols arranged to simulate line for line a desired assembly of matrices and means controlled by said printed symbols for automatically selecting said matrices for assembly in lines corresponding to said control record.

183. In a typesetting machine for matrices, a control record containing printed symbols arranged to simulate line for line a desired assembly of matrices, matrix assembling means and means controlled by said printed symbols for automatically selecting said matrices to be assembled by said matrix assembling means in lines corresponding to said control record.

184. In a typesetting machine having matrices adapted to be assembled for casting operation, a control record for controlling the operation of said machine, a line feed for stepping said record from line to line following each line assembly of matrices on said machine and means operative at the end of a line for stepping the record to a new line and for simultaneously lifting the assembled matrices.

185. In a typesetting machine having matrices adapted to be assembled for casting operation, a control record for controlling the operation of said machine, a line feed for stepping said record from line to line following each line assembly of matrices on said machine and means for automatically operating said line feed at the end of each line to feed said record to a new line and to raise the assembled matrices.

186. In a typesetting machine for matrices, a control record containing printed symbols arranged to simulate line for line a desired assembly of matrices and means including a light sensitive cell controlled by said printed symbols for automatically selecting said matrices for assembly in lines corresponding to said control record.

187. In a typesetting machine for matrices, a control record containing printed matter arranged to simulate line for line a desired assembly of matrices, matrix assembly means and apparatus including electrical impulse transmitting means controlled by successively scanning each of said printed matter for each matrix for automatically selecting said matrices to be assembled by said matrix assembling means in lines corresponding to said control record.

188. In a typesetting machine having matrices and assembly means for the matrices, a control record containing printed symbols and single photo-electric cell means controlled by said printed symbols for automatically selecting said matrices for assembly.

189. In a typesetting machine having matrices and means for assembling the matrices, a control record containing printed characters and a corresponding printed code arrangement to simulate line for line desired assemblies of matrices and means controlled by said code for automatically selecting said matrices for assembly in the assembly means in lines corresponding to said control record.

190. Character selecting apparatus for linecasting machines, typesetting machines and the like, comprising a control sheet having control symbols thereon arranged in lines one above the other, the control symbols in the lines representing characters whose overall lengthwise dimentions correspond to a justified line of selected characters.

191. In a linecasting machine having a plurality of matrices and means for assembling the matrices in lines, a control sheet having a plurality of lines of symbols thereon arranged as in page printing for controlling the operation of said machine, and means whereby said control sheet also automatically controls justification at the beginning of a line.

192. In a linecasting machine having a plurality of matrices adapted to be set in lines, means for setting up said matrices into lines, extra spacing means for spacing words in a line, a control sheet having printed symbols thereon disposed one line above the other for controlling the operation of said means and for automatically varying the justification in accordance with the requirements at the beginning of a line.

193. A control record for linecasting machines having lines of alphabetical characters arranged one line above the other to simulate desired assemblies of matrices in typesetting machines, provided with a code in juxtaposition to each of the alphabetical characters for controlling the matrices of said linecasting machine and provided with special code for indicating all the necessary justification in each line.

194. A control record for typesetting machines having printed alphabetical characters arranged one line above the other to simulate desired lines of type in typesetting machines, provided with a printed code in juxtaposition to each of the printed alphabetical characters for controlling the type of said typesetting machine and provided with special code for indicating all the necessary justification in each line.

195. A control record for typesetting machines having printed alphabetical characters arranged to simulate a desired assembly of matrices in typesetting machines, provided with a printed code in juxtaposition to the printed alphabetical characters for controlling the matrices of said typesetting machine, provided with special characters for indicating all the necessary justification in a line and having perforations for feeding the record from line to line.

196. In a typesetting machine having matrices, and matrix assembly means, a control sheet containing a record of characters arranged line for line in accordance with a predetermined justified line for line assembly of the matrices and a selector controlled by said control sheet for automatically selecting said matrices for justified assemblies in the assembly means simulating the line for line control record.

197. In a typesetting machine for matrices, a control sheet containing a record of characters arranged to simulate line for line justified assemblies of the matrices. matrix assembly means and means controlled by said control sheet for automatically selecting said matrices to be assembled and justified in said matrix assembly means in lines corresponding to said control record.

198. In a typesetting machine for matrices, an imperforated control sheet containing a record of characters arranged to simulate line for line justified assemblies of the matrices, matrix assembly means, and means controlled by said control sheet for automatically selecting said matrices to be assembled in said matrix assembly means in justified lines corresponding to said control record.

199. In a typesetting machine for matrices, an imperforate control sheet containing a record of symbols arranged to simulate line for line a desired assembly of the matrices, matrix assembly means and means including an electrical impulse transmitting device controlled by said control sheet for automatically selecting said matrices to be assembled in said matrix assembly means in lines corresponding to said control record.

200. In a typesetting machine having matrices, a control sheet containing a record of symbols arranged in lines one above the other to simulate line for line desired assemblies of matrices, electrical impulse control means variably controlled in accordance with said symbols on said control sheet and a selector controlled by said electrical impulse control means for automatically selecting said matrices for assembly in lines corresponding to said control record.

201. In a typesetting machine having matrices, a control sheet containing a record of characters arranged to simulate line for line a desired assembly of the matrices, photo-electric cell means variably controlled in accordance with said characters on said control sheet and a selector controlled by said photo-electric cell for automatically selecting said matrices for assembly in lines according to said control record.

202. In a typesetting machine having matrices, and matrix assembly means, a control sheet containing a record of symbols arranged to simulate line for line a plurality of justified assemblies of matrices and a selector controlled by said control sheet for automatically selecting said matrices for assembly in justified lines corresponding to said control record.

203. In a typesetting machine having matrices, and means for assembling the matrices, a control sheet containing a printed record of symbols arranged to simulate line for line desired assemblies of the matrices and a selector automatically controlled by said symbols for selecting said matrices to be assembled in justified lines simulating said control record.

204. In a typesetting machine having matrices, and means for assembling the matrices, a control sheet having thereon printed symbols representing a line for line record of desired assemblies of the matrices and a selector controlled by the symbols on said control sheet for automatically selecting said matrices for assembly in said desired line for line order.

205. In a typesetting machine having matrices, and means for assembling the matrices, a control sheet having a line for line record of symbols of desired assemblies of the matrices and a selector controlled by said symbols for automatically selecting said matrices for assembly in said desired line for line order and means on the control sheet controlling the assembling means to automatically provide all of the necessary justification in each line.

206. In a typesetting machine having matrices, and assembling means, a control device, a photo-electric cell, and a selector controlled by said control device and said cell for selecting said matrices for assembly, said control device, operating thru said cell and said selector, also selecting all the necessary justification for each line.

207. In a typesetting machine having matrices, and means for assembling the matrices, a control mechanism, a selector operated by said control mechanism for selecting said matrices for assembly, said control mechanism operating in advance of a complete assembly of the line for operating said selector to select all the necessary extra spaces in that line.

208. In a typesetting machine for matrices, a control record containing printed characters arranged to simulate line for line a desired assembly of matrices and photo-electric means controlled by said printed characters for automatically selecting said matrices for assembly in lines corresponding to said control record.

209. In a typesetting machine for matrices, a control record containing printed matter arranged to simulate line for line a desired assembly of matrices, a matrix assembling means and photo-electric means controlled by said printed matter for automatically selecting said matrices to be assembled by said matrix assembling means in lines corresponding to said control record.

210. In a typesetting machine having matrices, a control record containing printed characters and a corresponding printed code arrangement to simulate line for line, a desired assembly of the matrices, matrix assembly means and means controlled by said code for automatically selecting said matrices to be assembled by said matrix assembly means in lines corresponding to said control record.

211. In a typesetting machine having matrices, a control record containing printed characters and a printed code in juxtaposition therewith and apparatus for scanning the printed code including electrical impulse transmitting means controlled by said printed code for automatically selecting said matrices for assembly.

212. In a typesetting machine having matrices, a control record containing printed characters and a corresponding printed code arranged to simulate line for line a desired assembly of matrices and means controlled by said code for automatically selecting said matrices for assembly in lines corresponding to said control record.

213. In a typesetting machine having matrices, a control sheet containing printed characters and a corresponding printed code arrangement to simulate line for line a desired assembly of the matrices, matrix assembly means and means controlled by said code for automatically selecting said matrices to be assembled by said matrix assembly means in lines corresponding to said control record.

214. In a typesetting machine having matrices, a control record containing printed characters and a printed code in juxtaposition therewith, and scanning apparatus including photo-electric cell means controlled by said printed code for automatically selecting said matrices for assembly.

215. In a typesetting machine having matrices, a control record containing printed characters and a corresponding printed code arranged to simulate line for line a desired assembly of matrices and photo-electric cell means controlled by said code for automatically selecting said matrices for assembly in lines corresponding to said control record.

216. In a typesetting machine having matrices, a control record containing printed characters and a corresponding printed code arranged to simulate line for line a desired assembly of the matrices, matrix assembly means and photo-electric cell means controlled by said code for automatically selecting said matrices to be assembled by said matrix assembly means in lines corresponding to said control record.

217. In a typesetting machine having matrices, matrix assembly means, a control record containing printed characters and a printed code in juxtaposition therewith, a selector, light sensitive means controlled by said code for operating said selector and other means controlled by said selector in accordance with its operation by said light sensitive means for selecting said matrices for assembly by the matrix assembly means in lines corresponding to said control record.

218. In a typesetting machine having matrices, a control record containing printed characters and a corresponding printed code arrangement to simulate line for line a desired assembly of the matrices, matrix assembly means, a selector, light sensitive means controlled by said code for operating said selector in accordance with its operation by said light sensitive means for selecting said matrices for assembling in lines corresponding to said control record.

219. In a typesetting machine having matrices, a control sheet containing printed characters, a record of a corresponding code in juxtaposition, a photo-electric cell controlled by said code and a selector controlled by said photo-electric cell for automatically selecting said matrices for assembly.

220. In a typesetting machine having matrices, a control sheet containing printed characters and a corresponding printed code arranged to simulate line for line a desired assembly of matrices, a photo-electric cell controlled by said code and a selector controlled by said photo-electric cell for automatically selecting said matrices for assembly.

221. In the art of printing, character selecting means comprising a selector, means controlled by the selector for transferring characters to a position where they may be simultaneously reproduced and a control sheet for controlling said selector, said control sheet comprising lines of control characters disposed one above the other and whose length corresponds to the length of the printed lines to be reproduced by said selected characters.

222. In a machine for forming lines of characters for simultaneous printing. a control sheet having lines of control characters disposed one above the other and whose length is such as to select characters for a complete printed line, and selectively operated means controlled by said control sheet for selecting said characters.

223. Means for selectively operating a linecasting machine including a selector for selectively controlling the matrices in the machine and a control sheet having control characters thereon for selectively controlling the selector, said control characters being arranged on said sheet in justified line for line order to represent line for line printing whereby editing of the control sheet is permitted.

224. Character selecting apparatus for linecasting machines, typesetting machines and the like comprising a control sheet having control characters printed thereon and arranged in justified lines disposed one above the other and whose length including extra space control characters corresponds to the length of a printed line, and selecting mechanism controlled by said control sheet for selecting said characters.

225. Control mechanism for typesetting machines and the like comprising a control sheet having control characters including extra space control characters printed thereon to represent justified line for line printing and a selector mechanism operable by said control sheet for selectively operating the typesetting machine and the like in accordance with the characters represented on the control sheet.

226. Control mechanism for typesetting machines and the like comprising a control sheet having transverse lines of control characters including extra space control characters thereon disposed one line below the other to represent line for line type to be set and means selectively controlled by said control sheet for operating said typesetting machine and the like to reproduce in type the characters appearing on the control sheet.

227. Control mechanism for typesetting machines and the like comprising a control sheet having control characters including extra space characters thereon arranged in lines disposed one above the other whose length correspond to the length of lines to be set by the machine and selectively operated means controlled by said control sheet for operating said machine in accordance with the control characters appearing on said control sheet.

228. In a machine for controlling typesetting machines and the like, a control sheet having control symbols thereon and a carriage mechanism for receiving said control sheet to control the typesetting machine, said control sheet having marginal perforations along at least one edge thereof, means adapted to enter said perforations to hold the control sheet in selected position, and automatic means operable at the end of a line of symbols for removing the means from said perforations and stepping the control sheet to a new line position and again causing said means to enter a set of perforations to hold the control sheet in position while a new line is scanned by the scanning means.

229. In a machine for controlling the setting of type in a typesetting machine and the like, a control sheet having code symbols thereon representing characters to be set by the typesetting machine, some of said code symbols being in the form of two vertically disposed lines of code symbols.

230. A control sheet for controlling typesetting machines and the like and having code symbols, means for scanning said code symbols, each of said symbols comprising two parallel lines of symbols and means whereby the scanning means is caused to move over one line of the symbols in one direction and then to return over the other line of symbols to scan both lines.

231. In a typesetting machine and the like having a movable striking bail and means for imparting constant reciprocatory movement to the striking bail, a plurality of key rod lifters normally held out of the path of the moving striking bail, selective control means for the key rod lifters for selectively moving the same into the path of the striking bail to select characters to be set by the typesetting machine and the like.

232. In a machine for controlling typesetting machines and the like, a control sheet having control symbols thereon and a carriage mechanism for receiving said control sheet, said control sheet having marginal perforations along at least one edge thereof, means adapted to enter said perforations to hold the control sheet in selected position, and automatic means operable at the end of a line of symbols for removing the means from said perforations and stepping the control sheet to a new line position and again causing said means to enter a set of perforations to hold the control sheet in position.

233. In a typesetting machine and the like, means for selectively controlling the setting of type in the typesetting machine and the like comprising a control sheet having parallel lines of control symbols thereon, means for successively scanning said symbols, mechanism controlled by the scanning means for selecting type characters and means operable by the scanning of a blank space on the control sheet having no symbol thereon for moving the selected type characters to another portion of the typesetting machine.

234. In a typesetting machine and the like, means for selectively controlling the setting of type in the typesetting machine and the like comprising a control sheet having parallel lines of control symbols thereon, means for successively scanning said symbols, mechanism controlled by the scanning means for selecting type characters and means operable by the scanning of a blank space on the control sheet having no symbol thereon for moving the selected type characters to another portion of the typesetting machine, and means operable at the beginning of the scanning of a line of symbols for rendering inoperable the means for moving the selected type characters.

235. In a machine for automatically setting type in a typesetting machine, a light sensitive cell, a control sheet, means for moving said control sheet with relation to said cell, said control sheet having thereon a plurality of code characters, and each code character comprising a plurality of cell controls, means for returning said means for moving the control sheet to the beginning of a new line of scanning when said cell successively scans a code character having all of the cell controls similar and means for rendering said returning means inoperative when the means for holding the control sheet is at the beginning of the scanning of a new line.

236. In a mechanism for automatically setting type in a typesetting machine, a key rod lifter for each of the key rods in the typesetting machine, means for lifting said key rods, individually operating means for connecting said lifting means to said key rod lifters, a control sheet having thereon a plurality of cell controls, means controlled by said cell controls for selectively positioning said key rod lifters to automatically set the type in the typesetting machine.

237. Selective control means for character bearing members as found in character reproducing machines comprising a control sheet provided with code characters having portions differing from each other in their light affecting properties, a plurality of means for rendering operable said character bearing members, a single light sensitive means for successively scanning the portions of a code character for controlling the means for rendering operable a given character bearing member.

238. Selective control means comprising a sheet having groups of printed cell controls thereon, a plurality of work performing instrumentalities and means for operating said instrumentalities, and single means for successively scanning a group of cell controls for selectively operating any one of said instrumentalities.

239. A character reproducing machine having members provided with means for reproducing characters, a control record containing groups of printed symbols and scanning means controlled by said printed symbols for automatically selecting said members for reproduction of the characters borne thereby.

240. Character selecting apparatus for character reproducing machines comprising a control sheet having printed controls symbols arranged thereon in lines one above the other, the control symbols in the lines representing characters whose overall length-wise dimensions correspond to a justified line of selected characters in printing.

241. In a character reproducing machine having character reproducing members, a control record containing printed characters and a record of corresponding printed code in juxtaposition therewith and apparatus including electrical impulse transmitting means controlled by said code for automatically selecting said character reproducing members for actuation to reproduce characters in lines corresponding to said control record.

242. In a machine for controlling a character reproducing machine, a control sheet having code symbols thereon representing characters to be reproduced by the character reproducing machine, some of said code symbols being in the form of two vertically disposed lines of code symbols.

243. In a machine for controlling character reproducing machines and the like, a control sheet having control symbols thereon and a carriage mechanism for receiving said control sheet to control the character reproducing machine, said control sheet having marginal perforations along at least one edge thereof, means adapted to enter said perforations to hold the control sheet in selected position, automatic means operable at the end of a line of symbols for removing the means from said perforations and stepping the control sheet to a new line position and again causing said means to enter a set of perforations to hold the control sheet in position while a new line is scanned by the scanning means.

244. A control sheet for controlling character reproducing machines and the like and having code symbols, means for scanning said code symbols comprising two parallel lines of symbols and means whereby the scanning means is caused to move over one line of symbols in one direction and then to return over the other line of symbols to scan both lines.

245. In a machine for controlling character reproducing machines, a control sheet having control symbols thereon and a carriage mechanism for receiving said control sheet, said control sheet having marginal perforations along at least one edge thereof, means adapted to enter said perforations to hold the control sheet in selected position, automatic means operable at the end of the line of symbols for removing the means from said perforations and stepping the control sheet to a new line position and again causing said means to enter a set of perforations to hold the control sheet in position.

246. Means for operating a character reproducing machine comprising a light sensitive cell, a control sheet, means for moving said control sheet with relation to said cell, said control sheet having thereon a plurality of code characters and each code character comprising a plurality of cell controls, means for returning the means for moving the control sheet to the beginning of a new line of scanning when said cells successively scan a code character having all of the cell controls similar and means for rendering said returning means inoperative when the means for holding the control sheet is at the beginning of the scanning of a new line.

247. Means for automatically operating a character reproducing machine having character reproducing members, comprising a control sheet for automatically controlling the selection and actuation of said character reproducing members, a photo-electric cell for successively scanning said control sheet, a source of light and means for focusing the light on the control sheet, means for causing relative movement between the control sheet and the photo-electric cell to successively expose portions of the control sheet to said photo-electric cell and means operable by said cell for selectively actuating said character reproducing members.

248. In a character reproducing machine, means for automatically selecting characters comprising a control sheet, means for scanning the control sheet, means operable by the scanning mechanism for ordinarily selecting one case of characters, means for locking said case selecting means in position, means operable by the scanning mechanism and control sheet for releasing said selecting means to cause the selection of another case of characters and means for automatically returning the case selecting means to one case of characters after another case of characters has been selected.

249. In a character reproducing machine having a plurality of character reproducing members, means for automatically selecting character reproducing members, comprising a control sheet, means operable by the control sheet for selectively selecting said character reproducing members, a carriage mechanism for holding said control sheet and means controlled by the control sheet when a line of characters thereon has been scanned for automatically moving the reproduced line of characters to another position in the character reproducing machine.

250. A control sheet having code characters thereon, some portions of which are translucent and other portions are opaque and means operable by a ray of light passing successively through the translucent portions to automatically select and actuate a character in a character reproducing machine.

251. Means for determining the point at which the ray of light can pass successively through a control character on a sheet of material and means operable by said ray of light after passing through said control character successively to automatically actuate a character in a character reproducing machine.

252. In a character reproducing machine having upper an lower case characters, a control sheet adapted to be placed in a mechanism associated with said character reproducing machine, said control sheet having thereon both legible characters and code characters, photo-electric means for successively scanning the code characters associated with each legible character to selectively operate the character reproducing machine and means associated with said code characters for determining the case of character reproduced by the character reproducing machine.

253. Means for automatically operating the characters in a character reproducing machine comprising a control sheet having sets of code characters thereon for each character to be reproduced by the character reproducing machine, means associated with the character reproducing machine into which the said sheet is adapted to be placed, photo-electric cell means in said means associated with the character reproducing machine for successively scanning each set of code characters on said copy to set up a combination to allow the character reproducing members of the character reproducing machine to be operated to automatically actuate the character reproducing member.

254. Means associated with a character reproducing machine for automatically operating character reproducing members therein comprising a control sheet having code indicia for each character desired to be reproduced in the character reproducing machine, each code indicia comprising a plurality of photo-electric cell controls, means for successively scanning said cell controls for each character to be reproduced, means for operating the scanning means for automatically scanning said cell controls for each character, and means operable by the scanning means for automatically actuating a selected character in said character reproducing machine.

255. A control sheet provided with code characters having portions thereof translucent and other portions thereof shaded and means operable by a ray of light passing successively over said translucent and shaded portions of a code character to automatically operate and reproduce a character in a character reproducing machine.

256. Means for automatically reproducing characters in a character reproducing machine comprising a control sheet having code characters thereon, means for determining a point from which a ray of light can strike a code character for determining what character is to be reproduced by said ray of light after striking said code character successively to automatically operate certain of the mechanisms of the character reproducing machine.

257. Means for automatically actuating and reproducing the characters in a character reproducing machine which comprises a control sheet having both code and characters thereon, each code comprising a plurality of cell controls, photo-electric cell means, means associated with said character reproducing machine into which said control sheet can be placed to successively scan the portions of each code with the photo-electric cell means to automatically actuate the character reproducing members from said control sheet.

258. A device for automatically controlling the selection of character bearing members in a character reproducing machine which comprises a control sheet provided with code indicia, each code indicia including portions differing from each other in their light affecting properties, means for receiving said control sheet, light sensitive means for successively scanning the portions of the code indicia for each character and means responsive to the light sensitive means which includes a plurality of cooperative elements capable of actuation in different respects relative to each other for independently selecting the different character bearing members.

259. Means for automatically controlling the selection of character bearing members in a character reproducing machine comprising a control sheet of imperforate material having code indicia thereon, means associated with a machine to be operated adapted to receive said control sheet, a light sensitive cell associated with the last named means operative to selectively actuate the character bearing members from the code indicia on said sheet of material.

260. In a device for automatically controlling the selection of character bearing members in a character reproducing machine, a control sheet having thereon code indicia for each character bearing member to be selected, the code indicia for each of said characters including a plurality of cell control portions, a light sensitive cell for successively scanning said portions, and means responsive thereto to selectively operate the character bearing members of said machine.

261. A device for controlling the selection of character bearing members in a character reproducing machine comprising a control sheet having a set of code indicia thereon for each character to be selected, means associated with the machine to be operated for receiving said control sheet, a light sensitive cell in operative relation with said control sheet receiving means for successively scanning each set of code indicia on the control sheet to set up for each character desired, an association of cooperative elements to select the desired character bearing member.

262. A method for automatically selecting character bearing members for actuation on a character reproducing machine which comprises preparing a control sheet having thereon for each character to be selected and reproduced code indicia including a plurality of portions different from each other in their light affecting properties, successively scanning with a light sensitive cell said portions of the code indicia for each character to be selected to automatically actuate mechanism for selecting and actuating the character corresponding to the code indicia scanned.

263. A device for automatically selecting character bearing members in a character reproducing machine, comprising means for operating the character bearing members, a selecting mechanism in operative relation with said operating means, a light sensitive cell for controlling said selecting mechanism, a control sheet having code characters thereon, means for bringing the control sheet into operative relation with said light sensitive cell, and means for successively exposing a plurality of portions of the code characters to said light sensitive cell for each character to be selected to actuate said selecting mechanism.

264. A device for automatically selecting character bearing members in character reproducing machines and the like comprising a control sheet adapted to be placed in mechanism associated with the machine to be operated, said control sheet having thereon code indicia corresponding to each character bearing member of the machine to be operated, the code indicia for each character including a plurality of areas differing from each other in their light affecting properties, a light sensitive cell for successively scanning the area of the code indicia for each character, and means responsive to said light sensitive cell for actuating the character bearing members of the machine to be operated.

265. A device for automatically selecting character bearing members in character reproducing machines, comprising a control sheet having code indicia thereon for each character to be selected, means associated with the machine to be operated into which said control sheet can be placed to automatically select character bearing members corresponding to the code indicia thereon, said means including a light sensitive cell and each code indicia including a plurality of areas differing from each other in their light affecting properties.

266. A device for automatically selecting character bearing members in a character reproducing machine comprising a control sheet having code indicia thereon for each character to be selected, including a plurality of areas differing from each other in their light affecting properties, means associated with the machine to be operated for receiving said control sheet, a photoelectric cell in operative relation with said control sheet receiving means, means for causing said cell to successively scan said areas of the code indicia for each character to be selected and means responsive to said cell after the same has scanned the areas of a particular code indicia for selecting the character bearing member identified by such code indicia.

267. A device for automatically selecting character bearing members in character reproducing machines comprising a control sheet having code indicia thereon for each character to be selected, arranged in transverse lines, means associated with a machine to be operated for receiving said control sheet, light sensitive means, means for exposing the code indicia on the control sheet to the light sensitive means and to a source of light, means for causing the control sheet to move in relation to the source of light and the light sensitive means to successively pass code indicia of an entire line into operative relation with said light source and light sensitive means, and means responsive to the light sensitive means when a complete line of code indicia has been scanned thereby for moving the control sheet to a new line position.

268. Means for automatically selecting character bearing members in a character reproducing machine comprising a light sensitive cell, a control sheet having code characters thereon, some of said code characters comprising a plurality of cell controls, means associated with the character selecting means for receiving said control sheet and scanning successively the cell controls for each character and means operable by said scanning operation for selecting the character bearing member represented by said code character.

269. Selective control means for character reproducing machines comprising a control sheet having control characters provided with shaded and unshaded portions and single light sensitive means for successively scanning a control character for selectively operating a character in the character reproducing machine.

270. Means for determining the point at which a control character on a sheet of material is successively exposed to a ray of light and means operable by said exposures of said control character to said ray of light to automatically select and actuate a character in a character reproducing machine.

271. Means for determining the point at which a ray of light can pass successively through the portions of a control character on a sheet of material and means operable by said ray of light after passing through the portions of a control character successively for a plurality of times for automatically reproducing a character in a character reproducing machine.

272. Selective control means comprising a sheet having printed and unprinted code portions, a plurality of work performing instrumentalities and means for operating said instrumentalities, and single light sensitive means for successively scanning the code portions of said sheet for selectively operating any one of said instrumentalities.

273. In a device for automatically controlling the selection of character bearing members comprising a control sheet having thereon printed and unprinted code indicia for each character bearing member to be selected, the code indicia for each of said characters including a plurality of cell control portions, a light sensitive cell for successively scanning said portions and means responsive thereto to selectively actuate the character bearing members in a character reproducing machine.

274. A control record for character reproducing machines comprising code characters for the characters to be reproduced on said machine, some of said code characters comprising a plurality of controls, and one of the controls serving to determine the case of the character reproduced in said machine.

275. Means for controlling and operating linecasting, typesetting and like machines comprising a control record, means for scanning said control record, said control record having code thereon for each character to be selected and some of said code comprising a plurality of controls a shift mechanism, means for operating the shift mechanism, some of said code having a control embodied therein for simultaneously causing actuation of the shift mechanism while the other controls in said code are being scanned for selection of the character.

276. In a linecasting machine, typesetting machine and the like, means for selecting characters in said machine for printing comprising a control record, means for scanning the control record, a shift mechanism, means controlled by the control record for operating the shift mechanism to select a character, and automatic means in the machine for returning the shift mechanism to normal lower case position before the next character is selected.

277. Means for actuating typesetting machines and the like, comprising a control sheet having a plurality of code characters and some of said code characters having a plurality of cell controls, light sensitive means for successively scanning the cell controls for a character to be selected, some of said code characters having embodied therein a cell control for actuating the shift mechanism of the typesetting machine.

278. Means for actuating typesetting machines, line casting machines and the like comprising a control record having a plurality of code characters thereon for selecting characters and some of said code characters comprising a plurality of controls, some of said code characters including a control to effect a shift operation to select a high case character in the machine it controls.

279. Means for actuating linecasting and like machines comprising a control record, means controlled by said record for selecting characters in said machine for reproduction, means for locking the machine in a position to select upper case characters, means on the record for causing the locking means to be locked in a position to select upper case characters, and means automatically operable after the selection of an upper case character to cause the following character selected to be of the lower case variety.

280. In a linecasting machine, typesetting machine and the like, means for selecting characters in said machine comprising a control record having scanning means associated therewith for transmitting a plurality of electrical impulses for at least some of the characters to be selected, means controlled by the impulses for selecting a character, means controlled by the control record for effecting a shift operation to select a character and automatic means for effecting an unshift operation immediately after the selected shift character has been selected.

281. In a linecasting machine, typesetting machine and the like, means for selecting characters in said machine comprising a control record, means for holding the control record and scanning the same, means controlled by a scanning operation for selecting a character in said machine, means controlled by said control record for effecting a shift operation to select a character and automatic means for effecting an unshift operation to select an unshift character immediately after the selection of the shift character.

282. Means for actuating typesetting machines and the like comprising a control sheet having lines of printed code characters thereon and some of said code characters comprising a plurality of cell controls, light sensitive means for successively scanning the cell controls for a code character for selecting the character represented thereby, shift mechanism, means controlled by the control sheet for moving the shift mechanism to shift position and automatic means for moving the shift mechanism to normal position before the next character is selected.

283. Means for automatically actuating character reproducing members in a character reproducing machine comprising in combination means for operating the character reproducing members in said machine, a prepared control sheet having a plurality of code characters associated with some of the characters on the control sheet, some of said code characters comprising a plurality of cell controls, a light sensitive cell adapted to successively scan each of the cell controls of said code characters on the control sheet, a selector mechanism operable by the cell to selectively operate a character reproducing member in the said machine.

284. Apparatus for transmitting electrical impulses to a character reproducing machine to actuate the same comprising a control record having control areas thereon and each control area being divided into a plurality of sections, some of the sections differing from the other sections in their light affecting properties, light sensitive means for scanning said areas, and means controlled by a scanning operation for effecting actuation of the character reproducing machine.

285. In a linecasting machine, typesetting machine and the like, means for selecting the characters therein for printing comprising a control record, means for receiving and scanning said control record, means on the control record for effecting a shift operation to select a high case character and means automatically operable after the high case character is selected for selecting a low case character for the next selection unless the control record again calls for a high case character.

BUFORD L. GREEN.